(12) United States Patent
Kojima et al.

(10) Patent No.: US 8,173,239 B2
(45) Date of Patent: May 8, 2012

(54) INFORMATION RECORDING MEDIUM, METHOD FOR PRODUCING THE SAME, AND SPUTTERING TARGET

(75) Inventors: Rie Kojima, Osaka (JP); Noboru Yamada, Osaka (JP); Tosiyuki Matunaga, Osaka (JP); Takashi Nishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 12/663,931

(22) PCT Filed: Jun. 9, 2008

(86) PCT No.: PCT/JP2008/001470
§ 371 (c)(1),
(2), (4) Date: Dec. 10, 2009

(87) PCT Pub. No.: WO2008/152796
PCT Pub. Date: Dec. 18, 2008

(65) Prior Publication Data
US 2010/0178447 A1    Jul. 15, 2010

(30) Foreign Application Priority Data

Jun. 11, 2007    (JP) ................................. 2007-153594

(51) Int. Cl.
*B32B 3/02*    (2006.01)
(52) U.S. Cl. .................. 428/64.1; 428/64.4; 430/270.13
(58) Field of Classification Search .................. 428/64.4; 430/270.13
See application file for complete search history.

(56) References Cited

U.S. PATENT DOCUMENTS

| | | |
|---|---|---|
| 2003/0224292 A1 | 12/2003 | Shingai et al. |
| 2004/0191683 A1 | 9/2004 | Nishihara et al. |
| 2004/0253539 A1 | 12/2004 | Uno et al. |
| 2006/0153053 A1 | 7/2006 | Deguchi et al. |
| 2007/0003730 A1 | 1/2007 | Kojima et al. |

FOREIGN PATENT DOCUMENTS

| | | |
|---|---|---|
| JP | 1-292636 A | 11/1989 |
| JP | 1-303643 A | 12/1989 |
| JP | 6-204136 A | 7/1994 |
| JP | 2584741 B2 | 11/1996 |
| JP | 2574325 B2 | 1/1997 |
| JP | 2004-310992 A | 11/2004 |
| JP | 2005-022409 A | 1/2005 |
| JP | 2006-168182 A | 6/2006 |
| JP | 3963781 B2 | 6/2007 |
| WO | WO 2006/011285 A | 2/2006 |

*Primary Examiner* — Elizabeth Mulvaney
(74) *Attorney, Agent, or Firm* — Hamre, Schumann, Mueller & Larson, P.C.

(57) ABSTRACT

An information recording medium (100) of the present invention is an information recording medium that allows information to be recorded thereon by being irradiated with an optical beam or by being applied with electrical energy, and includes at least a recording layer (115) whose phase can change. The recording layer (115) contains antimony (Sb), carbon (C), and a light element (L) having an atomic weight of less than 33. The light element (L) preferably is at least one element selected from B, N, O, Mg, Al, and S. For example, the recording layer (115) may be composed of a material represented by a composition $Sb_{100-x-y}C_xL_y$, where the subscripts 100-x-y, x, and y denote composition ratios of Sb, C, and the L in atomic percentage, respectively, and x and y satisfy $x+y \leq 50$.

19 Claims, 10 Drawing Sheets

INFORMATION RECORDING MEDIUM, METHOD FOR PRODUCING THE SAME, AND SPUTTERING TARGET

TECHNICAL FIELD

The present invention relates to an information recording medium with respect to which information optically or electrically can be recorded, erased, rewritten, and/or reproduced, and a method for producing the information recording medium. The present invention also relates to a sputtering target to be used for the production.

BACKGROUND ART

A standard was established in 2002 for Blu-ray Disc (hereinafter referred to as BD), which has high density and high-capacity, and on and from which information is recorded and reproduced using a blue-violet laser, as a medium for recording high-definition images. There are two types for BD: 25 GB capacity single-layer media (with one information layer on one side); and 50 GB capacity dual-layer media (with two information layers on one side). Particularly, in the dual-layer media, the translucent information layer located closer to a laser beam incident side is called Layer 1 (hereinafter referred to as L1), and the information layer located farther from the laser beam incident side is called Layer 0 (hereinafter referred to as L0).

The present inventors developed a rewritable BD (hereinafter referred to as a BD-RE) medium and put into practical use a 1× speed 25 GB capacity medium and a 1× speed 50 GB capacity medium in 2004. 1× speed corresponds to a data transfer rate of 36 Mbps. Furthermore, the present inventors put to practical use a 2× speed 25 GB capacity medium and a 2× speed 50 GB capacity medium in 2006. These media allow the data and image information to be recorded (amorphous state) and rewritten thereon and erased (crystalline state) therefrom by phase change of their recording layers. The material and the composition of the recording layer is determined so as to obtain an optimal crystallization rate to the speed of the medium.

The present inventors used a Ge—Sb—Te recording material (see JP 2584741 B, for example) for 1× speed media, and a Ge—Bi—Te recording material (see JP 2574325 B and WO 2006/011285, for example) having a higher crystallization rate for 2× speed media. More specifically, the Ge—Sb—Te recording material used was a compound obtained by combining GeTe with $Sb_2Te_3$, having a composition containing approximately 44% of Ge and approximately 6% of Sb. The Ge—Bi—Te recording material used was a compound obtained by combining GeTe and $Bi_2Te_3$, having a composition containing approximately 45% of Ge and approximately 4% of Bi.

Further increases in the speed and capacity of BD will make BD more valuable and useful for personal computer, recorder, and game machine applications in the future. For example, a higher processing speed for data and image files, higher definition, improved sound quality, and additional recorder functions can be obtained. Also, a longer recording time and substitution for hard disks can be realized. Assuming that the demand for high-speed, high-capacity media will increase further in the future, the inventors set the next development goals to producing a medium usable at a speed of at least 4× speed (144 Mbps) with a capacity of at least 100 GB.

To produce a 4× speed medium requires a material with a higher crystallization rate than that of the recording material used for a 2× speed medium. For example, the Ge—Bi—Te recording material has a higher crystallization rate when the concentration of $Bi_2Te_3$ therein is increased. Particularly, in the 50 GB capacity dual-layer medium, the recording layer L1 is as thin as 6 nm while the recording layer L0 has a thickness of approximately 10 nm. Thus, when recording materials with the same composition are used for the L0 and L1, the L1 has a lower crystallization ability than that of the L0. Therefore, it is necessary to increase the concentration of $Bi_2Te_3$ in the recording material for L1.

On the other hand, a high capacity of 100 GB can be attained by, for example, increasing the recording density by two times, and by increasing the number of the information layers to four. Increasing the recording density requires recording marks to be small, resulting in a shorter irradiation time of the laser beam. In order to be crystallized in a short time, the recording material needs to have a high crystallization rate. In the case of increasing the number of the information layers, it is necessary to add another information layer having a higher transmittance than that of the L1 of the dual-layer medium. Accordingly, the recording layer is designed to have an extremely small thickness, for example, 3 nm. Since the crystallization rate needs to be increased also for increasing the capacity as mentioned above, it is necessary to adjust the composition of the Ge—Bi—Te recording material by increasing the concentration of $Bi_2Te_3$ therein to be higher than that of the recording material for the L1 of the dual-layer medium.

First, in order to obtain a 4× speed dual-layer medium, the present inventors looked for an optimum value of $Bi_2Te_3$ concentration in the Ge—Bi—Te recording material, but failed to find it either for the L0 or for the L1. The present inventors evaluated the L0 and the L1 for initial properties (recording properties and erasing properties) and reliability (recording mark storage stability). The result on the L0 was that when the L0 was composed of a composition with satisfactory erasing properties, it exhibited a poor recording mark storage stability and was not usable practically. The result on the L1 was that when the L0 was composed of a composition with satisfactory erasing properties, it had a small signal amplitude and insufficient recording properties. Moreover, since the L1 exhibited a poor recording mark storage stability like L0, no optimal composition could be found for it.

These results are derived from the fact that in the Ge—Bi—Te recording material, a higher $Bi_2Te_3$ concentration increases the crystallization rate, but at the same time, it reduces the optical variation and lowers the crystallization temperature. The crystallization rate is evaluated as the erasing properties, and when the crystallization rate is high, an erasure rate is high. The optical variation is a refractive index variation caused by the phase change and is evaluated as the signal amplitude. When the optical variation is large, the signal amplitude is high. The crystallization temperature affects the recording mark storage stability, that is, the stability of the amorphous state. A decrease in the crystallization temperature leads to a deterioration of the recording mark storage stability. For the 2× speed medium in practical use, there was a composition capable of realizing all of satisfactory level of the crystallization rate, the optical variation, and the crystallization temperature, allowing the medium to exhibit satisfactory initial properties and reliability. In order for the medium to be usable at 4× speed, the $Bi_2Te_3$ concentration needed to be increased further. However, when the $Bi_2Te_3$ concentration was increased, the medium was not usable practically in terms of the amount of the optical variation and the crystallization temperature.

Likewise, in the experiment in obtaining a high capacity with a four-layer medium (100 GB, with four information layers on one side), there could not be found a composition with the satisfactory levels of the crystallization rate, the optical variation, and the crystallization temperature for all of the four information layers. When the four information layers were composed of a composition with satisfactory erasing properties, they exhibited poor recording mark storage stability. Also, the signal amplitude was insufficient on the translucent information layer.

DISCLOSURE OF THE INVENTION

An object of the present invention is to provide a phase-change recording material with all of a high crystallization rate, a large optical variation, and a high crystallization temperature, and provide an information recording medium that has a recording layer composed of this phase-change recording material and is capable of having satisfactory levels of the recording properties, the erasing properties, and the recording mark storage stability at the same time even under the recording conditions of a high data transfer rate of 4× speed or more and a high capacity of 100 GB or more. Another object of the present invention is to provide a method for producing the information recording medium and a sputtering target to be used for the production.

For achieving the above-mentioned objects, the information recording medium of the present invention is an information recording medium that allows information to be recorded thereon by irradiation with an optical beam or by application of electrical energy. The information recording medium includes at least a recording layer whose phase can change. The recording layer contains antimony (Sb), carbon (C), and a light element (L) having an atomic weight of less than 33.

The information recording medium of the present invention can have satisfactory levels of recording properties, the erasing properties, and the recording mark storage stability at the same time even at a high data transfer rate of 4× speed (144 Mbps) or more, when the information recording medium is a BD-RE medium, for example. Also, when the information recording medium of the present invention is a high-capacity recording medium of 100 GB or more having three or four information layers, satisfactory levels of recording properties, the erasing properties, and the recording mark storage stability can be attained at the same time in each of the information layers. In this way, the present invention makes it possible to obtain an excellent information recording medium with a high capacity and a high speed.

The method for producing the information recording medium of the present invention is a method for producing an information recording medium, including at least the step of forming a recording layer containing antimony (Sb), carbon (C), and a light element (L) having an atomic weight of less than 33. The step of forming the recording layer includes using at least a sputtering target containing Sb and sputtering the sputtering target containing Sb.

The method for producing the information recording medium of the present invention makes it possible to produce information recording media with a high data transfer rate of 4× speed (144 Mbps) or more. Also, the method for producing the information recording medium of the present invention makes it possible to produce a high-capacity information recording medium of 100 GB or more having three or four information layers.

The present invention also provides a sputtering target for forming a recording layer containing antimony (Sb), carbon (C), and a light element (L) having an atomic weight of less than 33. The sputtering target contains at least antimony (Sb) and carbon (C).

By sputtering the sputtering target of the present invention, it is possible to obtain a phase-change recording layer having all of the high crystallization rate, the large optical variation, and the high crystallization temperature.

BEST MODE FOR CARRYING OUT THE INVENTION

Figure 1:
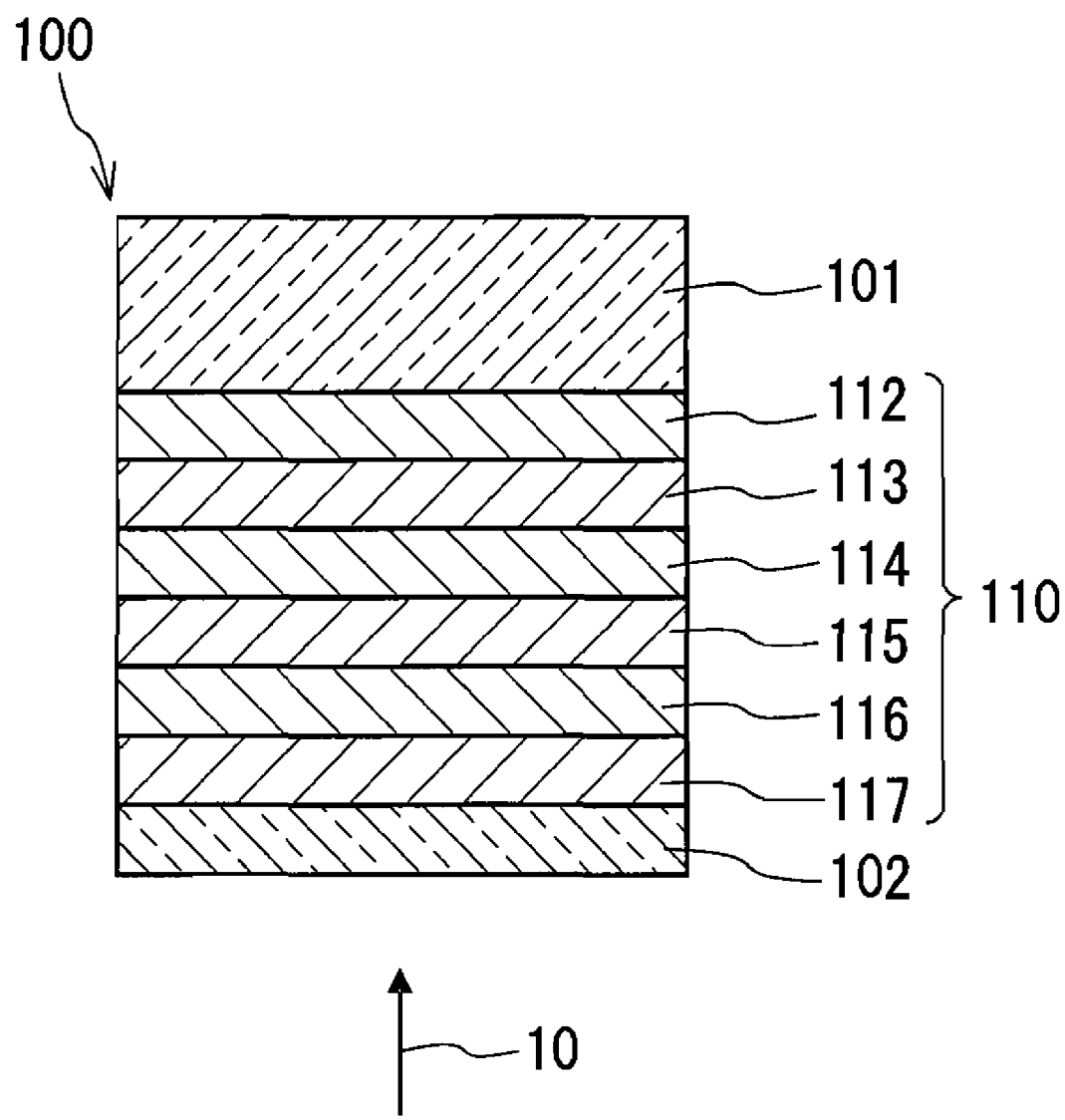
FIG. 1 is a partial sectional view showing an example of the information recording medium of the present invention.

As mentioned above, the recording layer included in the information recording medium of the present invention contains antimony (Sb), carbon (C) and a light element (L) having an atomic weight of less than 33. In the present invention, the light element L contained in the recording layer may be at least one element selected from B, N, O, Mg, Al, and S, for example.

In the present invention, the recording layer may be composed of a material represented by formula (1): $Sb_{100-x-y}C_xL_y$, where the subscripts 100-x-y, x, and y denote composition ratios of Sb, C, and the L in atomic percentage, respectively, and x and y satisfy $x+y \leq 50$. The recording layer may have a thickness of, for example, 15 nm or less, and furthermore, may have a thickness of 7 nm or less. In this specification, the composition ratios of Sb, C, and the L denoted by atomic percentage are the atomic percentages of Sb, C, and the L when the total number of "Sb" atoms, "C" atoms, and "L" atoms is taken as a total amount (100%).

The information recording medium of the present invention may include N information layers, where N is an integer of 2 or more. In this case, at least one of the information layers includes the recording layer. Furthermore, N may be 3 or 4.

As mentioned above, the method for producing the information recording medium of the present invention includes at least the step of forming the recording layer containing antimony (Sb), carbon (C) and the light element (L) having an atomic weight of less than 33. The step of forming the recording layer includes using at least the sputtering target containing Sb and sputtering the sputtering target. In the method for producing the information recording medium of the present invention, the L may be at least one element selected from B, N, O, Mg, Al, and S, for example.

In the method for producing the information recording medium of the present invention, the step of forming the recording layer further may include using an additional sputtering target containing C and sputtering the sputtering target containing C. Moreover, the step of forming the recording layer further may include using an additional sputtering target containing the L and sputtering the sputtering target containing the L. In the step of forming the recording layer, a rare gas or a mixed gas of a rare gas and at least one selected from $N_2$ gas and $O_2$ gas may be used for the sputtering.

The recording layer formed in the step of forming the recording layer may be composed of, for example, a material represented by the formula (1): $Sb_{100-x-y}C_xL_y$, where the subscripts 100-x-y, x, and y denote composition ratios of Sb, C, and the L in atomic percentage, respectively, and x and y satisfy $x+y \leq 50$.

As mentioned above, the sputtering target of the present invention contains at least antimony (Sb) and carbon (C). The sputtering target of the present invention further may contain the light element (L) having an atomic weight of less than 33. In this case, the L may be at least one element selected from B, N, O, Mg, Al, and S, or may be at least one element selected from B, Mg, Al, and S, for example.

The recording layer formed using the sputtering target of the present invention may be composed of, for example, a material represented by formula (1): $Sb_{100-x-y}C_xL_y$, where x and y satisfy $x+y \leq 50$.

Hereinafter, embodiments of the present invention will be described with reference to the drawings. The following embodiments are examples and the present invention is not limited to these. Furthermore, in the following embodiments, the same parts are indicated with identical numerals and the same descriptions thereof may be omitted.

Embodiment 1

An example of the information recording medium will be described as Embodiment 1 of the present invention. FIG. 1 shows a partial sectional view of an information recording medium 100 as the example. In the information recording medium 100, an information layer 110 and a transparent layer 102 are formed sequentially on a substrate 101. The information layer 110 is formed of a reflective layer 112, a dielectric layer 113, an interface layer 114, a recording layer 115, an interface layer 116, and a dielectric layer 117 disposed in this order on one surface of the substrate 101.

The information recording medium 100 can be used as a Blu-ray Disc that has a capacity of 25 GB or more and allows information to be recorded thereon or reproduced therefrom with a laser beam 10 having a wavelength of around 405 nm in a blue-violet region. The laser beam 10 is incident on the information recording medium 100 thus configured from a transparent layer 102 side, and thereby, the recording and reproducing of information can be performed. Hereinafter, descriptions of the components will be made in order, starting from the substrate 101.

The substrate 101 functions mainly as a support body. A disc-shaped transparent substrate with a smooth surface is used for the substrate 101. As the material of the substrate 101, there can be mentioned resins, such as polycarbonate, amorphous polyolefin, and polymethylmethacrylate (PMMA), or glass. Taking formability, price, and mechanical strength into consideration, polycarbonate preferably is used. In the illustrated embodiment, the substrate 101 with a thickness of approximately 1.1 mm and a diameter of approximately 120 mm preferably is used.

Guide grooves with a shape of projections and depressions for guiding the laser beam 10 may be formed on the surface of the substrate 101 on which the information layer 110 is formed. In this specification, when the guide grooves are formed on the substrate 101, a surface of the guide groove closer to a laser beam 10 incident side is called a "groove surface", and a surface of the guide groove farther from the laser beam 10 incident side is called a "land surface" for convenience. When the information recording medium of the present invention is used as the Blu-ray Disc, for example, a distance from the groove surface to the land surface preferably is at least 10 nm but not more than 30 nm. In the Blu-ray Discs, recording is performed only on the groove surfaces, and a groove-groove distance (a distance from a center of one groove surface to a center of an adjacent groove surface) is approximately 0.32 μm.

The transparent layer 102 will be described. As a method for increasing the recording density of the information recording medium, there can be mentioned a method in which a laser beam with a short wavelength is used and the numerical aperture NA of an objective lens is increased so as to focus the laser beam into a smaller spot. In this case, a focal point is present at a reduced depth, thus the transparent layer 102 located on a laser beam 10 incident side is designed to be thinner than the substrate 101. This configuration makes it possible to obtain the information recording medium 100 with a high capacity on which information can be recorded at a higher density.

A disc-shaped transparent substrate with a smooth surface is used for the transparent layer 102, like the substrate 101. A distance from a surface of the transparent layer 102 to the recording layer 115 of the information layer 110, that is, the thickness of the transparent layer 102, preferably is at least 80 μm but not more than 120 μm, and more preferably at least 90 μm but not more than 110 μm. The transparent layer 102 may be composed of a disc-shaped sheet and an adhesive layer, or may be composed of an ultraviolet curable resin, for example. Guide grooves with a shape of projections and depressions for guiding the laser beam 10 may be formed on the transparent layer 102, as needed. It also is possible to form a protective layer on a surface of the dielectric layer 117 and form the transparent layer 102 thereon. Although any of these configurations may be used, the total thickness (for example, the sheet thickness+the adhesive layer thickness+the protective layer thickness, and the thickness of only the ultraviolet curable resin) preferably is at least 80 μm but not more than 120 μm. Preferably, the sheet is formed of a resin, such as polycarbonate, amorphous polyolefin, and PMMA, and the polycarbonate is particularly preferable. Since the transparent layer 102 is located on the laser beam 10 incident side, it is preferable for optical purposes that the transparent layer 102 has a small birefringence in a short wavelength region.

Optically, the reflective layer 112 has a function of increasing the amount of light to be absorbed by the recording layer 115. Thermally, the reflective layer 112 has a function of diffusing promptly the heat generated in the recording layer 115 and cooling the recording layer 115 rapidly so that the recording layer 115 becomes amorphous easily. Furthermore, the reflective layer 112 also has a function of protecting a multilayer film including the layers from the dielectric layer 113 to the dielectric layer 117 from the environment in which it is used. Preferably, the material for the reflective layer 112 has a high thermal conductivity so as to diffuse promptly the heat generated in the recording layer 115. Furthermore, the material for the reflective layer 112 preferably has low optical absorption at a wavelength of the laser beam used so as to increase the amount of light to be absorbed by the recording layer 115.

For example, a metal selected from Al, Au, Ag, and Cu, or an alloy of these can be used as the material for the reflective layer 112. In order to enhance the moisture resistance and adjust the thermal conductivity or the optical properties (such as optical reflectance, optical absorptance, and optical transmittance) of the reflective layer 112, a material obtained by adding another element into the above-mentioned metal or alloy may be used. Preferably, the additive material is selected from Mg, Ca, Sc, Y, La, Ti, Zr, Hf, V, Nb, Ta, Cr, Mo, W, Mn, Fe, Co, Ni, Pd, Pt, Zn, Ga, In, C, Si, Ge, Sn, Sb, Bi, Te, La, Ce, Pr, Nd, Sm, Eu, Gd, Tb, Dy, Ho, Er, Tm, Yb, and Lu. At this time, the concentration of the additive material preferably is 3 atom % or less. Particularly, the reflective layer 112 containing Ag of 97 atom % or more preferably is used for the information recording medium 100 because Ag has low optical absorption at a wavelength around 405 nm.

Moreover, the reflective layer 112 may include two or more layers. In this case, one of the layers located on a substrate 101 side may be composed of a dielectric material. The thickness of the reflective layer 112 is adjusted according to the linear velocity of the medium used and the composition of the recording layer 115. Preferably, it is at least 40 nm but not more than 300 nm. The reflective layer 112 with a thickness less than 40 nm fails to satisfy the rapid cooling conditions, makes it difficult to diffuse the heat generated in the recording layer, and makes it difficult for the recording layer to become amorphous. The reflective layer 112 with a thickness more than 300 nm goes beyond the rapid cooling conditions, allows the heat generated in the recording layer to be diffused excessively, and lowers the recording sensitivity (as a result, a higher laser power is needed).

The dielectric layer 113 and the dielectric layer 117 have a function of adjusting an optical distance to enhance the optical absorption efficiency of the recording layer 115 and increasing a difference between the reflectance of a crystalline phase and the reflectance of an amorphous phase to increase the signal amplitude. The dielectric layer 113 and the dielectric layer 117 also have a function of protecting the recording layer 115 from moisture, etc. Preferably, the dielectric layer 113 and the dielectric layer 117 have high transparency with respect to the wavelength of the laser used, excellent moisture resistance, and excellent heat resistance as their properties.

As the materials for the dielectric layers 113 and 117, there can be used oxide, sulfide, selenide, nitride, carbide, and fluoride, or a mixture of these.

As the oxide, there may be used, for example, $Al_2O_3$, $CaO$, $CeO_2$, $Cr_2O_3$, $Dy_2O_3$, $Ga_2O_3$, $Gd_2O_3$, $HfO_2$, $Ho_2O_3$, $In_2O_3$, $La_2O_3$, $MgO$, $Nb_2O_5$, $Nd_2O_3$, $Sc_2O_3$, $SiO_2$, $Sm_2O_3$, $SnO_2$, $Ta_2O_5$, $TiO_2$, $Y_2O_3$, $Yb_2O_3$, $ZnO$, $ZrO_2$, and $ZrSiO_4$. As the sulfide, $ZnS$ may be used, for example. As the selenide, $ZnSe$ may be used, for example. As the nitride, there may be used $AlN$, $BN$, $CrN$, $Ge_3N_4$, $HfN$, $NbN$, $Si_3N_4$, $TaN$, $TiN$, $VN$, and $ZrN$, for example. As the carbide, there may be used $Al_4C_3$, $B_4C$, $CaC_2$, $Cr_3C_2$, $HfC$, $Mo_2C$, $NbC$, $SiC$, $TaC$, $TiC$, $VC$, $W_2C$, $WC$, and $ZrC$, for example. As the fluoride, there may be used $CaF_2$, $CeF_3$, $DyF_3$, $ErF_3$, $GdF_3$, $HoF_3$, $LaF_3$, $MgF_2$, $NdF_3$, $YF_3$, and $YbF_3$, for example.

Particularly, when a material containing Ag is used for the reflective layer 112, the materials except for sulfide preferably are used for the dielectric layer 113 because Ag reacts with S easily.

As the mixture, there can be used $ZnS$—$SiO_2$, $ZnS$—$LaF_3$, $ZnS$—$SiO_2$—$LaF_3$, $ZrO_2$—$SiO_2$, $ZrO_2$—$LaF_3$, $ZrO_2$—$Cr_2O_3$, $ZrO_2$—$SiO_2$—$Cr_2O_3$, $ZrO_2$—$Cr_2O_3$—$LaF_3$, $ZrO_2$—$SiO_2$—$LaF_3$, $ZrO_2$—$SiO_2$—$Cr_2O_3$—$LaF_3$, $ZrO_2$—$Ga_2O_3$, $ZrO_2$—$SiO_2$—$Ga_2O_3$, $ZrO_2$—$Ga_2O_3$—$LaF_3$, $ZrO_2$—$SiO_2$—$Ga_2O_3$—$LaF_3$, $ZrO_2$—$In_2O_3$, $ZrO_2$—$SiO_2$—$In_2O_3$, $ZrO_2$—$In_2O_3$—$LaF_3$, $ZrO_2$—$SiO_2$—$In_2O_3$—$LaF_3$, $ZrO_2$—$SiO_2$—$Cr_2O_3$—$Ga_2O_3$, $ZrO_2$—$SiO_2$—$Cr_2O_3$—$In_2O_3$, $ZrO_2$—$SiC$, $ZrO_2$—$SiO_2$—$SiC$, $HfO_2$—$SiO_2$, $HfO_2$—$LaF_3$, $HfO_2$—$Cr_2O_3$, $HfO_2$—$SiO_2$—$Cr_2O_3$, $HfO_2$—$Cr_2O_3$—$LaF_3$, $HfO_2$—$SiO_2$—$LaF_3$, $HfO_2$—$SiO_2$—$Cr_2O_3$—$LaF_3$, $HfO_2$—$Ga_2O_3$, $HfO_2$—$SiO_2$—$Ga_2O_3$, $HfO_2$—$Ga_2O_3$—$LaF_3$, $HfO_2$—$SiO_2$—$Ga_2O_3$—$LaF_3$, $HfO_2$—$In_2O_3$, $HfO_2$—$SiO_2$—$In_2O_3$, $HfO_2$—$In_2O_3$—$LaF_3$, $HfO_2$—$SiO_2$—$In_2O_3$—$LaF_3$, $HfO_2$—$SiO_2$—$Cr_2O_3$—$Ga_2O_3$, $HfO_2$—$SiO_2$—$Cr_2O_3$—$In_2O_3$, $HfO_2$—$SiC$, $HfO_2$—$SiO_2$—$SiC$, $SnO_2$—$Ga_2O_3$, $SnO_2$—$In_2O_3$, $SnO_2$—$SiC$, $SnO_2$—$Si_3N_4$, $SnO_2$—$Ga_2O_3$—$SiC$, $SnO_2$—$Ga_2O_3$—$Si_3N_4$, $SnO_2$—$Nb_2O_5$, $SnO_2$—$Ta_2O_5$, $CeO_2$—$Al_2O_3$, $CeO_2$—$Al_2O_3$—$SiO_2$, $Nb_2O_5$—$TiO_2$, and $Nb_2O_5$—$SiO_2$—$TiO_2$, for example.

Among these materials, the composite materials containing $ZrO_2$ and mixed materials containing $ZrO_2$ have high transparency at a wavelength around 405 nm and also have excellent heat resistance. In at least a part of the material containing $ZrO_2$, a partially-stabilized zirconia or a stabilized zirconia obtained by adding any of CaO, MgO, and $Y_2O_3$ to substitute for a part of $ZrO_2$ may be used.

$ZnS$—$SiO_2$ is a material that is amorphous, and has a low thermal conductivity, a high transparency, a high refractive index, a high deposition rate when forming a film, an excellent mechanical property, and an excellent moisture resistance. $(ZnS)_{80}(SiO_2)_{20}$, in which the subscripts denote mole ratio, may be used for the dielectric layer 117.

It is possible to form the dielectric layer 113 or the dielectric layer 117 with two or more layers by stacking the above-mentioned oxides, etc. and mixture.

The dielectric layer 113 and the dielectric layer 117 have a function of adjusting an optical absorptance Ac (%) of the recording layer 115 in a crystalline phase, an optical absorptance Aa (%) of the recording layer 115 in an amorphous phase, an optical reflectance Rc (%) of the information recording medium 100 when the recording layer 115 is in a crystalline phase, an optical reflectance Ra (%) of the information recording medium 100 when the recording layer 115 is in an amorphous phase, an optical phase difference $\Delta\phi$ between a portion of the information recording medium 100 in which the recording layer 115 is in a crystalline phase, and a portion of the information recording medium 100 in which the recording layer 115 in an amorphous phase, by changing their optical path lengths (that is, a product nd of a refractive index n of the dielectric layer and a thickness d of the dielectric layer). In order to increase the amplitude of the signal reproduced from the recording mark and to enhance the signal quality, it is desirable that a reflectance difference |Rc−Ra| is large or a reflectance ratio Rc/Ra is high. It also is desirable for the Ac and Aa to be high so that the recording layer 115 absorbs the laser beam 10 more effectively. The optical path lengths in the dielectric layer 113 and the dielectric layer 117 are determined so that these conditions are satisfied at the same time. The optical path length satisfying these conditions can be determined accurately by, for example, a calculation based on a matrix method (see Hiroshi Kubota, "Wave Optics", Iwanami Shinsho, 1971, Chapter 3, for example). The optical path length nd is represented by nd=aλ, where n denotes the refractive index of the dielectric layer, d (nm) denotes the thickness of the dielectric layer, λ (nm) denotes the wavelength of the laser beam 10, and a denotes a positive number. When the information recording medium 100 is used as a Blu-ray Disc, for example, in order to increase the amplitude of the signal reproduced from the recording mark of the information recording medium 100 and improve the signal quality, the calculation based on the matrix method makes it possible to determine exactly the optical path length nd of each of the dielectric layer 113 and the dielectric layer 117 so that 18%≦Rc and Ra≦4% are satisfied. For example, when dielectric materials with a refractive index of 2 to 3 are used for the dielectric layer 113 and the dielectric layer 117, the thickness of the dielectric layer 113 preferably is 50 nm or less, and more preferably at least 3 nm but not more than 30 nm, and the thickness of the dielectric layer 117 is at least 20 nm but not more than 100 nm, and more preferably at least 30 nm but not more than 80 nm.

The interface layer 114 and the interface layer 116 will be described. The interface layer 114 is provided between the dielectric layer 113 and the recording layer 115 in order to prevent mass transfer from occurring therebetween due to repetitive recording. Likewise, the interface layer 116 is provided between the dielectric layer 117 and the recording layer 115 in order to prevent mass transfer from occurring therebetween due to repetitive recording. Here, the mass transfer means a phenomenon in which atoms are transferred one way or both ways between layers due to repetitive recording. For example, when $(ZnS)_{80}(SiO_2)_{20}$ (mol %) is used for the dielectric layer 113 or the dielectric layer 117, S of the ZnS is diffused into the recording layer 115 while the recording layer 115 is subject to repetitive rewriting under irradiation with the laser beam 10. Also, the interface layer 114 has a function of providing adhesion between the dielectric layer 113 and the recording layer 115 when it is poor therebetween, and the interface layer 116 has a function of providing adhesion between the dielectric layer 117 and the recording layer 115 when it is poor therebetween.

Preferably, a material containing sulfide is not used for the interface layer 114 and the interface layer 116. The material to be used for the interface layer 114 and the interface layer 116 preferably is a material that has an excellent adhesion to the recording layer 115 and has a high heat resistance so as not to be melted and decomposed when the recording layer 115 is irradiated with the laser beam 10. Oxide, nitride, carbide, boride, and fluoride, and a mixture of there can be used as the material.

As the oxide, there can be used $Al_2O_3$, CaO, $CeO_2$, $Cr_2O_3$, $Dy_2O_3$, $Ga_2O_3$, $Gd_2O_3$, $HfO_2$, $Ho_2O_3$, $In_2O_3$, $La_2O_3$, MgO, $Nb_2O_5$, $Nd_2O_3$, $Sc_2O_3$, $SiO_2$, $Sm_2O_3$, $SnO_2$, $Ta_2O_5$, $TiO_2$, $Y_2O_3$, $Yb_2O_3$, ZnO, $ZrO_2$, and $ZrSiO_4$, for example. As the nitride, there can be used AlN, BN, CrN, $Ge_3N_4$, HfN, NbN, $Si_3N_4$, TaN, TiN, VN, and ZrN, for example. As the carbide, there can be used C, $Al_4C_3$, $B_4C$, $CaC_2$, $Cr_3C_2$, HfC, $Mo_2C$, NbC, SiC, TaC, TiC, VC, $W_2C$, WC, and ZrC, for example. As the boride, there can be used B, $CaB_6$, $HfB_2$, $ZrB_2$, $TiB_2$, $TaB_2$, MoB, $NbB_2$, WB, $VB_2$, and $LaB_6$, for example. As the fluoride, there can be used $CaF_2$, $CeF_3$, $DyF_3$, $ErF_3$, $GdF_3$, $HoF_3$, $LaF_3$, $MgF_2$, $NdF_3$, $YF_3$, and $YbF_3$, for example.

As the mixture, there can be used $ZrO_2$—$Cr_2O_3$, $ZrSiO_4$—$Cr_2O_3$, $ZrO_2$—$SiO_2$—$Cr_2O_3$, $ZrO_2$—$SiO_2$—$Cr_2O_3$—$LaF_3$, $ZrO_2$—$Ga_2O_3$, $ZrSiO_4$—$Ga_2O_3$, $ZrO_2$—$SiO_2$—$Ga_2O_3$, $ZrO_2$—$In_2O_3$, $ZrSiO_4$—$In_2O_3$, $ZrO_2$—$SiO_2$—$In_2O_3$, $ZrO_2$—SiC, $ZrSiO_4$—SiC, $ZrO_2$—$SiO_2$—SiC, $HfO_2$—$Cr_2O_3$, $HfO_2$—$SiO_2$—$Cr_2O_3$, $HfO_2$—$Ga_2O_3$, $HfO_2$—$SiO_2$—$Ga_2O_3$, $HfO_2$—$In_2O_3$, $HfO_2$—$SiO_2$—$In_2O_3$, $HfO_2$—SiC, $HfO_2$—$SiO_2$—SiC, $SnO_2$—$Ga_2O_3$, $SnO_2$—$In_2O_3$, $SnO_2$—SiC, $SnO_2$—$Si_3N_4$, $SnO_2$—$Ga_2O_3$—SiC, $SnO_2$—$Ga_2O_3$—$Si_3N_4$, $SnO_2$—$Nb_2O_5$, $SnO_2$—$Ta_2O_5$, $Cr_2O_3$—ZnO, $Cr_2O_3$—$Al_2O_3$, $Cr_2O_3$—$CeO_2$, $Cr_2O_3$—$Dy_2O_3$, $Cr_2O_3$—$Ga_2O_3$, $Cr_2O_3$—$In_2O_3$, $Cr_2O_3$—MgO, $Cr_2O_3$—$Nb_2O_5$, $Cr_2O_3$—$SiO_2$, $Cr_2O_3$—$SnO_2$, $Cr_2O_3$—$TiO_2$, $Cr_2O_3$—$Ta_2O_5$, $Cr_2O_3$—$Y_2O_3$, $Cr_2O_3$—$LaF_3$, $Cr_2O_3$—B, $Cr_2O_3$—$TiB_2$, ZnO—$SiO_2$, ZnO—$ZrO_2$, ZnO—$HfO_2$, and ZnO—$Al_2O_3$, for example.

Among these materials, the composite materials containing $ZrO_2$ or the mixed materials containing $ZrO_2$ preferably are used for the interface layer 114 and the interface layer 116 because they have a high transparency at a wavelength around 405 nm and also have an excellent heat resistance. In at least a part of the material containing $ZrO_2$, a partially-stabilized zirconia or a stabilized zirconia obtained by adding any of CaO, MgO, and $Y_2O_3$ to $ZrO_2$ to substitute for a part of $ZrO_2$ may be used. Among the composite materials containing $ZrO_2$ or the mixed materials containing $ZrO_2$, the materials containing $ZrO_2$, $SiO_2$, and $Cr_2O_3$ (a material composed of $ZrO_2$, $SiO_2$, and $Cr_2O_3$, for example) are more preferable because they have a more excellent adhesion to the recording layer 115 in addition to a higher transparency and a higher heat resistance.

Preferably, the interface layer 114 and the interface layer 116 have a thickness of at least 0.3 nm but not more than 10 nm, and more preferably a thickness of at least 0.5 nm but not more than 7 nm. The interface layers 114 and 116 with a larger thickness may change the optical reflectance and the optical absorptance of a stack of layers from the reflective layer 112 to the dielectric layer 117 formed on the surface of the substrate 101 and affect the recording and erasing performances. When the interface layers 114 and 116 each have a thickness of less than 0.3 nm, their functions of preventing the mass transfer may be reduced.

When the dielectric layer 113 is composed of a material that is free from sulfide and Zn and also has an excellent adhesion to the recording layer 115, the interface layer 114 is provided, only if needed. Likewise, when the dielectric layer 117 is composed of a material that is free from sulfide and Zn and also has an excellent adhesion to the recording layer 115, the interface layer 116 is provided, only if needed.

The recording layer 115 of the present invention is a recording layer whose phase can change, and contains antimony (Sb), carbon (C) and the light element (L) having an atomic weight of less than 33. This material composition makes it possible to obtain a phase-change recording material having all of the high crystallization rate, the large optical variation, and the high crystallization temperature.

Sb is a material that is crystallized very easily, and has a crystallization temperature of approximately 90° C. Although an Sb film formed by sputtering is in an amorphous state, it is crystallized gradually when left at room temperature. Thus, containing Sb alone is not sufficient enough for the film to obtain a stable amorphous state. In short, it is difficult to ensure an excellent recording mark storage stability on the film.

C has a function of solving such problems that Sb has. Adding C besides Sb makes it possible to keep the crystallization rate high and raise the crystallization temperature to 200° C. or more. C also has a function of increasing an optical variation of the recording layer 115 between the amorphous state and the crystalline state.

Adding further the light element (L) having an atomic weight of less than 33 thereto makes it possible to adjust the crystallization rate without lowering the crystallization temperature. More preferably, the L is at least one element selected from B, N, O, Mg, Al, and S. Materials containing these elements out of light elements are excellent in production, cost, and environment.

The properties required for the material to be used for a high-speed recording at 4× speed or more are, for example, a high crystallization rate that allows a high speed recording, and a high crystallization temperature that allows stable storage of the recording marks.

The crystallization temperature surely can be raised by adding the element having an atomic weight of 33 or more, such as a transition metal (a second transition element and a third transition element) and a noble metal, besides Sb. However, adding the element having an atomic weight of 33 or more causes a side effect of lowering the crystallization temperature. When the addition amount of the element is 20 atom % or so, it is difficult for the material to be used at a speed of 4× speed or higher. In contrast, adding C besides Sb makes it possible to raise the crystallization temperature without lowering the crystallization rate. Accordingly, the material can be used at a speed of 4× speed or higher even when it contains approximately 50 atom % of C. Since adding the transition metal or the noble metal besides Sb and C also lowers the crystallization rate, the concentration of the transition metal or the noble metal to be added is approximately 10 atom % at most so as to use the material at a speed of 4× or higher.

In contrast, the recording layer 115 of the present invention composed of the material containing the light element (L) having an atomic weight of less than 33 besides Sb and C can have both of the high crystallization temperature and the high crystallization rate by adjusting the concentrations of C and the L. The material can contain C and the L up to 50 atom % in total even when it is used at a speed of 4× speed or higher. As mentioned above, the recording material containing Sb, C and the L has an advantage that it can contain C and the L in sufficiently wide composition ranges even when it is used at a high speed. Thus, with the present invention, it is possible to make fine adjustments on the crystallization rate, the crystallization temperature, and the optical variation of the recording layer by adjusting appropriately the concentrations of C and the L to be added. Thereby, the present invention also has an effect of increasing the design freedom for the recording media.

When the optical variation is defined as a difference $D_{n+k}$ ($|n_c-n_a|+|k_c-k_a|$) between a complex refractive index of the amorphous state recording layer ($n_a-ik_a$, where $n_a$ denotes a refractive index and $k_a$ denotes an extinction coefficient) and a complex refractive index of the crystalline state recording layer ($n_c-ik_c$, where $n_c$ denotes a refractive index and $k_c$ denotes an extinction coefficient), the optical variation increases when $D_{n+k}$ increases. For example, $D_{n+k}$ of $Sb_{80}C_{15}B_5$ is 1.9, and $D_{n+k}$ of $Sb_{80}C_{15}N_5$ also is 1.9. In contrast, $D_{n+k}$ of $Sb_{85}Ge_{15}$ is 1.6. Particularly, adding C and the L besides Sb decreases $k_a$, allowing $|k_c-k_a|$ to be increased.

Also, the recording layer 115 of the present invention may be composed of a material represented by $Sb_{100-x-y}C_xL_y$, where x and y satisfy $x+y \leq 50$. Preferably, the total composition ratio of C and the L is 50 atom % or less. The total composition ratio of C and the L exceeding 50 atom % may lower the crystallization rate of the recording layer 115 and make the crystallization of the recording layer 115 insufficient at a transfer rate corresponding to 4× speed, leading to deteriorated recording/erasing properties. Moreover, in order to ensure the stability of the amorphous state at a low transfer rate, the total composition ratio of C and the L preferably is 30 atom % or more in the present embodiment. The compositions of C and the L may be selected so as to be optimal to the transfer rate. Preferably they are selected so that $x \geq y$ is satisfied in order to maintain the large optical variation and the high crystallization rate. Here, the composition of the recording layer containing Sb, C, and the L can be analyzed by an X-ray microanalyser (XMA), for example. This is a method for analyzing the species and compositions of the elements contained in a sample by measuring the wavelength and intensity of a characteristic X ray generated when the sample is irradiated with an electron beam.

The recording layer 115 formed by sputtering contains unavoidably rare gases (Ar, Kr, and Xe), moisture (O—H), an organic substance (C), and air (N and O) present in the sputtering atmosphere, components (metal) of a jig placed in the sputtering chamber, impurities contained in the sputtering target (metal, semimetal, a semiconductor, and a dielectric substance), etc., which are detected by an analysis by the XMA or the like in some cases. The total content of these unavoidably-contained components in the recording layer may be 10 atom % at most when the sum total of all atoms contained in the recording layer is taken as 100 atom %, and Sb, C, and the L except for the unavoidably-contained components should satisfy a relationship of $Sb_{100-x-y}C_xL_y$, where $x+y \leq 50$. More specifically, in this specification, the phrase "the recording layer 115 is composed of a material represented by $Sb_{100-x-y}C_xL_y$, where x and y satisfy $x+y \leq 50$" is meant to include a case where the unavoidable components mentioned above are contained in the recording layer 115. This is applied also to recording layers 215, 225, 315, 325, 335, 415, 425, 435, 445, and 603 to be described in embodiments below.

Examples of the specific composition of the recording layer 115 include Sb—C—B, Sb—C—B—N, Sb—C—B—O, Sb—C—B—Mg, Sb—C—B—Mg—N, Sb—C—B—Mg—O, Sb—C—B—Mg—N—O, Sb—C—B—Al, Sb—C—B—Al—N, Sb—C—B—Al—O, Sb—C—B—Al—N—O, Sb—C—B—S, Sb—C—B—S—N, Sb—C—B—S—O, Sb—C—B—S—N—O, Sb—C—N, Sb—C—N—O, Sb—C—N—Mg, Sb—C—N—Mg—O, Sb—C—N—Al, Sb—C—N—Al—O, Sb—C—N—S, Sb—C—N—S—O, Sb—C—O, Sb—C—O—Mg, Sb—C—O—Al, Sb—C—O—S, Sb—C—Mg, Sb—C—Mg—Al, Sb—C—Mg—Al—N, Sb—C—Mg—Al—O, Sb—C—Mg—Al—N—O, Sb—C—Mg—S, Sb—C—Mg—S—N, Sb—C—Mg—S—O, Sb—C—Mg—S—N—O, Sb—C—Al, Sb—C—Al—S, Sb—C—Al—S—N, Sb—C—Al—S—O, Sb—C—Al—S—N—O, and Sb—C—S.

Preferably, the recording layer 115 of the present invention has a thickness of 15 nm or less. When the thickness of the recording layer 115 is 15 nm or less, the recording layer 115 can obtain satisfactory recording/erasing properties in the configuration of the information recording medium 100 in the case where the information recording medium 100 has a capacity of 25 GB or more and is used at a transfer rate of 4× speed or more. When the thickness of the recording layer 115 exceeds 15 nm, the heat capacity of the recording layer 115 is increased and the laser power needed for recording is increased. Also, the thickness of the recording layer 115 exceeding 15 nm makes it difficult to diffuse the heat generated in the recording layer 115 toward the reflective layer 112, and makes it difficult to form small recording marks necessary for high density recording. Further preferably, the recording layer 115 has a thickness of at least 8 nm but not more than 14 nm. When the thickness of the recording layer 115 is in this range, satisfactory recording/erasing properties can be obtained not only at a high transfer rate of 4× speed or more but also at a low transfer rate of 2× speed or less. This allows the information recording medium 100 to be used at a constant angular velocity (CAV), in which the number of rotations of the medium is constant.

Subsequently, the method for producing the information recording medium 100 of the Embodiment 1 will be described. The information recording medium 100 is produced as follows. The substrate 101 with the guide grooves (the groove surface and the land surface) formed thereon is set in a sputtering apparatus. On a surface of the substrate 101 on which the guide grooves are formed, the steps of forming the reflective layer 112, forming the dielectric layer 113, forming the interface layer 114, forming the recording layer 115, forming the interface layer 116, and forming the dielectric layer 117 are performed sequentially, and furthermore, the step of forming the transparent layer 102 on the surface of the dielectric layer 117.

Figure 9:
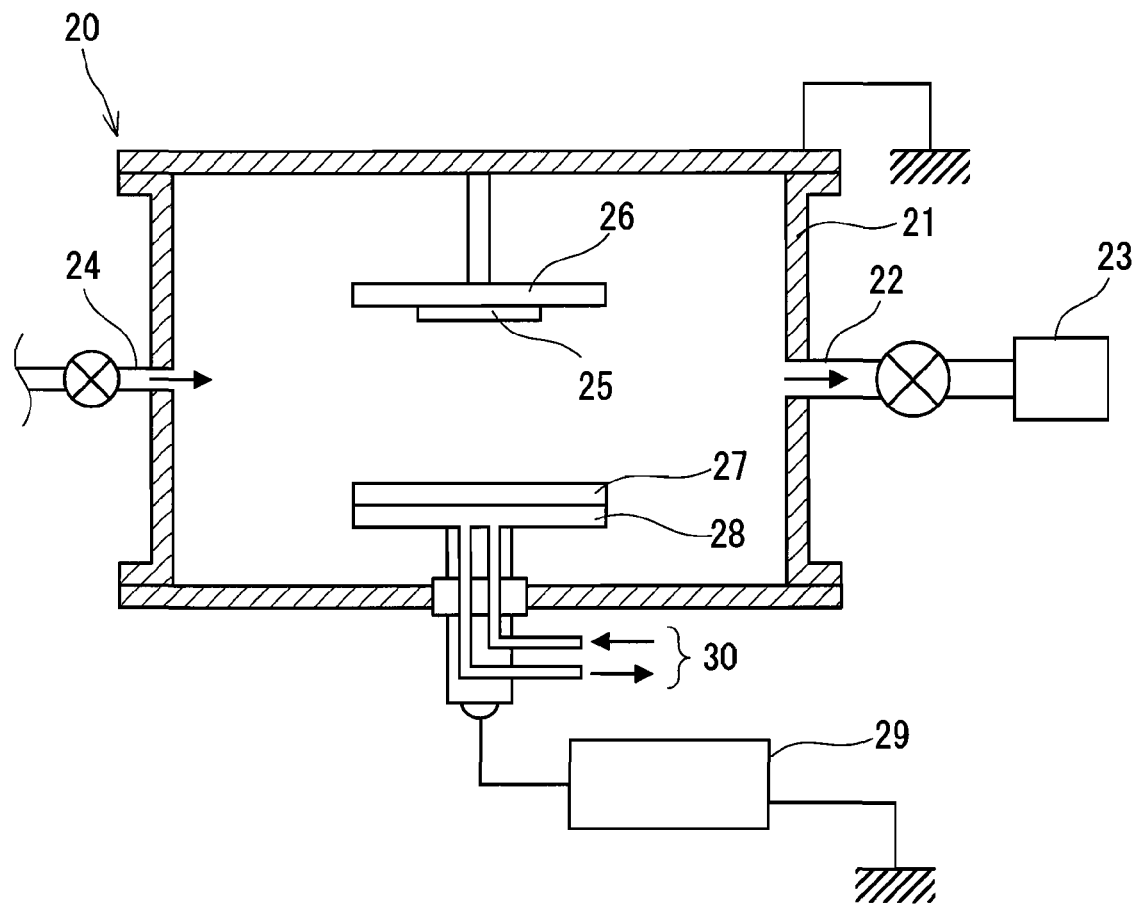
FIG. 9 is a schematic view showing an example of a sputtering apparatus used in the method for producing the information recording medium of the present invention.

Here, an example of the sputtering (film forming) apparatus for producing the information recording medium will be described. FIG. 9 shows an example of a bipolar glow discharge sputtering apparatus 20. A vacuum pump 23 is connected to a gas outlet 22 so as to maintain an interior of a sputtering chamber 21 under a high vacuum. A constant flow amount of a sputtering gas (such as Ar gas) is introduced from a sputtering gas inlet 24. A substrate 25 is attached to a substrate holder (an anode) 26, and a sputtering target (a cathode) 27 is fixed to a sputtering target electrode 28 to be connected to a power supply 29. Applying a high voltage between the two electrodes causes a glow discharge, and accelerates Ar positive ions, for example, and make them collide with the sputtering target 27 to sputter the sputtering target 27. Particles thus sputtered are deposited on the substrate 25 to form a thin film. In order to cool the sputtering target 27 during sputtering, water is circulated through the electrode 28 (reference numeral 30 in the figure indicates the circulating water). There are two types for the sputtering apparatus 20, direct current type and high frequency type, depending on the type of the power supply applied to the cathode. The sputtering apparatus 20 may be constituted by a plurality of the sputtering chambers 21 connected to each other, or a plurality of the sputtering targets 27 may be set in the sputtering chamber 21. When thus configured, the sputtering apparatus 20 can perform a plurality of the film forming steps to form a multilayer film. The same apparatus can be used also for sputterings performed in the embodiments below. As the substrate 25, it is possible to use the substrate 101, and substrates 201, 301, 401, 501, and 601 (see FIG. 1 to FIG. 6) described in the present embodiment and Embodiments 2 to 6 to be described later.

Figure 10:
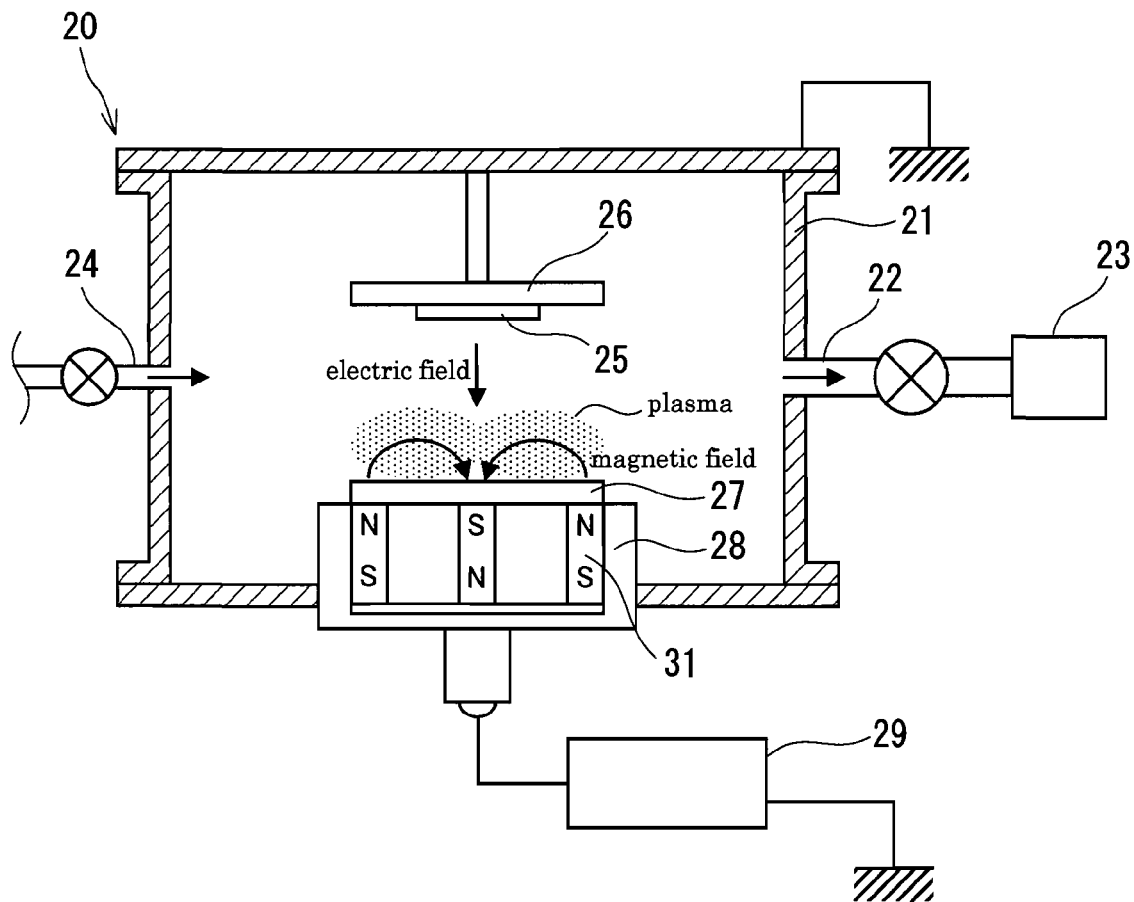
FIG. 10 is a schematic view showing another example of the sputtering apparatus used in the method for producing the information recording medium of the present invention.

Another example of the sputtering apparatus will be described. FIG. 10 shows an example of a direct current (DC) magnetron sputtering equipment 20. Since the members in FIG. 10 indicated with the same reference numerals as those in FIG. 9 are the same as the members described with reference to FIG. 9, descriptions thereof may be omitted. The vacuum pump 23 is connected to the gas outlet 22 so as to maintain the interior of the sputtering chamber 21 under a high vacuum. A gas cylinder (such as an Ar gas cylinder) is connected to the sputtering gas inlet 24 so that a constant flow amount of sputtering gas (such as Ar gas) is introduced therethrough. In magnetron sputtering, a permanent magnet 31 disposed on a rear surface of the sputtering target 27 generates a magnetic field on a front surface of the sputtering target 27, and plasma are concentrated most to an area where the magnetic field line intersects perpendicularly with an electric field line. Thus, more particles are sputtered. There are two types for the sputtering apparatus 20: one is direct current type and the other is high frequency (RF) type, depending on the type of the power supply applied to the cathode. In the RF magnetron sputtering apparatus, instead of the direct current power supply 29, an impedance matching circuit and a high frequency power supply are connected to the cathode. The circulating water 30 shown in FIG. 9 is omitted in FIG. 10.

In this specification including the descriptions below, when referring to a "surface" of each of the layers, it means, unless otherwise noted, a surface (surface perpendicular to a thickness direction) exposed when the layer is formed.

The first to be performed is the step of forming the reflective layer 112 on the surface of the substrate 101 on which the guide grooves are formed. The reflective layer 112 is formed by sputtering the sputtering target containing metal or an alloy composing the reflective layer 112. The sputtering may be performed in a rare gas atmosphere or in a mixed gas atmosphere of a rare gas and at least one selected from oxygen gas and nitrogen gas, by using the direct current power supply or the high frequency power supply. Any of Ar gas, Kr gas, and Xe gas may be used as the rare gas.

For the sputtering target for forming the reflective layer 112, a material containing at least one of Al, Au, Ag, and Cu, or an alloy of these may be used. Depending on the sputtering apparatus used, the composition of the reflective layer formed may not be the same as the composition of the sputtering target. In this case, the composition of the sputtering target is adjusted so as to obtain the reflective layer 112 with a desired composition. As the sputtering target, there can be used, for example, a sputtering target obtained by melting powder and alloying it to harden, and a sputtering target obtained by hardening powder at a high temperature and a high pressure, regardless of the production method thereof. For example, when an Ag—Cu alloy is formed as the reflective layer 112, an Ag—Cu alloy sputtering target may be used.

Next, the step of forming the dielectric layer 113 on a surface of the reflective layer 112 is performed. The dielectric layer 113 also is formed by sputtering the sputtering target containing an element, a mixture, or a compound composing the dielectric layer 113. The sputtering may be performed in a rare gas atmosphere or in a mixed gas atmosphere of a rare gas and at least one selected from oxygen gas and nitrogen gas, by using the high frequency power supply. The direct current power supply or a pulse-generating-type direct current power supply may be used, if possible. Any of Ar gas, Kr gas, and Xe gas may be used as the rare gas.

For the sputtering target for forming the dielectric layer 113, oxide, sulfide, selenide, nitride, carbide, fluoride, and a mixture of these can be used. The material and the composition of the sputtering target are determined so that the material of the dielectric layer 113 can be formed. Depending on the sputtering apparatus used, the composition of the dielectric layer formed may not be the same as the composition of the sputtering target. In this case, the composition of the sputtering target is adjusted so as to obtain the dielectric layer 113 with a desired composition. When the dielectric layer containing oxide is formed, the oxide may be oxygen-deficient during sputtering. Thus, the sputtering target that hardly causes oxygen deficiency may be used, or the sputtering may be performed in an atmosphere in which a rare gas is mixed with as little as 10% or less of oxygen gas. Also, the dielectric layer 113 may be formed by sputtering reactively the sputtering target composed of a metal material, a semimetal material, or a semiconductor material in an atmosphere in which a rare gas is mixed with as much as 10% or more of oxygen gas and/or nitrogen gas.

The dielectric layer 113 also may be formed by sputtering the sputtering targets, each composed of a single compound, at the same time with a plurality of the power supplies. The dielectric layer 113 also may be formed by sputtering sputtering targets, each composed of at least two compounds such as a binary sputtering target and a ternary sputtering target, at the same time with a plurality of the power supplies. When these sputtering targets are used, the sputtering also may be performed in a rare gas atmosphere or in a mixed gas atmosphere of a rare gas and at least one selected from oxygen gas and nitrogen gas.

Next, the step of forming the interface layer 114 on a surface of the dielectric layer 113 is performed. The interface layer 114 also is formed by sputtering a sputtering target containing an element, a mixture, or a compound composing the interface layer 114. The sputtering may be performed in a rare gas atmosphere or in a mixed gas atmosphere of a rare gas and at least one selected from oxygen gas and nitrogen gas, by using the high frequency power supply. The direct current power supply or the pulse-generating-type direct current power supply may be used, if possible. Any of Ar gas, Kr gas, and Xe gas may be used as the rare gas.

For the sputtering target for forming the interface layer 114, oxide, nitride, carbide, boride, fluorides, and a mixture of these can be used. The material and the composition of the sputtering target are determined so that the material for the interface layer 114 can be formed. Depending on the sputtering apparatus used, the composition of the interface layer formed may not the same as the composition of the sputtering target. In this case, the composition of the sputtering target is adjusted so as to obtain the interface layer 114 with a desired composition. When the interface layer containing oxide is formed, the oxide may be oxygen-deficient during sputtering. Thus, the sputtering target that hardly causes oxygen deficiency may be used, or the sputtering may be performed in an atmosphere in which a rare gas is mixed with as little as 10% or less of oxygen gas. Also, the interface layer may be formed by sputtering reactively the sputtering target composed of a metal material, a semimetal material, or a semiconductor material in an atmosphere in which a rare gas is mixed with as much as 10% or more of oxygen gas and/or nitrogen gas.

The interface layer 114 also may be formed by sputtering the sputtering targets, each composed of a single compound, at the same time with a plurality of the power supplies. The interface layer 114 also may be formed by sputtering sputtering targets, each composed of at least two compounds such as a binary sputtering target and a ternary sputtering target, at the same time with a plurality of the power supplies. When these sputtering targets are used, the sputtering also may be performed in a rare gas atmosphere or in a mixed gas atmosphere of a rare gas and at least one selected from oxygen gas and nitrogen gas.

Next, the step of forming the recording layer 115 of the present invention on a surface of the interface layer 114 is performed. The recording layer 115 can be formed by using at least the sputtering target containing Sb and sputtering the sputtering target containing Sb. Hereinafter, the methods for forming the recording layers 115 composed of various materials will be described.

When the material contains at least one of B, Mg, and Al as the light element L, more specifically, when the recording layer 115 containing Sb, C, and the L (B, Mg, and/or Al) is formed, the recording layer 115 can be formed by: setting an Sb—C-L sputtering target (containing Sb, C, and the L) in the sputtering chamber and sputtering it; setting two or more of the Sb—C-L sputtering targets having a different composition ratio from each other in the sputtering chamber and sputtering them at the same time; setting an Sb sputtering target, a C sputtering target, and an L sputtering target in the sputtering chamber and sputtering them at the same time; setting an Sb—C sputtering target, an Sb sputtering target, and an L sputtering target in the sputtering chamber and sputtering them at the same time; setting an Sb—C sputtering target and an L sputtering target in the sputtering chamber and sputtering them at the same time; setting an Sb-L sputtering target and a C sputtering target in the sputtering chamber and sputtering them at the same time; or setting an Sb sputtering target and a C-L sputtering target in the sputtering chamber and sputtering them at the same time. These sputterings may be performed in a rare gas atmosphere. Any of Ar gas, Kr gas, and Xe gas may be used as the rare gas. Furthermore, when the recording layer 115 contains N and/or O, the recording layer 115 may be formed by reactive sputtering in a mixed gas atmosphere of a rare gas and at least one selected from oxygen gas and nitrogen gas.

When the material contains S as the light element L, more specifically, when the recording layer 115 containing Sb, C, and S is formed, the recording layer 115 can be formed by: setting a sputtering target containing Sb—C—S in the sputtering chamber and sputtering it; setting two or more of the Sb—C—S sputtering targets having a different composition ratio from each other in the sputtering chamber and sputtering them at the same time; setting an Sb—S sputtering target and a C sputtering target in the sputtering chamber and sputtering them at the same time; or setting an Sb sputtering target and a C—S sputtering target in the sputtering chamber and sputtering them at the same time. These sputterings may be performed in a rare gas atmosphere. Any of Ar gas, Kr gas, and Xe gas may be used as the rare gas. Furthermore, when the recording layer 115 contains N and/or O, the recording layer 115 may be formed by reactive sputtering in a mixed gas atmosphere of a rare gas and at least one selected from oxygen gas and nitrogen gas.

When the material contains N and/or O as the light element L, more specifically, when the recording layer 115 containing Sb, C, and the L is formed, the recording layer 115 can be formed by: setting a sputtering target containing Sb—C in the sputtering chamber and sputtering it reactively in a mixed gas atmosphere of a rare gas and at least one selected from oxygen gas and nitrogen gas; setting an Sb sputtering target and a C sputtering target in the sputtering chamber and sputtering them reactively at the same time in a mixed gas atmosphere of a rare gas and at least one selected from oxygen gas and nitrogen gas; or sputtering a sputtering target containing Sb, C, and at least one of N and O in a rare gas atmosphere or in a mixed gas atmosphere of a rare gas and at least one selected from a small amount of oxygen gas and a small amount of nitrogen gas.

Any of these methods makes it possible to form the recording layer composed of the material represented by the formula (1): $Sb_{100-x-y}C_xL_y$, where x and y satisfy $x+y \leq 50$. For example, when the sputtering target containing Sb—C-L is used, the composition of the recording layer formed may not be the same as the composition of the sputtering target depending on the sputtering apparatus used. In this case, the composition of the sputtering target containing Sb—C-L is adjusted so as to obtain the recording layer 115 with the composition represented by the formula (1). When a plurality of sputtering targets are sputtered at the same time, the output from each of the power supplies is adjusted to control the composition of the film formed so that the recording layer 115 with the composition represented by the formula (1) can be obtained. In the case of reactive sputtering, in addition to the adjustments of the sputtering target composition and the power supply output, the flow rates and pressures of oxygen gas and nitrogen gas, and the ratios of the flow rates and the pressures of oxygen gas and nitrogen gas with respect to the rare gas are adjusted so that the recording layer 115 with the composition represented by the formula (1) can be obtained.

The sputtering target of the present invention to be used for forming the recording layer of the present invention will be described. The sputtering target contains at least antimony (Sb) and carbon (C). It further may contain the light element (L) having an atomic weight of less than 33. In this case, the L may be at least one element selected from B, N, O, Mg, Al, and S. Or the L may be at least one element selected from B, Mg, Al, and S. The recording layer containing Sb, C, and the L can be formed by sputtering the sputtering target.

Since C, which has a high melting point, has a lower sputtering rate than that of Sb, the composition ratio of C contained in the sputtering target preferably is higher than the composition ratio of C contained in the recording layer by 5% to 20%. Although the amount of increase in C depends on the sputtering apparatus and sputtering conditions used, the composition ratio of the sputtering target for forming the recording layer with a composition of $Sb_{50}O_{50}$ may be in the range of $Sb_{47.5}C_{52.5}$ to $Sb_{40}O_{60}$, for example. The preferable composition ratio of the Sb—C-L sputtering target can be determined so that the recording layer has a desired composition ratio when analyzed with the X-ray microanalyser.

The recording layer 115 of the present embodiment contains Sb, C, and at least one of B, Mg, Al, and S as the L, the Sb—C-L sputtering target may be sputtered for forming the recording layer 115. When the recording layer 115 further contains N and/or O, the recording layer 115 may be formed by reactive sputtering in a mixed gas atmosphere of a rare gas and at least one selected from oxygen gas and nitrogen gas.

The recording layer 115 containing Sb, C, and at least one of N and O may be formed by sputtering reactively an Sb—C sputtering target in a mixed gas atmosphere of a rare gas and at least one selected from oxygen gas and nitrogen gas. Or it may be formed by sputtering a sputtering target containing Sb, C, and at least one selected from N and O in a rare gas atmosphere or in a mixed gas atmosphere of a rare gas and at least one selected from a small amount of oxygen gas and a small amount of nitrogen gas.

Next, an example of the method for producing the sputtering target of the present invention will be described. For example, the method for producing the sputtering target containing antimony (Sb), carbon (C), and aluminum (Al) will be described. Sb powder, C powder, and Al powder, each having a high purity and a predetermined particle size, are prepared. Then, they are weighed and mixed at a predetermined mixing ratio, and put in a hot press apparatus. The hot press apparatus is evacuated, if needed, and the mixture of the powders is held at a predetermined high pressure and high temperature for a predetermined period of time to be sintered. Mixing the powders sufficiently allows the resulting sputtering target to have a uniform composition in plane and thickness directions. Moreover, optimizing the conditions of pressure, temperature, and period of time enhances the filling properties of the powders, allowing the sputtering target with a high density to be produced. Thus, the sputtering target containing Sb, C, and Al at a predetermined composition ratio is completed. The sputtering target may be bonded, for example, to a copper plate with a smooth surface after the sintering by using a solder made of In or the like, if needed. When thus prepared, the sputtering target can be set in the sputtering apparatus to be sputtered. Preferably, the sputtering target has a high density (the density means the filling rate of the powder when the state in which the powder is filled without any gaps is defined as 100%.) The density of the sputtering target preferably is 80% or higher, and more preferably 90% or higher.

Here, the mixture of the powders may contain not only a single element powder, such as the Sb powder, the C powder, and the Al powder, but also powder of a compound. For example, the Sb powder, the C powder, and an Sb—Al powder, each having a high purity and a predetermined particle size, may be mixed, or the Sb powder and an Al—C powder may be mixed. Or an Sb—C powder and the Al powder may be mixed. The sputtering target can be produced in any of the combinations of the powders by using the above-mentioned method.

Next, the step of forming the interface layer 116 on a surface of the recording layer 115 is performed. The interface layer 116 may be formed by the same method as that for forming the interface layer 114.

Next, the step of forming the dielectric layer 117 on a surface of the interface layer 116 is performed. The dielectric layer 117 may be formed by the same method as that for forming the dielectric layer 113.

Next, the step of forming the transparent layer 102 will be described. After the dielectric layer 117 is formed, the substrate 101 on which the layers from the reflective layer 112 to the dielectric layer 117 have been stacked sequentially is taken out from the sputtering apparatus. Then, an ultraviolet curable resin is applied to a surface of the dielectric layer 117 by, for example, a spin coat method, and the resin is irradiated with an ultraviolet ray to be cured. Thus, the transparent layer 102 with a desired thickness can be formed. The transparent layer 102 also can be formed by applying the ultraviolet curable resin to the surface of the dielectric layer 117 by the spin coat method, adhering a disc-shaped sheet to the applied ultraviolet curable resin, irradiating the resin with an ultraviolet ray from a sheet side to cure the resin. The transparent layer 102 also can be formed by adhering a disc-shaped sheet having an adhesive layer to the dielectric layer 117.

The transparent layer 102 may include a plurality of layers having different properties from each other. The transparent layer 102 may be formed after another transparent layer is formed on the surface of the dielectric layer 117. Or another transparent layer may be formed on a surface of the transparent layer 102 after the transparent layer 102 is formed on the surface of the dielectric layer 117. These transparent layers may have a different viscosity, hardness, refractive index, and transparency from each other. In this way, the step of forming the transparent layer is completed.

After the completion of the step of forming the transparent layer, an initialization step is performed, if needed. The initialization step is a step of crystallizing the amorphous state recording layer 115 by irradiating the recording layer 115 with, for example, a semiconductor laser so that the recording layer 115 has a temperature equal to or higher than its crystallization temperature. The initialization step can be performed in a satisfactory manner by optimizing the power of the semiconductor laser, the rotating speed of the information recording medium, the moving speed of the semiconductor laser in a diameter direction, the focal point of the laser, etc. The initialization step may be performed before the step of forming the transparent layer. In this way, the steps from the step of forming the reflective layer 112 to the step of forming the transparent layer 102 are performed sequentially to produce the information recording medium 100 of the Embodiment 1.

In the present embodiment, the sputtering method is used as the method for forming each of the layers. However, the method is not limited to this, and a vacuum vapor deposition method, an ion plating method, a chemical vapor deposition (CVD) method, a molecular beam epitaxy (MBE) method, etc. also can be used.

Embodiment 2

Figure 2:
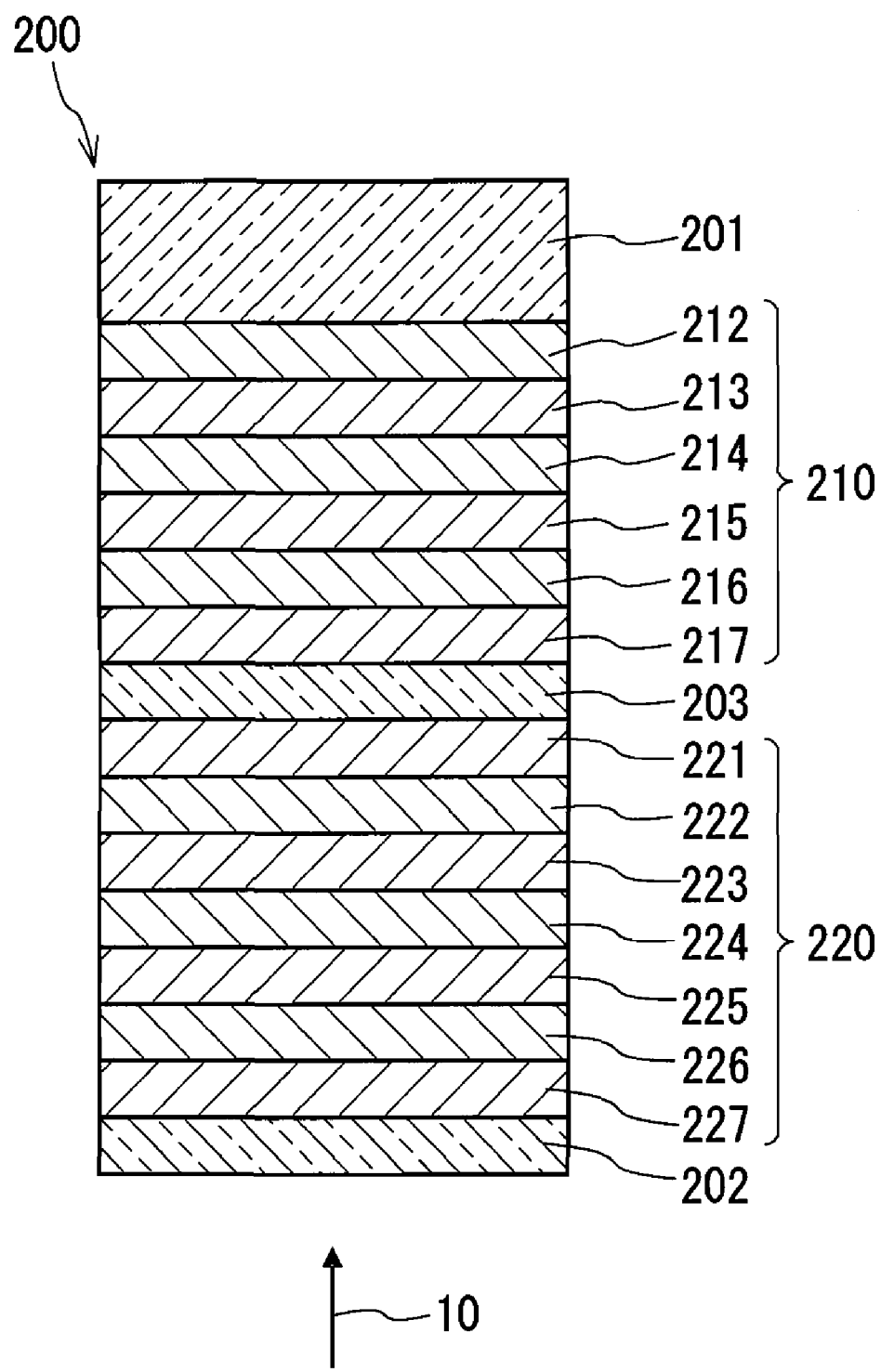
FIG. 2 is a partial sectional view showing another example of the information recording medium of the present invention.

An example of the information recording medium will be described as Embodiment 2 of the present invention. FIG. 2 shows a partial sectional view of an information recording medium 200 as the example. In the information recording medium 200, a first information layer 210, an interlayer 203, a second information layer 220, and a transparent layer 202 are formed sequentially on a substrate 201. The first information layer 210 is formed of a reflective layer 212, a dielectric layer 213, an interface layer 214, a recording layer 215, an interface layer 216, and a dielectric layer 217 disposed in this order on one surface of the substrate 201. The second information layer 220 is formed of a dielectric layer 221, a reflective layer 222, a dielectric layer 223, an interface layer 224, a recording layer 225, an interface layer 226, and a dielectric layer 227 disposed in this order on one surface of the interlayer 203.

The laser beam 10 is incident from a transparent layer 202 side also in the present embodiment. The laser beam 10 that has passed through the second information layer 220 is used to record and reproduce information on and from the first information layer 210. In the information recording medium 200, information can be recorded on each of the two recording layers. For example, it is possible to obtain the information recording medium having a capacity of 50 GB, which is approximately 2 times larger than the medium capacity of the Embodiment 1, when the laser beam with a wavelength around 405 nm in a blue-violet region is used for recording and reproducing information. The information recording medium 200 also may be used at CAV.

Optically, it is preferable that the two information layers have almost the same effective reflectance as each other. This is achieved by adjusting the reflectance of the first information layer 210 and the transmittance of the second information layer 220, respectively. The present embodiment describes, for example, a configuration in which the Rc is set to 5% and the Ra is set approximately to 1% as the effective reflectance. The effective reflectance is defined as the reflectance of each of the two information layers measured when they are stacked. In order to allow the second information layer 220 to have a transmittance of approximately 50%, the first information layer 210 is designed so that the first information layer 210 alone has Rc of approximately 20% and Ra of approximately 4%, and the second information layer 220 is designed so that the second information layer 220 alone has Rc of approximately 5% and Ra of approximately 1%.

Hereinafter, descriptions will be made in order, starting from the configuration of the first information layer 210. Descriptions for the substrate 201 and the layers from the reflective layer 212 to the dielectric layer 217 of the first information layer 210 are the same as those made for the substrate 101 and the layers from the reflective layer 112 to the dielectric layer 117 in the Embodiment 1. Thus, detailed descriptions are omitted.

The interlayer 203 has a function of separating the focal point of the laser beam 10 in the second information layer 220 from the focal point of the laser beam 10 in the first information layer 210. Guide grooves of the second information layer 220 may be formed on the interlayer 203, if needed. The interlayer 203 can be composed of an ultraviolet curable resin. Desirably, the interlayer 203 is transparent with respect to a beam with wavelength $\lambda$ used for recording and reproducing so as to allow the laser beam 10 to reach the first information layer 210 effectively. The thickness of the interlayer 203 preferably is determined so that: (1) the thickness is larger than a focal depth determined by the numerical aperture of the objective lens and the wavelength of the laser beam; (2) a distance between the recording layer 215 and the recording layer 225 is in a range where the laser beam can be focused through the objective lens; and (3) the sum total of the thickness of the interlayer 203 and the thickness of the transparent layer 202 falls within the tolerance of the substrate thickness allowed by the object lens. Accordingly, the thickness of the interlayer 203 preferably is at least 10 μm but not more than 40 μm. The interlayer 203 may be formed by stacking a plurality of resin layers, if needed. For example, the interlayer 203 may be composed of two or more layers, one of which is a layer for protecting the dielectric layer 217 and one of which is a layer having the guide grooves.

Next, the configuration of the second information layer 220 will be described. The second information layer 220 has a high transmittance so as to allow the laser beam 10 to reach the first information layer 210. Specifically, 40%$\leq$(Ta+Tc)/2 preferably is satisfied, where Tc (%) denotes the optical transmittance of the second information layer 220 when the recording layer 225 is in a crystalline phase, and Ta (%) denotes the optical transmittance of the second information layer 220 when the recording layer 225 is in an amorphous phase.

The dielectric layer 221 has a function of increasing the optical transmittance of the second information layer 220. Preferably, the dielectric layer 221 is composed of a material that is transparent and has a refractive index of 2.4 or more with respect to the laser beam 10 with a wavelength of 405 nm. When the refractive index of the dielectric layer 221 decreases, the reflectance ratio Rc/Ra increases and the optical transmittance decreases in the second information layer 220. When the refractive index of the dielectric layer 221 is 2.4 or more, a reflectance ratio of 4 or more and an optical transmittance of 50% or more can be obtained. When the refractive index of the dielectric layer 221 is less than 2.4, the optical transmittance of the second information layer 220 decreases, making it difficult for the laser beam 10 to reach the first information layer 210 sufficiently.

As the material for the dielectric layer 221, a material containing at least one of $ZrO_2$, $Nb_2O_5$, $Bi_2O_3$, $CeO_2$, $TiO_2$, and $WO_3$ may be used. Among these, $TiO_2$ preferably is used because it has a refractive index as high as 2.7 and an excellent moisture resistance. Or a material containing at least one of $ZrO_2$, $Nb_2O_5$, $Bi_2O_3$, $CeO_2$, $TiO_2$, and $WO_3$ at 50 mol % or more may be used. For example, there may be used $(ZrO_2)_{80}(Cr_2O_3)_{20}$, $(Bi_2O_3)_{60}(SiO_2)_{40}$, $(Bi_2O_3)_{60}(TeO_2)_{40}$, $(CeO_2)_{50}(SnO_2)_{50}$, $(TiO_2)_{50}(HfO_2)_{50}$, $(WO_3)_{75}(Y_2O_3)_{25}$, $(Nb_2O_5)_{50}(MnO)_{50}$, and $(Al_2O_3)_{50}(TiO_2)_{50}$. Or a material obtained by mixing at least two of $ZrO_2$, $Nb_2O_5$, $Bi_2O_3$, $CeO_2$, $TiO_2$, and $WO_3$ may be used. For example, there may be used $Bi_2Ti_4O_{11}((TiO_2)_{80}(Bi_2O_3)_{20})$, $Bi_4Ti_3O_{12}((TiO_2)_{60}(Bi_2O_3)_{40})$, $Bi_{12}TiO_{20}$, $(WO_3)_{50}(Bi_2O_3)_{50}$, $(TiO_2)_{50}(Nb_2O_5)_{50}$, $(CeO_2)_{50}(TiO_2)_{50}$, $(ZrO_2)_{50}(TiO_2)_{50}$, and $(WO_3)_{67}(ZrO_2)_{33}$. The subscripts in the above-mentioned materials denote mole percentages.

According to an optical calculation, the transmittance of the second information layer 220 is maximum when the dielectric layer 221 has a thickness of approximately $\lambda/8n$ (nm) ($\lambda$ denotes the wavelength of the laser beam 10, and n denotes the refractive index of the dielectric layer 221). Reflectance contrast (Rc−Ra)/(Rc+Ra) is maximum when the dielectric layer 221 has a thickness of at least ($\lambda/16n$) but not more than ($\lambda/4n$). Thus, the thickness of the dielectric layer 221 can be selected so as to obtain both of the maximum transmittance and the maximum reflectance contrast. Preferably, it is at least 9 nm but not more than 42 nm, and more preferably at least 10 nm but not more than 30 nm. The dielectric layer 221 may include two or more layers.

The reflective layer 222 has a function of diffusing the heat of the recording layer 225 promptly. Since the second information layer 220 needs to have a high optical transmittance as mentioned above, it is desirable that the optical absorption by the reflective layer 222 is small. Thus, the material and the thickness of the reflective layer 222 are more limited than those of the reflective layer 212. Preferably, the reflective layer 222 is designed to be thinner, and is composed of a material with a small extinction coefficient optically and a high heat conductivity thermally.

Specifically, the reflective layer 222 preferably is composed of Ag or Ag alloy. Ag—Pd, Ag—Pd—Cu, Ag—Ga, Ag—Ga—Cu, Ag—Cu, and Ag—In—Cu may be used as the Ag alloy. Or a material obtained by adding rare earth metal to Ag or Ag—Cu may be used. Among these materials, Ag—Pd—Cu, Ag—Ga—Cu, Ag—Cu, and Ag—In—Cu preferably are used because they have a small optical absorption, a high heat conductivity, and an excellent moisture resistance. The thickness of the reflective layer 222 is adjusted taking the thickness of the recording layer into consideration. Preferably, it is at least 7 nm but not more than 20 nm. When the reflective layer 222 has a thickness of less than 7 nm, its function of diffusing the heat is deteriorated, making it difficult to form the marks on the recording layer 225. On the other hand, when the thickness of the reflective layer 222 is more than 20 nm, the optical transmittance of the second information layer 220 is less than 40%.

The dielectric layer 223 and the dielectric layer 227 each have a function of adjusting the optical path length nd so as to adjust the Rc, Ra, Tc, and Ta of the second information layer 220. For example, the optical path length nd of each of the dielectric layer 223 and the dielectric layer 227 exactly can be determined by the calculation based on the matrix method so that $40\% \leq (Ta+Tc)/2$, $5\% \leq Rc$, and $Ra \leq 1\%$ are satisfied. When dielectric materials having a refractive index of 2 to 3 are used for the dielectric layer 223 and the dielectric layer 227, the thickness of the dielectric layer 227 preferably is at least 10 nm but not more than 80 nm, and more preferably at least 20 nm but not more than 60 nm. The thickness of the dielectric layer 223 preferably is at least 3 nm but not more than 40 nm, and more preferably at least 5 nm but not more than 30 nm. The materials for the dielectric layers 223 and 227 may be the same as those used for the dielectric layers 113 and 117 in the Embodiment 1. However, since the reflective layer 222 preferably is composed of Ag or the Ag alloy, the dielectric layer 223 preferably is free from sulfide or Zn. On the other hand, $ZnS—SiO_2$, which has a high transparency, preferably is used for the dielectric layer 227.

The interface layer 224 and the interface layer 226 have the same functions as those of the interface layer 114 and the interface layer 116 in Embodiment 1, and the materials and the preferable thicknesses thereof also are the same. When the dielectric layer 223 is composed of a material free from sulfide or Zn and has an excellent adhesion to the recording layer 225, the interface layer 224 is provided, only if needed. This is also the case with the interface layer 226. However, when $ZnS—SiO_2$ is used for the dielectric layer 227, it is more preferable to provide the interface layer 226.

The recording layer 225 of the present invention is subject to a phase change, and contains antimony (Sb), carbon (C), and the light element (L) having an atomic weight of less than 33. These elements each have the same functions as those of the elements contained in the recording layer 115 of the Embodiment 1. Since the second information layer 220 needs to have a high optical transmittance as has been described already, the thickness of the recording layer 225 is smaller than the thickness of the recording layer 215 on average, and preferably is at least 4 nm but not more than 10 nm. When the thickness of the recording layer 225 exceeds 10 nm, the optical transmittance of the second information layer 220 is lowered. When the thickness of the recording layer 225 is less than 4 nm, the optical variation of the recording layer 225 is reduced. Since the crystallization rate of the recording layer is lowered when the thickness thereof is reduced, the recording layer 225 preferably has a composition ratio that allows it to have a larger crystallization rate.

Specifically, the total composition ratio of C and the L in $Sb_{100-x-y}C_xL_y$ preferably is less than 40 atom %. When it is less than 40 atom %, it is possible to ensure a crystallization rate applicable at a transfer rate corresponding to 4× speed, for example, and to obtain satisfactory recording/erasing properties. In order to ensure the stability of the amorphous state at a low transfer rate, the total composition ratio of C and the L in the recording layer 225 preferably is 20 atom % or more. The composition ratio of C and the L may be selected so as to be optimal to the transfer rate. In order to maintain a large optical variation and a high crystallization rate, $x \geq y$ preferably is satisfied also in the recording layer 225. Specific compositions, such as Sb—C—B, are the same as those for the recording layer 115.

The recording layer of the present invention should be included in at least one of the information layers. For example, when the recording layer 215 is the recording layer of the present invention, a conventional rewritable recording layer may be used as the recording layer 225. In contrast, when the recording layer 225 is the recording layer of the present invention, the conventional rewritable recording layer may be used as the recording layer 215. As the material for the conventional rewritable recording layer, there may be used a material containing a compound composition such as $GeTe—Sb_2Te_3$, $GeTe—Bi_2Te_3$, $GeTe—SnTe—Sb_2Te_3$, $GeTe—SnTe—Bi_2Te_3$, $GeTe—Bi_2Te_3—In_2Te_3$, $GeTe—SnTe—Bi_2Te_3—In_2Te_3$, $GeTe—SbTe$, $GeTe—SnTe—SbTe$, $GeTe—SnTe—SbTe—BiTe$, $GeTe—SnTe$, $GeTe—SnTe—BiTe$, and $GeTe—BiTe$, or a material containing Sb of 50% or more such as Ge—Sb, Ga—Sb, In—Sb, Sb—Te, and Sb—Te—Ge.

When the recording layer 215 is the recording layer of the present invention, the second information layer 220 may be a reproduction-only information layer, or a write-once information layer. In contrast, when the recording layer 225 is the recording layer of the present invention, the first information layer 210 may be a reproduction-only information layer or a write-once information layer. In the write-once information layer, oxide containing at least one of Te—O, Sb—O, Ge—O, Sn—O, In—O, Zn—O, Mo—O, W—O, etc., a material obtained by stacking two or more layers, and alloying them or allowing them to react with each other at the time of recording, an organic-dye recording material, etc. may be used for the recording layer. In the reproduction-only information layer, a material, etc. containing at least one of a metal element, a metal alloy, a dielectric substance, a dielectric substance compound, a semiconductor element, and a metalloid element may be formed on pre-formed recording pits. For example, the reflective layer containing Ag or an Ag alloy may be formed.

A disc-like transparent substrate with a smooth surface is used for the transparent layer 202, as used for the substrate 101.

The transparent layer 202 has the same function as that of the transparent layer 102 of the Embodiment 1, and can be composed of the same material as that for the transparent layer 102 of the Embodiment 1. A distance from a surface of the transparent layer 202 to the recording layer 215 of the first information layer 210 preferably is at least 80 μm but not more than 120 μm, and more preferably at least 90 μm but not more than 110 μm. For example, the interlayer 203 may be 25 μm thick and the transparent layer 202 may be 75 μm thick. The interlayer 203 may be 20 μm thick and the transparent layer 202 may be 70 μm thick. The interlayer 203 may be 30 μm thick and the transparent layer 202 may be 80 μm thick. The thickness of the transparent layer 202 preferably is at least 40 μm but not more than 110 μm, and more preferably at least 50 μm but not more than 100 μm.

Subsequently, the method for producing the information recording medium 200 of the Embodiment 2 will be described. The information recording medium 200 is produced by forming the first information layer 210, the interlayer 203, the second information layer 220, and the transparent layer 202 sequentially on the substrate 201 serving as a support body.

The substrate 201 with the guide grooves (the groove surface and the land surface) formed thereon is set in the sputtering apparatus. On the surface of the substrate 201 on which the guide grooves are formed, the steps from the step of forming the reflective layer 212 to the step of forming the dielectric layer 217 are performed in the same manner as the steps from the step of forming the reflective layer 112 to the step of forming the dielectric layer 117 performed in the Embodiment 1. In this way, the first information layer 210 is formed on the substrate 201.

The substrate 201 on which the first information layer 210 has been formed is taken out from the sputtering apparatus, and the interlayer 203 is formed thereon. The interlayer 203 is formed as follows. First, an ultraviolet curable resin is applied to a surface of the dielectric layer 217 by, for example, the spin coat method. Next, a polycarbonate substrate is prepared, on a surface of which projections and depressions in a shape complementary to that of the guide grooves to be formed on the interlayer have been formed, and the surface of the polycarbonate substrate is placed on the ultraviolet curable resin. It is irradiated with an ultraviolet ray in this state to cure the resin, and then the polycarbonate substrate with the projections and depressions is separated. Thereby, the guide grooves with a complementary shape to the shape of the projections and depressions are formed on the ultraviolet curable resin. Thus, the interlayer 203 to be formed having the guide grooves is formed. The shape of the guide grooves formed on the substrate 201 may be the same as or different from the shape of the guide grooves formed on the interlayer 203. As another method for forming the interlayer 203, it is possible to form a layer for protecting the dielectric layer 217 by using the ultraviolet curable resin and form thereon a layer having the guide grooves. In this case, the resulting interlayer has a dual layer structure. Or the interlayer may be formed by stacking three or more layers. Furthermore, the interlayer 203 may be formed by a printing method, an ink jet method, and a casting method other than the spin coat method.

The substrate 201 on which the layers up to the interlayer 203 have been formed is set in the sputtering apparatus again, and the dielectric layer 221 is formed on a surface of the interlayer 203 on which the guide grooves have been formed. The dielectric layer 221 also is formed by sputtering a sputtering target containing an element, a mixture, or a compound composing the dielectric layer 221. The sputtering may be performed in a rare gas atmosphere or in a mixed gas atmosphere of a rare gas and at least one selected from oxygen gas and nitrogen gas, by using the high frequency power supply. The direct current power supply or the pulse-generating-type direct current power supply may be used, if possible. Any of Ar gas, Kr gas, and Xe gas may be used as the rare gas.

For the sputtering target for forming the dielectric layer 221, a material containing at least one of Zr—O, Nb—O, Bi—O, Ce—O, Ti—O, and W—O may be used. Or a material containing at least one of Zr—O, Nb—O, Bi—O, Ce—O, Ti—O, and W—O at 50 mol % or more may be used. The material and the composition of the sputtering target are determined so that the material of the dielectric layer 221 can be formed. Depending on the sputtering apparatus used, the composition of the dielectric layer formed may not the same as the composition of the sputtering target. In this case, the composition of the sputtering target is adjusted so as to obtain the dielectric layer 221 with a desired composition. The oxide may be oxygen-deficient during sputtering. Thus, the sputtering target that hardly causes oxygen deficiency may be used, or the sputtering may be performed in an atmosphere in which a rare gas is mixed with as little as 10% or less of oxygen gas. The dielectric layer 221 may be formed by sputtering reactively the target composed of a metal material, a semimetal material, or a semiconductor material in an atmosphere in which a rare gas is mixed with as much as 10% or more of oxygen gas, or in an atmosphere in which a rare gas is mixed with oxygen gas and nitrogen gas.

The dielectric layer 221 also may be formed by sputtering the sputtering targets, each composed of a single compound, at the same time with a plurality of the power supplies. The dielectric layer 221 also may be formed by sputtering sputtering targets, each composed of at least two compounds such as a binary sputtering target and a ternary sputtering target, at the same time with a plurality of the power supplies. When these sputtering targets are used, the sputtering also may be performed in a rare gas atmosphere or in a mixed gas atmosphere of a rare gas and at least one selected from oxygen gas and nitrogen gas.

Subsequently, the steps from the step of forming the reflective layer 222 to the step of forming the dielectric layer 227 are performed on a surface of the dielectric layer 221 in the same manner as the steps from the step of forming the reflective layer 112 to the step of forming the dielectric layer 117 performed in the Embodiment 1. A point to be noted is that, as has been described already, since the preferable thickness of the reflective layer 222 is as small as at least 5 nm but not more than 15 nm, the output of the power supply may be smaller in the step of forming the reflective layer 222 than in the step of forming the reflective layer 112. Since the preferable thickness of the recording layer 225 of the present invention also is as small as at least 4 nm but not more than 10 nm, the output of the power supply may be lower in the step of forming the recording layer 225 than in the step of forming the recording layer 115. In this way, the second information layer 220 is formed on the interlayer 203.

The substrate 201 on which the information layers up to the second information layer 220 is taken out from the sputtering apparatus. Then, the transparent layer 202 is formed on a surface of the dielectric layer 227 in the same manner as in the step of forming the transparent layer 102 in the Embodiment 1. Thus, the step of forming the transparent layer is completed.

After the completion of the step of forming the transparent layer, the steps of initializing the first information layer 210 and the second information layer 220 are performed, if needed. The initialization step on the first information layer 210 may be performed before or after the interlayer 203 is formed, and the initialization step on the second information layer 220 may be performed before or after the transparent layer 202 is formed. Or the initialization steps on the first information layer 210 and the second information layer 220 may be performed before or after the transparent layer 202 is formed. In this way, the information recording medium 200 of the Embodiment 2 can be produced.

Embodiment 3

Figure 3:
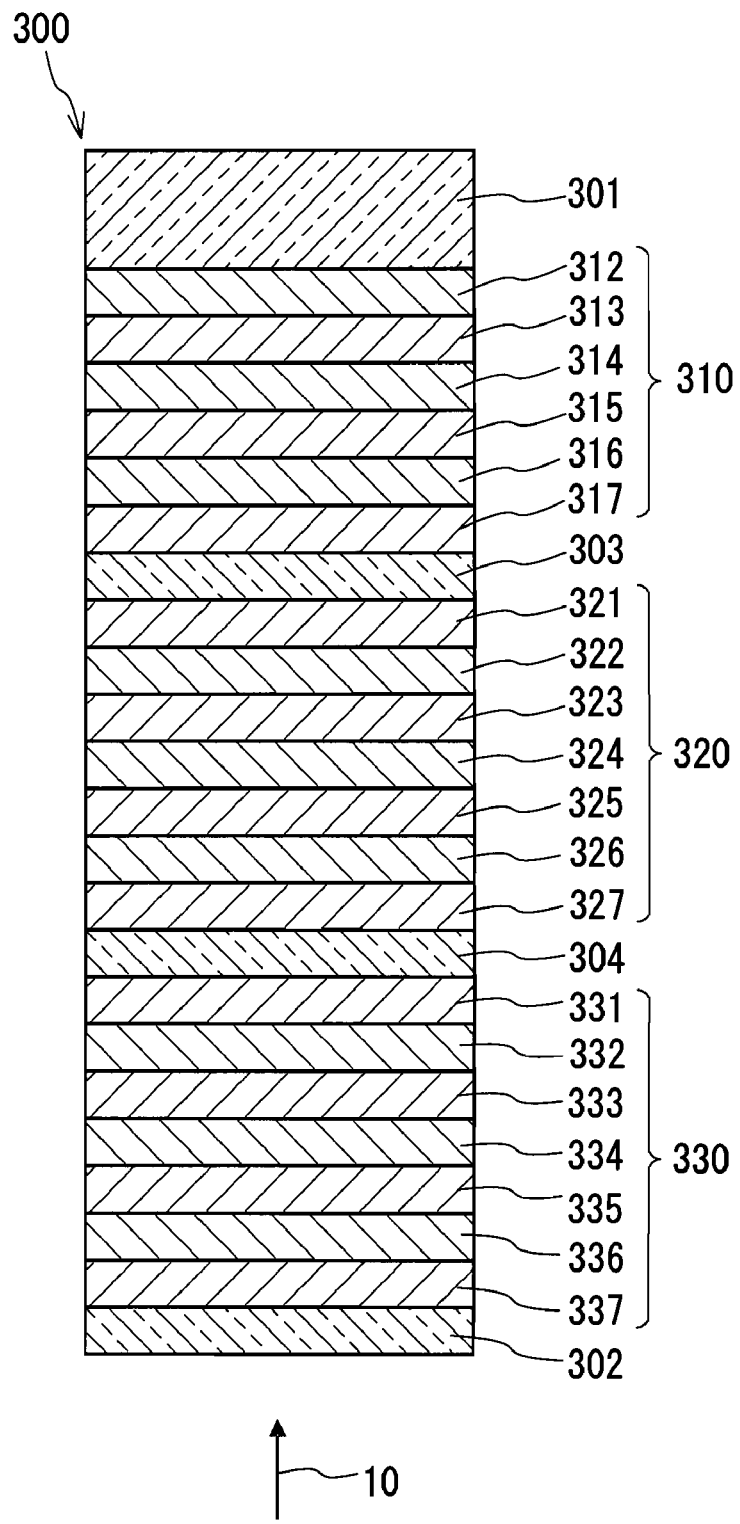
FIG. 3 is a partial sectional view showing still another example of the information recording medium of the present invention.

An example of the information recording medium will be described as Embodiment 3 of the present invention. FIG. 3 shows a partial sectional view of an information recording medium 300 as the example. In the information recording medium 300, a first information layer 310, an interlayer 303, a second information layer 320, an interlayer 304, a third information layer 330, and a transparent layer 302 are disposed sequentially on a substrate 301. The first information layer 310 is formed of a reflective layer 312, a dielectric layer 313, an interface layer 314, a recording layer 315, an interface layer 316, and a dielectric layer 317 disposed in this order on one surface of the substrate 301. The second information layer 320 is formed of a dielectric layer 321, a reflective layer 322, a dielectric layer 323, an interface layer 324, a recording layer 325, an interface layer 326, and a dielectric layer 327 disposed in this order on one surface of the interlayer 303. The third information layer 330 is formed of a dielectric layer 331, a reflective layer 332, a dielectric layer 333, an interface layer 334, a recording layer 335, an interface layer 336, and a dielectric layer 337 disposed in this order on one surface of the interlayer 304.

The laser beam 10 is incident from a transparent layer 302 side also in the present embodiment. The laser beam 10 that has passed through the third information layer 330 and the second information layer 320 is used to record and reproduce information on and from the first information layer 310. In the information recording medium 300, information can be recorded on each of the three recording layers. For example, it is possible to obtain the information recording medium having a capacity of 75 GB, which is approximately 3 times larger than the medium capacity of the Embodiment 1, when the laser beam with a wavelength around 405 nm in a blue-violet region is used for recording and reproducing information. Or it is possible to increase the recording density of each of the information layers to approximately 33 GB so that the information recording medium has a capacity of 100 GB in total by having the three information layers. The information recording medium 300 also may be used at CAV.

Optically, it is preferable that the three information layers have almost the same effective reflectance as each other. This is achieved by adjusting the reflectances of the first, second, and third information layers and the transmittances of the second and third information layers, respectively. The present embodiment describes, for example, a configuration in which the Rc is set approximately to 2.5% and the Ra is set approximately to 0.5% as the effective reflectance. In order to allow the third information layer 330 to have a transmittance ((Tc+Ta)/2) of approximately 65% and allow the second information layer 320 to have a transmittance of approximately 55%, the first information layer 310 is designed so that the first information layer 310 alone has Rc of approximately 20% and Ra of approximately 4%, the second information layer 320 is designed so that the second information layer 320 alone has Rc of approximately 6% and Ra of approximately 1.2%, and the third information layer 330 is designed so that the third information layer 330 alone has Rc of approximately 2.5% and Ra of approximately 0.5%.

Next, the functions, materials, and thicknesses of the substrate 301, the interlayer 303, the interlayer 304, and the transparent layer 302 will be described. The substrate 301 has the same function as that of the substrate 101 of the Embodiment 1, and the same shape and the same material as those of the substrate 101 can be used for it. The interlayer 303 has a function of separating the focal point of the laser beam 10 in the second information layer 320 from the focal point of the laser beam 10 in the first information layer 310. Guide grooves of the second information layer 320 may be formed on the interlayer 303, if needed. Likewise, the interlayer 304 has a function of separating the focal point of the laser beam 10 in the third information layer 330 from the focal point of the laser beam 10 in the second information layer 320. Guide grooves of the third information layer 330 may be formed on the interlayer 304, if needed. The interlayers 303 and 304 can be composed of an ultraviolet curable resin. The transparent layer 302 also has the same function as that of the transparent layer 102 of the Embodiment 1, and the same material as that for the transparent layer 102 can be used for it.

Preferably, a distance from a surface of the transparent layer 302 to the recording layer 315 of the first information layer 310 is at least 80 µm but not more than 120 µm as in the Embodiment 2. Furthermore, the interlayer 303 preferably has a different thickness from that of the interlayer 304 so as to perform satisfactorily the reproducing of the signals from the first information layer 310, the second information layer 320, and the third information layer 330 and the recording, erasing, and rewriting of the signals with respect to these information layers without having the information layers affected by each other. The thickness of each of the interlayers preferably is selected in the range of 3 µm to 30 µm, and more preferably in the range of 10 µm to 30 µm. For example, the thicknesses of the interlayer 303, the interlayer 304, and the transparent layer 302 may be determined so that a distance from a surface of the transparent layer 302 to the recording layer 315 is 100 µm. For example, it is possible to set the thickness of the interlayer 303 to 23 µm, that of the interlayer 304 to 14 µm, and that of the transparent layer 302 to 63 µm. Or they can be set to 16 µm, 24 µm, and 60 µm in order, for example. The thickness of the transparent layer 302 preferably is at least 20 µm but not more than 100 µm, and more preferably at least 30 µm but not more than 80 µm. Also in the present embodiment, the interlayers each may be composed of two or more layers, one of which is a layer for protecting the information layer and one of which is a layer having the guide grooves.

Hereinafter, descriptions will be made in order, starting from the configuration of the first information layer 310. Descriptions for the layers from the reflective layer 312 to the dielectric layer 317 of the first information layer 310 are the same as those made for the layers from the reflective layer 112 to the dielectric layer 117 of the information layer 110 in the Embodiment 1. Thus, detailed descriptions are omitted.

Subsequently, the configuration of the second information layer 320 will be described. The second information layer 320 has a high transmittance so as to allow the laser beam 10 to reach the first information layer 310. The dielectric layer 321 has the same function as that of the dielectric layer 221 in the Embodiment 2, and preferable materials thereof also are the same as those of the dielectric layer 221. In order to obtain a reflectance ratio of 4 or more and an optical transmittance of 55% or more in the second information layer 320, the dielectric layer 321 preferably has a thickness of at least 2 nm but not more than 30 nm. The reflective layer 322 has the same function as that of the reflective layer 222 in the Embodiment 2, and preferable materials thereof also are the same as those of the reflective layer 222. Preferably, the reflective layer 322 has a thickness of at least 5 nm but not more than 18 nm. When the reflective layer 322 has a thickness of less than 5 nm, its function of diffusing the heat is deteriorated, making it difficult to form the marks on the recording layer 325. When the reflective layer 322 has a thickness more than 18 nm, the optical transmittance of the second information layer 320 is less than 50%. The dielectric layer 323 and the dielectric layer 327 have the same functions as those of the dielectric layer 223 and the dielectric layer 227 in the Embodiment 2, and preferable materials thereof also are the same as those of the dielectric layer 223 and the dielectric layer 227. When dielectric materials having a refractive index of 2 to 3 are used for the dielectric layer 323 and the dielectric layer 327, the dielectric layer 327 preferably has a thickness of at least 10 nm but not more than 80 nm, and more preferably at least 20 nm but not more than 60 nm, and the dielectric layer 323 preferably has a thickness of at least 2 nm but not more than 40 nm, and more preferably at least 3 nm but not more than 30 nm. The interface layer 324 and the interface layer 326 have the same functions as those of the interface layers 114 and 116 in the Embodiment 1, and preferable materials and thicknesses thereof also are the same as those of the interface layers 114 and 116. As in the Embodiment 1, the interface layer 324 and the interface layer 326 may be provided, if needed.

The recording layer 325 of the present invention is subject to a phase change, and contains antimony (Sb), carbon (C), and the light element (L) having an atomic weight of less than 33. These elements each have the same functions as those of the elements contained in the recording layer 115 of the Embodiment 1. Since the second information layer 320 needs to have an optical transmittance of 55% or more, it is preferable that the recording layer 325 has a thickness of at least 3 nm but not more than 9 nm. When the thickness of the recording layer 325 exceeds 9 nm, the optical transmittance of the second information layer 320 is lowered. When the thickness of the recording layer 325 is less than 3 nm, the optical variation of the recording layer 325 is reduced. Since the crystallization rate of the recording layer is lowered when the thickness of the recording layer is reduced, the recording layer 325 preferably has a composition ratio that allows it to have a larger crystallization rate.

Specifically, the total composition ratio of C and the L in $Sb_{100-x-y}C_xL_y$ preferably is at least 15 atom % but not more than 35 atom %. The total composition ratio of C and the L in this range makes it possible to obtain satisfactory recording/erasing properties at the transfer rate corresponding to 4× speed, for example, and to ensure the stability of the amorphous state at a low transfer rate. In order to maintain a large optical variation and a high crystallization rate, $x \geq y$ preferably is satisfied also in the recording layer 325. Specific compositions, such as Sb—C—B, are the same as those for the recording layer 115.

Subsequently, the configuration of the third information layer 330 will be described. The third information layer 330 has a higher transmittance than that of the second information layer 320 so as to allow the laser beam 10 to reach the first information layer 310 and the second information layer 320. The dielectric layer 331 has the same function as that of the dielectric layer 321, and preferable materials thereof also are the same as those of the dielectric layer 321. In order to obtain a reflectance ratio of 4 or more and a optical transmittance of 65% or more in the third information layer 330, the dielectric layer 331 preferably have a thickness of at least 2 nm but not more than 30 nm. The reflective layer 332 has the same function as that of the reflective layer 322, and preferable materials thereof also are the same as those of the reflective layer 322. Preferably, the reflective layer 332 has a thickness of at least 5 nm but not more than 20 nm. When the reflective layer 332 has a thickness of less than 5 nm, its function of diffusing the heat is deteriorated, making it difficult to form the marks on the recording layer 335. When the reflective layer 332 has a thickness more than 20 nm, the optical transmittance of the third information layer 330 is less than 60%. The dielectric layers 333 and 337 have the same functions as those of the dielectric layers 323 and 327, and preferable materials and thicknesses thereof also are the same as those of the dielectric layers 323 and 327. The interface layer 334 and the interface layer 336 are the same as the interface layers 114 and 116 of the Embodiment 1.

The recording layer 335 of the present invention is subject to a phase change, and contains antimony (Sb), carbon (C), and the light element (L) having an atomic weight of less than 33. These elements each have the same functions as those of the elements contained in the recording layer 115 of the Embodiment 1. Since the third information layer 330 needs to have an optical transmittance of 65% or more, the recording layer 335 preferably has a thickness of at least 2 nm but not more than 7 nm. When the recording layer 335 has a thickness exceeding 7 nm, the optical transmittance of the third information layer 330 is lowered. When the recording layer 335 has a thickness of less than 2 nm, the optical variation of the recording layer 335 is reduced. Since the crystallization rate of the recording layer is lowered when the thickness of the recording layer is reduced, the recording layer 335 preferably has a composition ratio that allows it to have a larger crystallization rate.

Specifically, the total composition ratio of C and the L in $Sb_{100-x-y}C_xL_y$ preferably is at least 10 atom % but not more than 30 atom %. The total composition ratio of C and the L in this range makes it possible to obtain satisfactory recording/erasing properties at the transfer rate corresponding to 4× speed, for example, and to ensure the stability of the amorphous state at a low transfer rate. In order to maintain a large optical variation and a high crystallization rate, $x \geq y$ preferably is satisfied also in the recording layer 335. Specific compositions, such as Sb—C—B, are the same as those for the recording layer 115.

As in the Embodiment 2, the recording layer of the present invention should be included in at least one of the information layers. For example, when the recording layer 315 is the recording layer of the present invention, conventional rewritable recording layers may be used as the recording layers 325 and 335. When each of the recording layers 325 and 335 is the recording layer of the present invention, a conventional rewritable recording layer may be used as the recording layer 315. For the conventional rewritable recording layer, the materials described in the Embodiment 2 may be used.

Or, when the recording layer 315 is the recording layer of the present invention, the information layers 320 and 330 may be reproduction-only information layers or write-once information layers. When each of the recording layers 335 and 325 is the recording layer of the present invention, the information layer 310 may be a reproduction-only information layer or a write-once information layer. As the material for the recording layer usable in the write-once information layer and the reproduction-only information layer, the materials described in the Embodiment 2 may be used.

Next, the method for producing the information recording medium 300 of the Embodiment 3 will be described. The information recording medium 300 is produced by forming sequentially the first information layer 310, the interlayer 303, the second information layer 320, the interlayer 304, the third information layer 330, and the transparent layer 302 on the substrate 301 serving as a support body.

The substrate 301 with the guide grooves (the groove surface and the land surface) formed thereon is set in the sputtering apparatus. Then, on the surface of the dielectric layer 301 on which the guide grooves are formed, the steps from the step of forming the reflective layer 312 to the step of forming the dielectric layer 317 are performed in the same manner as the steps from the step of forming the reflective layer 112 to the step of forming the dielectric layer 117 performed in the Embodiment 1. In this way, the first information layer 310 is formed on the substrate 301. The substrate 301 on which the first information layer 310 has been formed is taken out from the sputtering apparatus, and the interlayer 303 is formed thereon. The step of forming the interlayer 303 is performed in the same manner as the step of forming the interlayer 203 of the Embodiment 2. The substrate 301 on which the layers up to the interlayer 303 have been formed is set in the sputtering apparatus again, and on a surface of the interlayer 303 on which the guide grooves are formed, the steps from the step of forming the dielectric layer 321 to the step of forming the dielectric layer 327 are performed in the same manner as the steps from the step of forming the dielectric layer 221 to the step of forming the dielectric layer 227 performed in the Embodiment 2. In this way, the second information layer 320 is formed on the interlayer 303. The substrate 301 on which the information layers up to the second information layer 320 have been formed is taken out from the sputtering apparatus, and the interlayer 304 is formed thereon in the same manner as the interlayer 303.

The substrate 301 on which the layers up to the interlayer 304 have been formed is set in the sputtering apparatus again, and on a surface of the interlayer 304 on which the guide grooves are formed, the steps from the step of forming the dielectric layer 331 to the step of forming the dielectric layer 337 are performed in the same manner as the steps from the step of forming the dielectric layer 321 to the step of forming the dielectric layer 327. In this way, the third information layer 330 is formed on the interlayer 304.

The substrate 301 on which the information layers up to the third information layer 330 have been formed is taken out from the sputtering apparatus. Then, the transparent layer 302 is formed on a surface of the dielectric layer 337 in the same manner as in the step of forming the transparent layer 102 in the Embodiment 1. Thus, the step of forming the transparent layer is completed.

After the completion of the step of forming the transparent layer, the steps of initializing the first information layer 310, the second information layer 320, and the third information layer 330 are performed, if needed. The initialization step on the first information layer 310 may be performed before or after the interlayer 303 is formed. The initialization step on the second information layer 320 may be performed before or after the interlayer 304 is formed. The initialization step on the third information layer 330 may be performed before or after the transparent layer 302 is formed. Or the initialization steps on the first information layer 310, the second information layer 320, and the third information layer 330 may be performed before or after the transparent layer 302 is formed. The effects of the present invention are independent of the order in which the initialization steps are performed. In this way, the information recording medium 300 of the Embodiment 3 can be produced.

Embodiment 4

Figure 4:
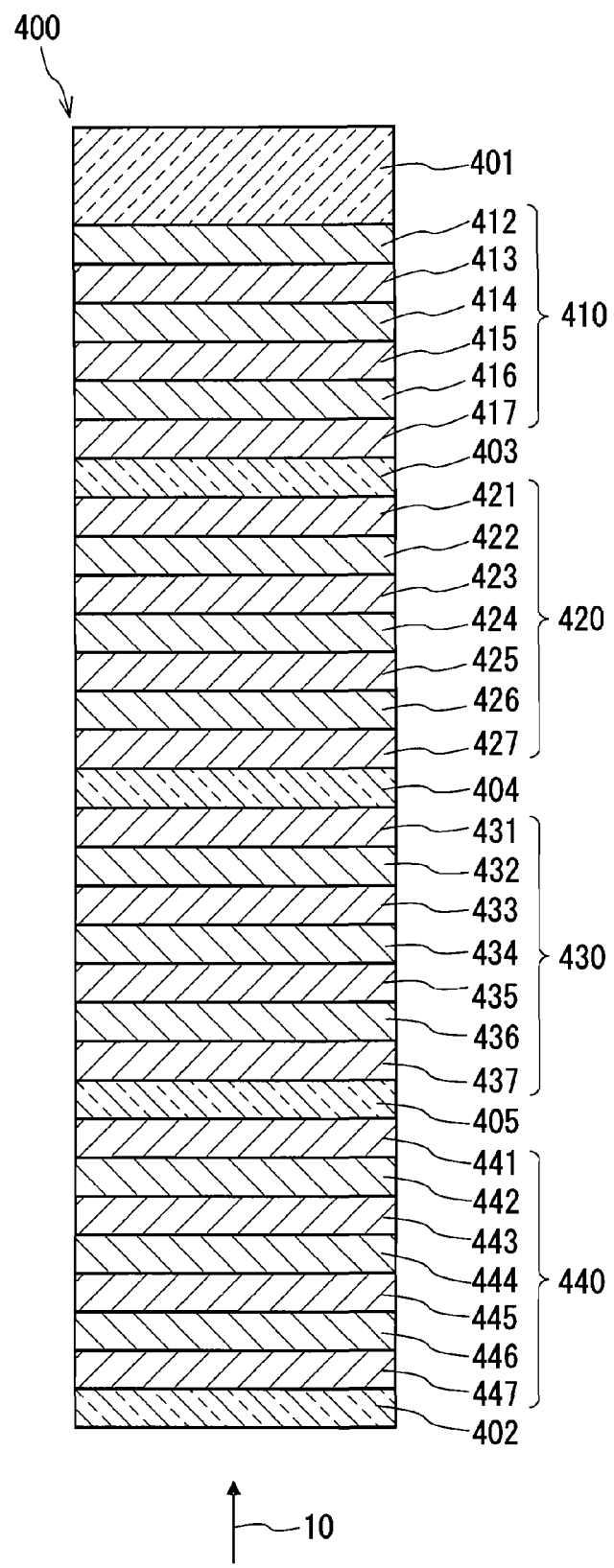
FIG. 4 is a partial sectional view showing still another example of the information recording medium of the present invention.

An example of the information recording medium will be described as Embodiment 4 of the present invention. FIG. 4 shows a partial sectional view of an information recording medium 400 as the example. In the information recording medium 400, a first information layer 410, an interlayer 403, a second information layer 420, an interlayer 404, a third information layer 430, an interlayer 405, an forth information layer 440, and a transparent layer 402 are formed sequentially on a substrate 401.

The first information layer 410 is formed of a reflective layer 412, a dielectric layer 413, an interface layer 414, a recording layer 415, an interface layer 416, and a dielectric layer 417 disposed in this order on one surface of the substrate 401. The second information layer 420 is formed of a dielectric layer 421, a reflective layer 422, a dielectric layer 423, an interface layer 424, a recording layer 425, an interface layer 426, and a dielectric layer 427 disposed in this order on one surface of the interlayer 403. The third information layer 430 is formed of a dielectric layer 431, a reflective layer 432, a dielectric layer 433, an interface layer 434, a recording layer 435, an interface layer 436, and a dielectric layer 437 disposed in this order on one surface of the interlayer 404. The forth information layer 440 is formed of a dielectric layer 441, a reflective layer 442, a dielectric layer 443, an interface layer 444, a recording layer 445, an interface layer 446, and a dielectric layer 447 disposed in this order on one surface of the interlayer 405.

The laser beam 10 is incident from a transparent layer 402 side also in the present embodiment. The laser beam 10 that has passed through the fourth information layer 440, the third information layer 430, and the second information layer 420 is used to record and reproduce information on and from the first information layer 410. In the information recording medium 400, information can be recorded on each of the four recording layers. For example, it is possible to obtain the information recording medium having a capacity of 100 GB, which is approximately 4 times larger than the medium capacity of the Embodiment 1, when the laser beam with a wavelength around 405 nm in a blue-violet region is used for recording and reproducing information. Or it is possible to increase the recording density of each of the information layers to approximately 33 GB so that the information recording medium has a capacity of 133 GB in total by having the four information layers. The information recording medium 400 also may be used according to at CAV.

Optically, it is preferable that the four information layers have almost the same effective reflectance as each other. This is achieved by adjusting the reflectances of the first, second, third, and fourth information layers and the transmittances of the second, third, and fourth information layers, respectively. The present embodiment describes, for example, a configuration in which the Rc is set approximately to 1.3% and the Ra is set approximately to 0.3% as the effective reflectance. In order to allow the forth information layer 440 to have a transmittance of approximately 68%, the third information layer 430 to have a transmittance of approximately 65%, the second information layer 420 to have a transmittance of approximately 55%, the first information layer 410 is designed so that the first information layer 410 alone has Rc of approximately 22% and Ra of approximately 4%, the second information layer 420 is designed so that the second information layer 420 alone has Rc of approximately 6% and Ra of approximately 1.3%, the third information layer 430 is designed so that the third information layer 430 alone has Rc of approximately 3% and Ra of approximately 0.6%, and the fourth information layer 440 is designed so that the fourth information layer 440 alone has Rc of approximately 1.3% and Ra of approximately 0.3%.

Next, the functions, materials, and thicknesses of the substrate 401, the interlayer 403, the interlayer 404, the interlayer 405, and the transparent layer 402 will be described. The substrate 401 has the same function as that of the substrate 101 of the Embodiment 1, and the shape and the material thereof also may be the same as those of the substrate 101. The interlayer 403 has a function of separating the focal point of the laser beam 10 in the second information layer 420 from the focal point of the laser beam 10 in the first information layer 410. Guide grooves of the second information layer 420 may be formed on the interlayer 403, if needed. Likewise, the interlayer 404 has a function of separating the focal point of the laser beam 10 in the third information layer 430 from the focal point of the laser beam 10 in the second information layer 420, and guide grooves of the third information layer 430 may be formed on the interlayer 404, if needed. The interlayer 405 has a function of separating the focal point of the laser beam 10 in the fourth information layer 440 from the focal point of the laser beam 10 in the third information layer 430, and guide grooves of the fourth information layer 440 may be formed on the interlayer 405, if needed. The interlayers 403, 404, and 405 each can be composed of an ultraviolet curable resin. Also, the transparent layer 402 has the same function as that of the transparent layer 102 of the Embodiment 1, and the same material as that of the transparent layer 102 can be used for it.

Preferably, a distance from a surface of the transparent layer 402 to the recording layer 415 of the first information layer 410 is at least 80 µm but not more than 120 µm as in the Embodiment 2. Furthermore, the interlayer 403, the interlayer 404, and the interlayer 405 preferably have a different thickness from each other so as to perform satisfactorily the reproducing of the signals from the first information layer, the second information layer, the third information layer, and the fourth information layer and the recording, erasing, and rewriting of the signals with respect to these information layers without having the information layers affected by each other. The thickness of each of the interlayers preferably is selected in the range of 3 µm to 30 µm, and more preferably in the range of 6 µm to 28 µm. For example, the thicknesses of the interlayer 403, the interlayer 404, the interlayer 405, and the transparent layer 402 may be determined so that a distance from a surface of the transparent layer 402 to the recording layer 415 is 100 µm. For example, it is possible to set the thickness of the interlayer 403 to 22 µm, that of the interlayer 404 to 18 µm, that of the interlayer 405 to 10 µm, and that of the transparent layer 402 to 50 µm. It also is possible to set the thickness of the interlayer 403 to 18 µm, that of the interlayer 404 to 25 µm, that of the interlayer 405 to 14 µm, and that of the transparent layer 402 to 43 µm. The transparent layer 302 preferably has a thickness of at least 10 µm but not more than 90 µm, and more preferably at least 20 µm but not more than 80 µm. Also in the present embodiment, the interlayers each may be composed of two or more layers, one of which is a layer for protecting the information layer and one of which is a layer having the guide grooves.

Hereinafter, descriptions will be made in order, starting from the configuration of the first information layer 410. Descriptions for the layers from the reflective layer 412 to the dielectric layer 417 of the first information layer 410 are the same as those made for the layers from the reflective layer 112 to the dielectric layer 117 of the information layer 110 in the Embodiment 1. Thus, detailed descriptions are omitted.

Subsequently, the configuration of the second information layer 420 will be described. The second information layer 420 has a high transmittance so as to allow the laser beam 10 to reach the first information layer 410. Descriptions for the layers from the dielectric layer 421 to the dielectric layer 427 are the same as those made for the layers from the dielectric layer 321 to the dielectric layer 327 of the second information layer 320 in the Embodiment 3. Thus, detailed descriptions are omitted.

Subsequently, the configuration of the third information layer 430 will be described. The third information layer 430 has a higher transmittance than that of the second information layer 420 so as to allow the laser beam 10 to reach the first information layer 410 and the second information layer 420. Descriptions for the layers from the dielectric layer 431 to the dielectric layer 437 are the same as those made for the layers from the dielectric layer 331 to the dielectric layer 337 of the third information layer 330 in the Embodiment 3. Dielectric materials with a refractive index of 2 to 3 may be used for the dielectric layers 433 and 437. The dielectric layer 437 preferably has a thickness of at least 10 nm but not more than 80 nm, and more preferably at least 20 nm but not more than 60 nm. The dielectric layer 433 preferably has a thickness of at least 2 nm but not more than 40 nm, and more preferably at least 3 nm but not more than 30 nm. Other detailed descriptions are omitted.

Subsequently, the configuration of the forth information layer 440 will be described. The fourth information layer 440 has a higher transmittance than that of the third information layer 430 so as to allow the laser beam 10 to reach the first information layer 410, the second information layer 420, and the third information layer 430.

The dielectric layer 441 has the same function as that of the dielectric layer 431, and preferable materials thereof also are the same as those of the dielectric layer 431. In order to obtain a reflectance ratio of 4 or more and an optical transmittance of 68% or more in the fourth information layer 440, the dielectric layer 441 preferably has a thickness of at least 2 nm but not more than 30 nm. The reflective layer 442 has the same function as that of the reflective layer 432, and preferable materials thereof also are the same as those of the reflective layer 432. Since the recording layer is thin, the reflective layer 442 is allowed to have a relatively large thickness, which is determined so that satisfactory reflectance ratio and optical transmittance can be obtained. Preferably, the thickness of the reflective layer 442 is at least 5 nm but not more than 25 nm. When the reflective layer 442 have a thickness of less than 5 nm, its function of diffusing the heat is deteriorated, making it difficult to form the marks on the recording layer 445. When the reflective layer 442 has a thickness of 25 nm or more, the optical transmittance of the fourth information layer 440 is less than 65% even when the recording layer is thin. The dielectric layer 443 and the dielectric layer 447 have the same functions as those of the dielectric layer 433 and the dielectric layer 437, and preferable materials and thicknesses thereof also are the same as those of the dielectric layer 433 and the dielectric layer 437. The interface layer 444 and the interface layer 446 are the same as the interface layer 114 and the interface layer 116 of the Embodiment 1.

The recording layer 445 of the present invention is subject to a phase change, and contains antimony (Sb), carbon (C), and the light element (L) having an atomic weight of less than 33. These elements each have the same functions as those of the elements contained in the recording layer 115 of the Embodiment 1. Since the fourth information layer 440 needs to have an optical transmittance of 68% or more, the recording layer 445 preferably has a thickness of at least 1 nm but not more than 7 nm. When the thickness of the recording layer 445 exceeds 7 nm, the optical transmittance of the forth information layer 440 is lowered. When the thickness of the recording layer 445 is less than 1 nm, the optical variation of the recording layer 445 is reduced. Since the crystallization rate of the recording layer is lowered when the thickness of the recording layer is reduced, the recording layer 445 has preferably a composition ratio that allows it to have a larger crystallization rate.

Specifically, the total composition ratio of C and the L in $Sb_{100-x-y}C_xL_y$ preferably is at least 2 atom % but not more than 25 atom %. The total composition ratio of C and the L in this range makes it possible to obtain satisfactory recording/erasing properties at the transfer rate corresponding to 4× speed, for example, and to ensure the stability of the amorphous state at a low transfer rate. In order to maintain a large optical variation and a high crystallization rate, $x \geq y$ preferably is satisfied also in the recording layer 445. Specific compositions, such as Sb—C—B, are the same as those for the recording layer 115.

As in the Embodiment 3, the recording layer of the present invention should be included in at least one of the information layers. For example, when the recording layer 415 is the recording layer of the present invention, conventional rewritable recording layers may be used as the recording layer 425, the recording layer 435, and the recording layer 445. When each of the recording layer 425, the recording layer 435, and the recording layer 445 is the recording layer of the present invention, a conventional rewritable recording layer may be used as the recording layer 415. The same materials as those described in the Embodiment 2 can be used for the conventional rewritable recording layer.

Or, when the recording layer 415 is the recording layer of the present invention, the second information layer 420, the third information layer 430, and the fourth information layer 440 may be a reproduction-only information layer or a write-once information layer. When each of the recording layer 435 and the recording layer 425 is the recording layer of the present invention, the first information layer 410 and the fourth information layer 440 each may be a reproduction-only information layer or a write-once information layer. As the material for the recording layer usable in the write-once information layer and the reproduction-only information layer, the materials described in the Embodiment 2 may be used.

Next, a method for producing the information recording medium 400 of the Embodiment 4 will be described. The information recording medium 400 is produced by forming sequentially the first information layer 410, the interlayer 403, the second information layer 420, the interlayer 404, the third information layer 430, the interlayer 405, the fourth information layer 440, and the transparent layer 402 on the substrate 401 serving as a support body.

The substrate 401 with the guide grooves (the groove surface and the land surface) formed thereon is set in the sputtering apparatus. On the surface of the substrate 401 on which the guide grooves are formed, the steps from the step of forming the reflective layer 412 to the step of forming the dielectric layer 417 are performed in the same manner as the steps from the step of forming the reflective layer 112 to the step of forming the dielectric layer 117 performed in the Embodiment 1. In this way, the first information layer 410 is formed on the substrate 401. The substrate 401 on which the first information layer 410 has been formed is taken out from the sputtering apparatus, and the interlayer 403 is formed thereon. The step of forming the interlayer 403 is performed in the same manner as the step of forming the interlayer 203 of the Embodiment 2.

The substrate 401 on which the layers up to the interlayer 403 have been formed is set in the sputtering apparatus again, and on a surface of the interlayer 403 on which the guide grooves are formed, the steps from the step of forming the dielectric layer 421 to the step of forming the dielectric layer 427 are performed in the same manner as the steps from the step of forming the dielectric layer 221 to the step of forming the dielectric layer 227 performed in the Embodiment 2. In this way, the second information layer 420 is formed on the interlayer 403. The substrate 401 on which the information layers up to the second information layer 420 have been formed is taken out from the sputtering apparatus, and the interlayer 404 is formed thereon in the same manner as the interlayer 403.

The substrate 401 on which the layers up to the interlayer 404 have been formed is set in the sputtering apparatus again, and on a surface of the interlayer 404 on which the guide grooves are formed, the steps from the step of forming the dielectric layer 431 to the step of forming the dielectric layer 437 are performed in the same manner as the steps from the step of forming the dielectric layer 421 to the step of forming the dielectric layer 427. In this way, the third information layer 430 is formed on the interlayer 404. The substrate 401 on which the information layers up to the third information layer have been formed is taken out from the sputtering apparatus, and the interlayer 405 is formed thereon in the same manner as the interlayer 404.

The substrate 401 on which the layers up to the interlayer 405 have been formed is set in the sputtering apparatus again, and on a surface of the interlayer 405 on which the guide grooves are formed, the steps from the step of forming the dielectric layer 441 to the step of forming the dielectric layer 447 are performed in the same manner as the steps from the step of forming the dielectric layer 431 to the step of forming the dielectric layer 437. In this way, the forth information layer 440 is formed on the interlayer 405.

The substrate 401 on which the information layers up to the fourth information layer 440 have been formed is taken out from the sputtering apparatus. Then, the transparent layer 402 is formed on a surface of the dielectric layer 447 in the same manner as the step of forming the transparent layer 102 in the Embodiment 1. Thus, the step of forming the transparent layer is completed.

After the completion of the step of forming the transparent layer, the steps of initializing the first information layer 410, the second information layer 420, the third information layer 430, and the fourth information layer 440 are performed, if needed. The initialization step on the first information layer 410 may be performed before or after the interlayer 403 is formed. The initialization step on the second information layer 420 may be performed before or after the interlayer 404 is formed. The initialization step on the third information layer 430 may be performed before or after the interlayer 405 is formed. The initialization step on the fourth information layer 440 may be performed before or after the transparent layer 402 is formed.

Or, the initialization steps on the first information layer 410, the second information layer 420, the third information layer 430, and the forth information layer 440 may be performed before or after the transparent layer 402 is formed. The effects of the present invention are independent of the order in which the initialization steps are performed. In this way, the information recording medium 400 of the Embodiment 4 can be produced.

Embodiment 5

Figure 5:
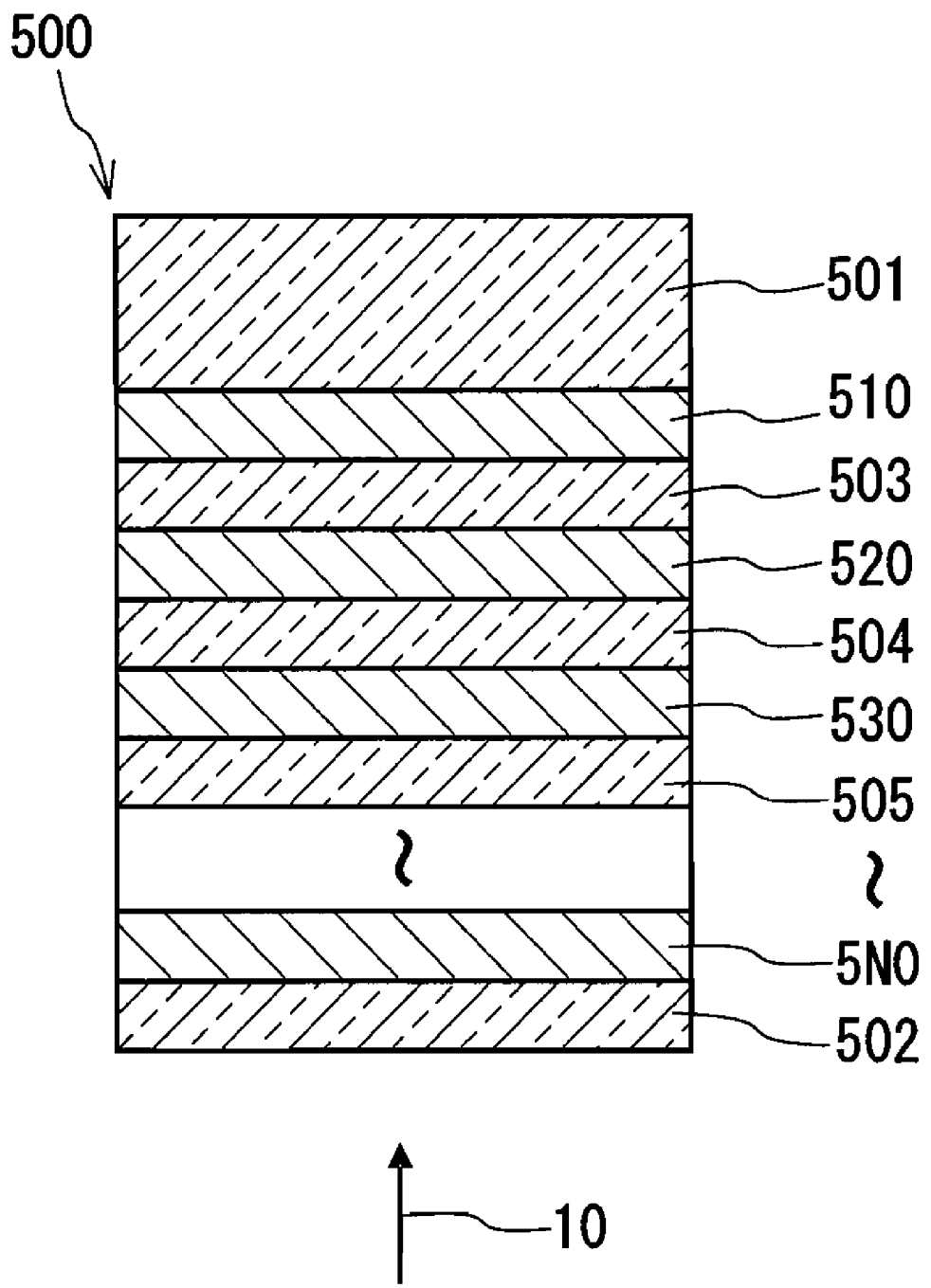
FIG. 5 is a partial sectional view showing still another example of the information recording medium of the present invention.

An example of the information recording medium will be described as Embodiment 5 of the present invention. FIG. 5 shows a partial sectional view of an information recording medium 500 as the example. The information recording medium 500 is produced by forming a first information layer 510, a second information layer 520, a third information layer 530, . . . and an N-th information layer 5N0 on a substrate 501 with interlayers interposed therebetween, and forming further a transparent layer 502 thereon.

The laser beam 10 is incident from a transparent layer 502 side also in the present embodiment. The laser beam 10 that has passed through the N-th information layer 5N0, . . . the third information layer 530, and the second information layer 520 is used to record and reproduce information on and from the first information layer 510. In the information recording medium 500, information can be recorded on each of the N recording layers. For example, when N=5, it is possible to obtain the information recording medium having a capacity of 125 GB or more, which is approximately 5 times larger than the medium capacity of the Embodiment 1, when the laser beam with a wavelength around 405 nm in a blue-violet region is used for recording and reproducing information. Or it is possible to increase the recording density of each of the information layers to approximately 33 GB so that the information recording medium has a capacity of 165 GB in total by having the five information layers. The information recording medium 500 also may be used according to at CAV.

As in the Embodiment 4, the recording layer of the present invention should be included in at least one of the information layers. For example, when the N-th information layer 5N0 includes the recording layer of the present invention, the information layers from the first to the (N-1)th may include a conventional rewritable recording layer, or may include a reproduction-only recording layer or a write-once recording layer. When the first information layer 510 includes the recording layer of the present invention, the information layers from the second to the N-th may include a conventional rewritable recording layer, or may include a reproduction-only recording layer or a write-once recording layer. Since the detailed configuration of each of the information layers is the same as those in the above-mentioned Embodiments, descriptions thereof are omitted. The information recording medium 500 can be produced by stacking the information layers and the interlayers on a surface of the substrate 501 on which the grooves are formed, as in the above-mentioned Embodiments. Since the steps of forming the films, the interlayers, and the transparent layer, and the initialization step are the same as those of the above-mentioned Embodiments, descriptions thereof are omitted.

Embodiment 6

Figure 6:
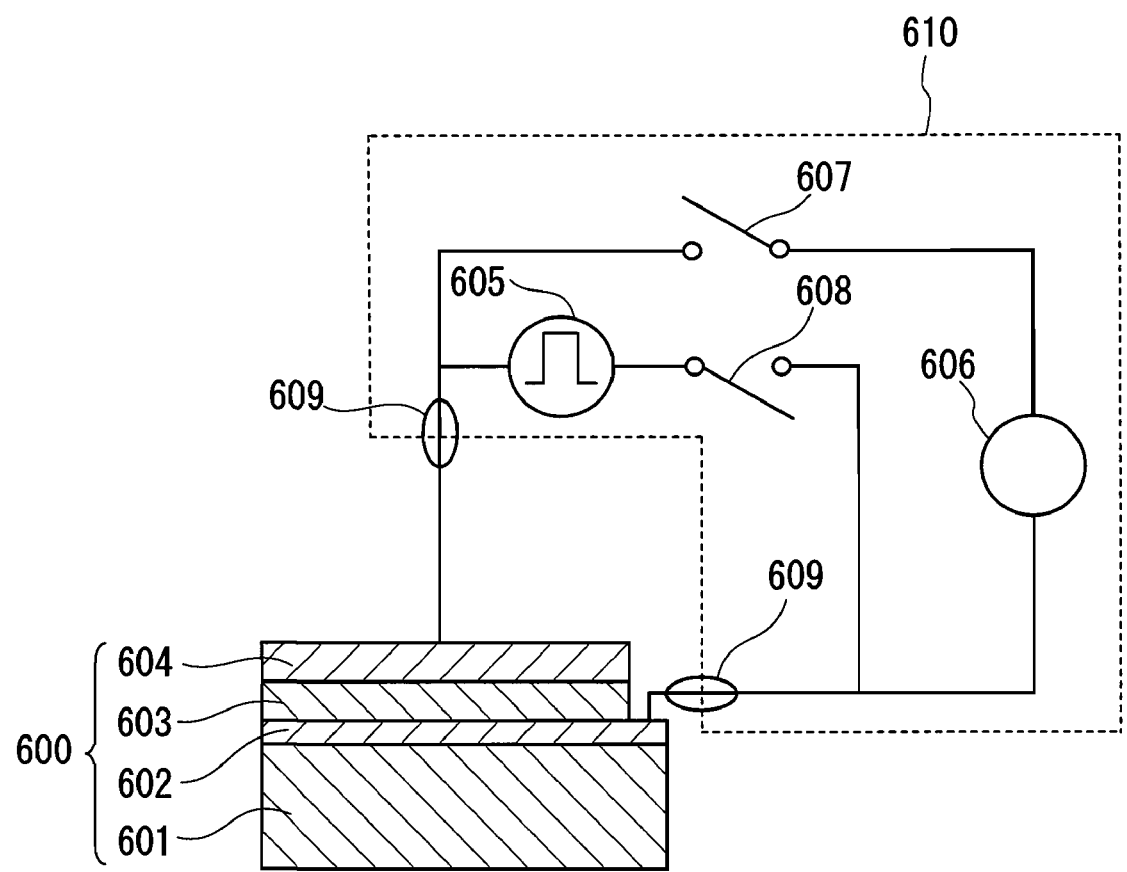
FIG. 6 is a view showing schematically a part of a configuration of the information recording medium of the present invention and a part of a configuration of an electrical information recording/reproducing apparatus.

An another example of the information recording medium will be described as Embodiment 6 of the present invention. FIG. 6 shows a structural example of an electrical information recording medium 600 of the Embodiment 6. The electrical information recording medium 600 is an information recording medium that allows information to be recorded thereon and reproduced therefrom by application of electrical energy (particularly a current).

In the electrical information recording medium 600, a lower electrode 602, a recording layer 603, and an upper electrode 604 are formed in this order on a surface of a substrate 601. The lower electrode 602 and the upper electrode 604 are formed in order to apply a current to the recording layer 603. As the substrate 601, a semiconductor substrate such as an Si substrate, or an insulating substrate such as a polycarbonate substrate, an $SiO_2$ substrate, and an $Al_2O_3$ substrate specifically can be used. For the lower electrode 602 and the upper electrode 604, an electrical conducting material, for example, a metal such as Cu, Au, Ag, Pt, Al, Ti, W and Cr, and a mixture of these can be used.

In the recording material used for the recording layer of the present invention, Joule heat generated by applying electrical energy also can cause a reversible phase change between a crystalline phase and an amorphous phase. Thus, the recording layer 603 of the present embodiment is composed of the recording material of the present invention, that is, the material containing antimony (Sb), carbon (C), and the light element (L) having an atomic weight of less than 33. The elements contained in the recording layer 603 have the same functions as those of the elements contained in the recording layer 115 of the Embodiment 1. Moreover, the recording layer 603 of the present embodiment preferably is composed of the material represented by the formula: $Sb_{100-x-y}C_xL_y$, where x and y satisfy $x+y \leq 50$.

The lower electrode 602 and the upper electrode 604 can be formed by the sputtering method. The lower electrode 602 and the upper electrode 604 can be formed by sputtering a metal sputtering target or an alloy sputtering target that turns out to be the material thereof, in an Ar gas atmosphere, or a mixed gas atmosphere of Ar gas and a reactive gas (at least one selected from oxygen gas and nitrogen gas). The method for forming the films is not limited to this, and a vacuum vapor deposition method, an ion plating method, a chemical vapor deposition (CVD) method, a molecular beam epitaxy (MBE) method, etc. also can be used. The step of forming the recording layer 603 is performed in the same manner as the step of forming the recording layer 115 of the Embodiment 1.

An electrical information recording/reproducing apparatus 610 is connected electrically to the electrical information recording medium 600 via an application unit 609. In order to apply an electric current pulse to the recording layer 603 with the electrical information recording/reproducing apparatus 610, a pulse power supply 605 is connected to the lower electrode 602 and the upper electrode 604 via a switch 608. Moreover, in order to detect a resistance variation caused by the phase change of the recording layer 603, a resistance measuring device 606 is connected between the lower electrode 602 and the upper electrode 604 via a switch 607.

In order to change the recording layer 603 from an amorphous phase (a high resistance state) to a crystalline phase (a low resistance state), the switch 608 is closed (and the switch 607 is opened) to apply an electric current pulse between the electrodes, and the temperature of the region to which the electric current pulse is being applied is maintained at a temperature that is higher than the crystallization temperature but is lower than the melting point of the material during the crystallization time. In order to change the recording layer 603 from the crystalline phase back to the amorphous phase again, a relatively higher electric current pulse than that used for the crystallization is applied for a shorter period of time, the temperature of the recording layer is raised higher than the melting point to melt the recording layer, and then it is cooled rapidly. The pulse power supply 605 of the electrical information recording/reproducing apparatus 610 is a power supply capable of outputting recording and erasing pulses.

Figure 7:
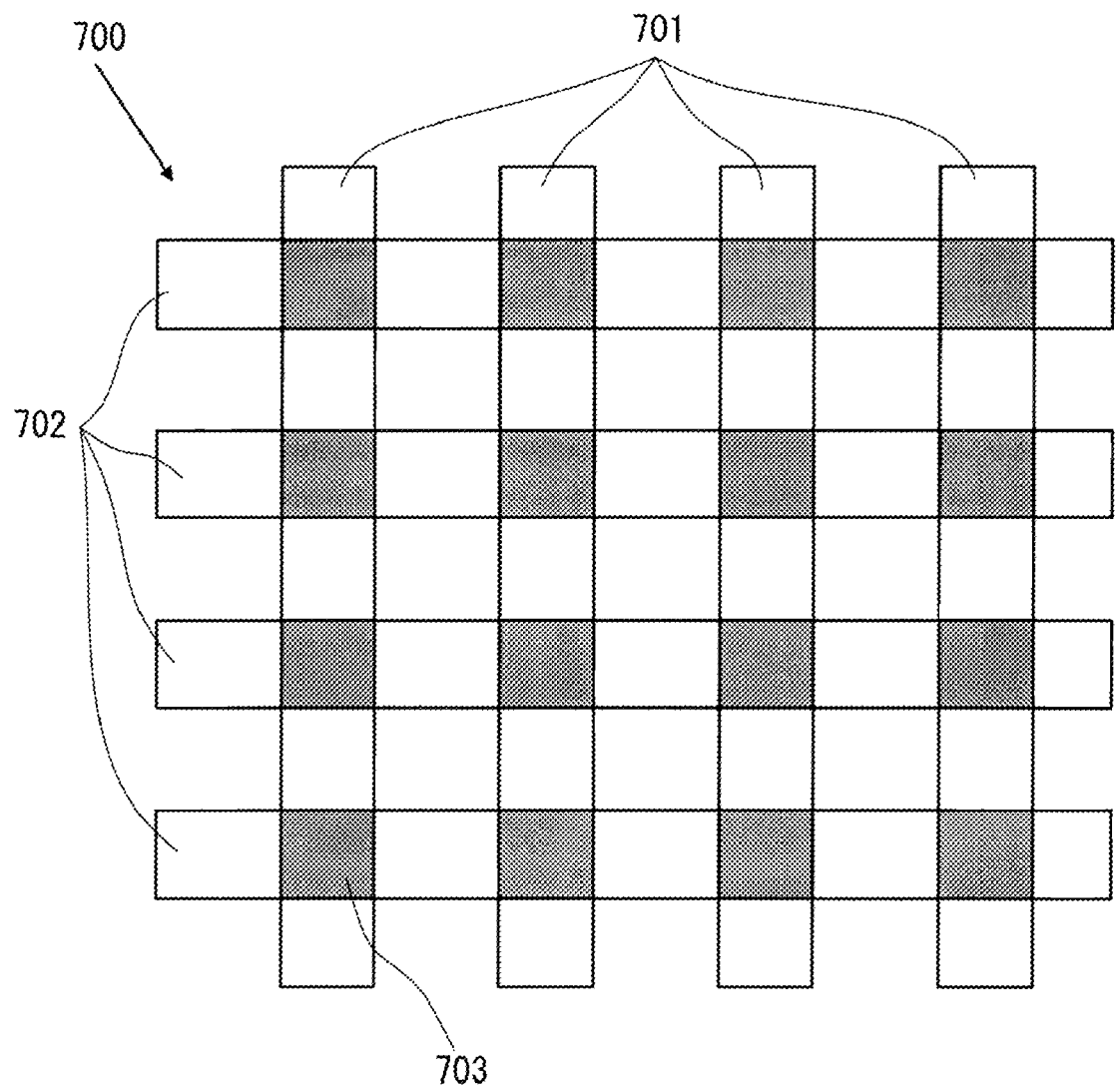
FIG. 7 is a view showing schematically a part of a configuration of the electrical information recording medium of the present invention.

By disposing many of the electrical information recording medium 600 in the form of a matrix, a high-capacity electrical information recording medium 700 can be obtained as shown in FIG. 7. In each of memory cells 703, the same configuration as that of the electrical information recording medium 600 is formed in a minute region. Information is recorded on and reproduced from each of the memory cells 703 by allowing an addressing circuit 715 (shown in FIG. 8) to assign one of word lines 701 and one of bit lines 702.

Figure 8:
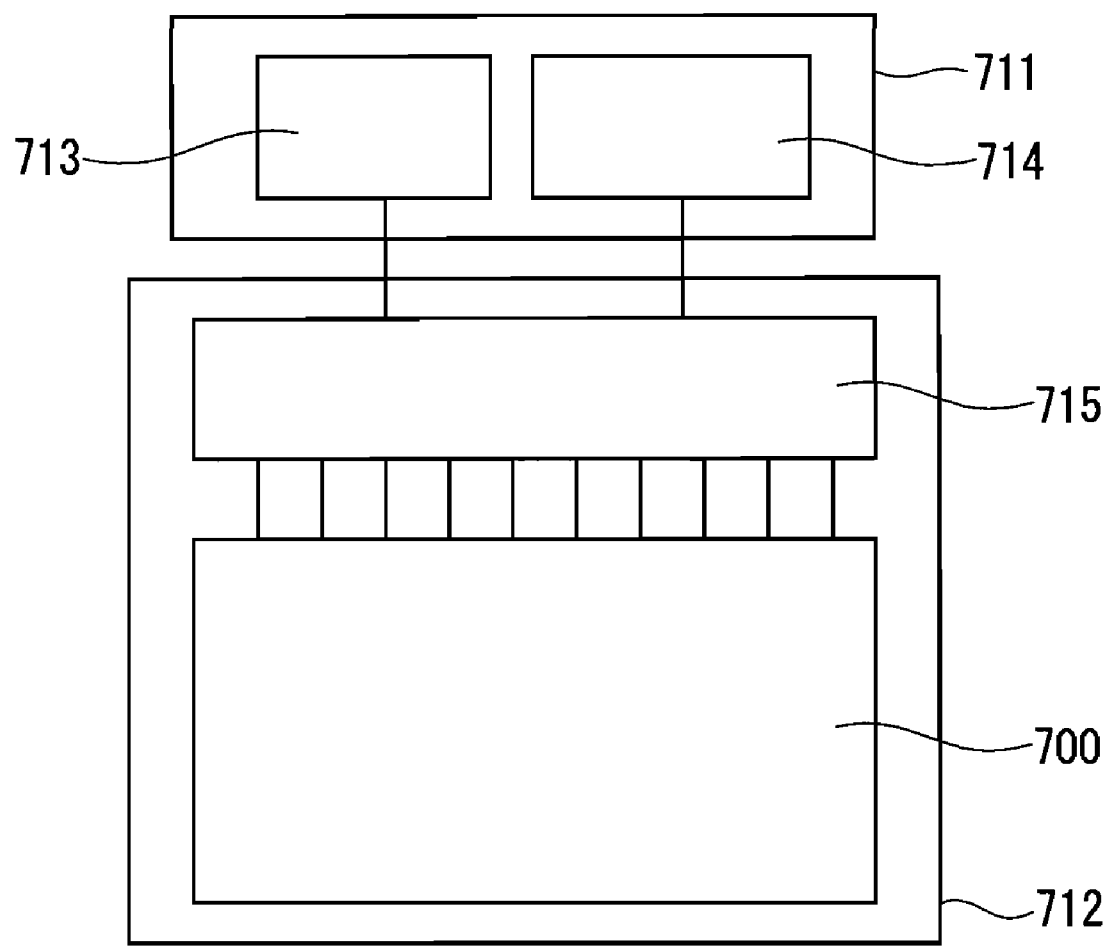
FIG. 8 is a view showing schematically a part of a configuration of the electrical information recording medium of the present invention and a part of a configuration of a recording/reproducing system.

FIG. 8 shows a structural example of an information recording system using the electrical information recording medium 700. A memory unit 712 is constituted by the electrical information recording medium 700 and the addressing circuit 715. Information can be recorded on and reproduced from the electrical information recording medium 700 by connecting electrically the memory unit 712 to an external circuit 711 constituted by at least a pulse power supply 713 and a resistance measuring device 714.

EXAMPLES

Next, the present invention will be described in detail using examples.

Example 1

In Example 1, the information recording media 100 shown in FIG. 1 were produced and the relationships between the material of the recording layer 115 and the recording/reproducing properties and between the material of the recording layer 115 and the reliability were evaluated. For the recording layer 115, six kinds of materials were used, each having a composition ratio of $Sb_{60}C_{30}L_{10}$ (the subscripts each denote the atomic percentage of the element, respectively, and the same notation will be used hereinafter), where the L is one of B, N, O, Mg, Al, and S. The media were numbered sequentially from 100-1 to 100-6 in the present example. For comparison, the information recording media 100, each having the recording layer composed of a recording material of $Sb_{60}Ge_{30}Mg_{10}$, $Sb_{60}Ge_{30}Al_{10}$, $Ge_{45}Bi_4Te_{51}$, $Ge_{35}Bi_{12}Te_{53}$ (a compound of GeTe and $Bi_2Te_3$), $Sb_{60}C_{30}Ti_{10}$, and $Sb_{60}C_{30}Cu_{10}$, respectively, were produced and tested for the performances. These comparative examples were numbered sequentially from 1-1 to 1-6.

Hereinafter, the present example will be described in detail. First, the method for producing the information recording medium 100 will be described. The sputtering (film forming) apparatus shown in FIG. 9 was used for the production. In the Examples 100-1 to 100-6, the same material, thickness, and sputtering conditions were used for the same layers, except for the recording layers 115, and this was the case also with the Comparative Examples 1-1 to 1-6.

The material and the thickness used for each of the layers will be described. As the substrate 101, a polycarbonate substrate (120 mm in diameter and 1.1 mm in thickness) with guide grooves (20 nm in depth and 0.32 μm in groove-groove distance) formed thereon was prepared and set in a sputtering apparatus. 100 nm-thick Ag—Cu alloy to serve as the reflective layer 112, 10 nm-thick $CeO_2$ to serve as the dielectric layer 113, 3 nm-thick $(ZrO_2)_{25}(SiO_2)_{25}(Cr_2O_3)_{50}$ (the subscripts denote mole percentages, and the same notation will be used hereinafter) to serve as the interface layer 114, 10 nm-thick $Sb_{60}C_{30}L_{10}$ to serve as the recording layer 115, 5 nm-thick $(ZrO_2)_{25}(SiO_2)_{25}(Cr_2O_3)_{50}$ to serve as the interface layer 116, and 45 nm-thick $(ZnS)_{80}(SiO_2)_{20}$ to serve as the dielectric layer 117 were stacked sequentially on the surface of the substrate 101 on which the guide grooves had been formed. Thus, the information layer 110 was formed.

The sputtering conditions for each of the layers will be described. All of the sputtering targets used had a round shape, and were 100 mm in diameter and 6 mm in thickness. The reflective layer 112 was formed by sputtering an Ag—Cu alloy sputtering target in an Ar gas atmosphere at a pressure of 0.4 Pa and at an output of 200 W by using a direct current power supply. The dielectric layer 113 was formed by sputtering a $CeO_2$ sputtering target in an Ar gas atmosphere at a pressure of 0.13 Pa and at an output of 200 W by using a high frequency power supply. The interface layer 114 was formed by sputtering a $(ZrO_2)_{25}(SiO_2)_{25}(Cr_2O_3)_{50}$ sputtering target in an Ar gas atmosphere at a pressure of 0.13 Pa and at an output of 200 W by using the high frequency power supply.

Next, the sputtering conditions for the recording layer 115 will be described with regard to each of Examples 100-1 to 100-6 and Comparative Examples 1-1 to 1-6. The same conditions, in which the sputtering target was sputtered in an atmosphere at a pressure of 0.13 Pa by using the direct current power supply, were employed regardless of the material used.

In the Example 100-1, the recording layer with a composition ratio of $Sb_{60}C_{30}B_{10}$ was formed by sputtering an $Sb_{55}C_{33}B_{12}$ sputtering target in an Ar gas atmosphere at an output of 100 W.

In the Example 100-2, the recording layer with a composition ratio of $Sb_{60}C_{30}N_{10}$ was formed by sputtering reactively an $Sb_{64}C_{36}$ sputtering target at an output of 100 W in a mixed gas atmosphere in which Ar gas and $N_2$ gas were mixed at a volume ratio of 90:10.

In the Example 100-3, the recording layer with a composition ratio of $Sb_{60}C_{30}O_{10}$ was formed by sputtering reactively an $Sb_{64}C_{36}$ sputtering target at an output of 100 W in a mixed gas atmosphere in which Ar gas and $O_2$ gas were mixed at a volume ratio of 90:10.

In the Example 100-4, the recording layer with a composition ratio of $Sb_{60}C_{30}Mg_{10}$ was formed by sputtering an $Sb_{58}C_{33}Mg_9$ sputtering target in an Ar gas atmosphere at an output of 100 W.

In the Example 100-5, the recording layer with a composition ratio of $Sb_{60}C_{30}Al_{10}$ was formed by sputtering an $Sb_{57}C_{33}Al_{10}$ sputtering target in an Ar gas atmosphere at an output of 100 W.

In the Example 100-6, the recording layer with a composition ratio of $Sb_{60}C_{30}S_{10}$ was formed by sputtering an $Sb_{58}C_{33}S_9$ sputtering target in an Ar gas atmosphere at an output of 100 W.

In the Comparative Example 1-1, the recording layer with a composition ratio of $Sb_{60}Ge_{30}Mg_{10}$ was formed by sputtering an Sb—Ge—Mg sputtering target in an Ar gas atmosphere at an output of 100 W.

In the Comparative Example 1-2, the recording layer with a composition ratio of $Sb_{60}Ge_{30}Al_{10}$ was formed by sputtering an Sb—Ge—Al sputtering target in an Ar gas atmosphere at an output of 100 W.

In the Comparative Example 1-3, the recording layer with a composition ratio of $Ge_{45}Bi_4Te_{51}$ was formed by sputtering a Ge—Bi—Te alloy sputtering target in an Ar gas atmosphere at an output of 100 W.

In the Comparative Example 1-4, the recording layer with a composition ratio of $Ge_{35}Bi_{12}Te_{53}$ was formed by sputtering a Ge—Bi—Te alloy sputtering target in an Ar gas atmosphere at an output of 100 W.

In the Comparative Example 1-5, the recording layer with a composition ratio of $Sb_{60}C_{30}Ti_{10}$ was formed by sputtering an Sb—C—Ti alloy sputtering target in an Ar gas atmosphere at an output of 100 W.

In the Comparative Example 1-6, the recording layer with a composition ratio of $Sb_{60}C_{30}Cu_{10}$ was formed by sputtering an Sb—C—Cu alloy sputtering target in an Ar gas atmosphere at an output of 100 W.

The interface layer 116 was formed by sputtering a $(ZrO_2)_{25}(SiO_2)_{25}(Cr_2O_3)_{50}$ sputtering target in an Ar gas atmosphere at a pressure of 0.13 Pa and at an output of 200 W by using the high frequency power supply. The dielectric layer 117 was formed by sputtering a $(ZnS)_{80}(SiO_2)_{20}$ sputtering target in a mixed gas atmosphere in which Ar gas and $O_2$ gas were mixed at a volume ratio of 97:3 at a pressure of 0.13 Pa and at an output of 400 W by using the high frequency power supply.

The substrate 101 on which the reflective layer 112, the dielectric layer 113, the interface layer 114, the recording layer 115, the interface layer 116, and the dielectric layer 117 had been formed sequentially as described above was taken out from the sputtering apparatus. Then, an ultraviolet curable resin was applied with a thickness of 100 μm to the surface of the dielectric layer 117 by the spin coat method, and was irradiated with an ultraviolet ray and cured. Thus, the transparent layer 102 was formed.

After the completion of the step of forming the transparent layer, the initialization step was performed. In the initialization step, the recording layer 115 of the information recording medium 100 was crystallized almost all over an annular region extending from a radial position of 22 mm to 60 mm by using a 810 nm-wavelength semiconductor laser. Thereby, the initialization step was completed, and the productions of the information recording media 100 of the Example 100-1 to 100-6 and those of the Comparative Example 1-1 to 1-4 were completed. In these information recording media, Rc of approximately 21% and Ra of approximately 4% were observed as the reflectance of their mirror surface areas.

Next, the method for evaluating the recording and reproducing with respect to the information recording medium 100 will be described. The recording/reproducing apparatus used to record information on the information recording medium 100 was a recording/reproducing apparatus with a common configuration including a spindle motor for rotating the information recording medium 100, an optical head provided with a semiconductor laser that emits the laser beam 10, and an object lens for focusing the laser beam 10 on the recording layer 115 of the information recording medium 100. In the evaluation of the information recording medium 100, a recording of an amount equivalent to 25 GB was performed using a 405 nm-wavelength semiconductor laser and an object lens with a numerical aperture of 0.85. The upper limit for the laser power of the laser beam 10 in the recording/reproducing apparatus used was 20 mW on a surface of the medium.

The recording was performed at a radial position of 50 mm on the medium at 2× speed (9.84 m/second, 72 Mbps) and 4× speed (19.68 m/second, 144 Mbps), respectively. The reproduction of the recorded signals was evaluated at 1× speed under irradiation with a 0.35 mW laser beam. The reproduction may be evaluated at a linear velocity higher than 1× speed and with a reproducing power higher than 0.35 mW.

The recording and reproducing were evaluated by measuring a carrier-to-noise ratio (CNR) and an erasure rate. First, the method for measuring the CNR will be described. The laser beam 10 was applied to the information recording medium 100 while its power was being modulated between a recording power (mW), which is a high level power, and an erasing power (mW), which is a low level power. Thereby, a single signal of 2T (with a mark length of 0.149 μm) and a single signal of 9T (with a mark length of 0.671 μm) were recorded alternately 11 times in total on a groove surface. The waveform of the pulse used for recording was a multipulse waveform. When the 11th signal, which is 2T, was recorded, amplitudes of the carrier (C) (dBm) and noise (N) (dBm) were measured with a spectrum analyzer so as to obtain the CNR (dB) based on the difference therebetween.

Next, the method for measuring the erasure rate will be described. The amplitude of the 11th signal, which is 2T, was measured, and then the 12th signal, which is 9T, was recorded to measure the amount of attenuation of the 2T signal with the spectrum analyzer. The amount of attenuation is defined as the erasure rate (dB).

First, a recording power (Pw) and an erasing power (Pe) were determined by the following procedure. The erasing power was fixed to an appropriate value, and the dependency of 2T amplitude on the recording power was measured. Thereby, a specific Pw1 was determined. Then, the recording power was fixed to the Pw1, and the dependencies of the CNR and the erasure rate on the erasing power were measured. Thereby, the Pe was obtained as an average between a specific low power side Pe0 and a specific high power side Pe1. The erasing power was fixed to the Pe, and the dependency of 2T amplitude on the recording power was measured again. Thereby, a specific Pw was determined. By this procedure, the Pw and the Pe were determined at 2× speed and 4× speed, respectively. The information recording media 100-1 to 100-6 and the Comparative Examples 1-1 to 1-6 each were measured for CNR and erasure rate at 2× speed and 4× speed, respectively, using the Pw and Pe ((1) 2T CNR, (2)2T erasure rate).

Next, the method for evaluating the reliability will be described. The reliability evaluation was performed to see if the recorded signals could be stored even under a high humidity and high temperature condition, and to see if the recorded signals still were able to be overwritten even after being placed under the high humidity and high temperature condition. The same recording/reproducing apparatus as the one mentioned above was used for the evaluation. A 2T signal and a 9T signal were recorded alternately 11 times in total in advance with the above-mentioned Pw power and Pe power, on a groove surface of the same track on the information recording media 100-1 to 100-6 and the Comparative Examples 1-1 to 1-6. This was performed on a plurality of tracks at 2× speed and 4× speed and 2T CNR was measured, respectively. These media were left in a thermostatic bath at a temperature of 80° C. and a relative humidity of 20% for 100 hours, and then were taken out. Thereafter, the recorded 2T signals were reproduced at 1× speed, and CNR was measured (to observe archival characteristics). Also, the recorded 2T signals were overwritten with 9T signals one time with the Pw and Pe, and the erasure rate was measured (to see archival overwrite characteristics). At this time, the signals that had been recorded at 2× speed were overwritten at 2× speed, and the signals that had been recorded at 4× speed were overwritten at 4× speed, one time, respectively. The archival characteristics ((3) CNR variation) were evaluated based on CNR (A)-CNR (B), which is a difference between CNR (B) observed before the medium was left in the thermostatic bath and CNR (A) observed after the medium was left in the thermostatic bath. When the CNR observed after the medium was left in the thermostatic bath was lower, the reliability was poor. The archival characteristics were deteriorated easily at a low speed. The archival overwrite characteristics ((4) erasure rate variation) were evaluated based on erasure rate (A)-erasure rate (B), which is a difference between the erasure rate (B) observed before the medium was left in the thermostatic bath and the erasure rate (A) observed after the medium was left in the thermostatic bath. When the erasure rate observed after the medium was left in the thermostatic bath was lower, the reliability was poor. The archival overwrite characteristics were deteriorated easily at a high speed.

Table 1 shows the results of the evaluations on (1) 2T CNR, (2) 2T erasure rate, (3) CNR variation, and (4) the erasure rate variation, at 2× speed and 4× speed. In the table: (1) with respect to the 2T CNR, ○ denotes at least 45 dB, Δ denotes at least 40 dB but less than 45 dB, and x denotes less than 40 dB; (2) with respect to the 2T erasure rate, ○ denotes at least 30 dB, Δ denotes at least 20 dB but less than 30 dB, and x denotes less than 20 dB; (3) with respect to the CNR variation, ○ denotes less than 1 dB, Δ denotes at least 1 dB but less than 3 dB, and x denotes at least 3 dB; and (4) with respect to the erasure rate variation, ○ denotes less than 3 dB, Δ denotes at least 3 dB but less than 5 dB, and x denotes at least 5 dB. x means that it is difficult to use the medium at the indicated linear velocity, and ○ and Δ mean that the medium is usable. ○ is more preferable than Δ.

In the comprehensive evaluation, ⊚ denotes that all the items were evaluated as ○, ○ denotes that one item was evaluated as Δ, Δ denotes that at least two items were evaluated as Δ, and x denotes that at least one item was evaluated as x. Δ is preferable, ○ is more preferable, and ⊚ is most preferable. x denotes that it is difficult to use the medium.

TABLE 1

| Contents | Medium number | Material of recording layer 115 (subscripts denote atomic percentages) | 2T CNR 2x | 2T CNR 4x | 2T erasure rate 2x | 2T erasure rate 4x | CNR variation 2x | CNR variation 4x | Erasure rate variation 2x | Erasure rate variation 4x | Comprehensive evaluation |
|---|---|---|---|---|---|---|---|---|---|---|---|
| Examples | 100-1 | $Sb_{60}C_{30}B_{10}$ | ○ | ○ | ○ | ○ | ○ | ○ | ○ | ○ | ⊚ |
|  | 100-2 | $Sb_{60}C_{30}N_{10}$ | ○ | ○ | ○ | ○ | ○ | ○ | ○ | ○ | ⊚ |
|  | 100-3 | $Sb_{60}C_{30}O_{10}$ | ○ | ○ | ○ | ○ | ○ | ○ | ○ | Δ | ○ |
|  | 100-4 | $Sb_{60}C_{30}Mg_{10}$ | ○ | ○ | ○ | ○ | ○ | ○ | ○ | ○ | ⊚ |
|  | 100-5 | $Sb_{60}C_{30}Al_{10}$ | ○ | ○ | ○ | ○ | ○ | ○ | ○ | ○ | ⊚ |
|  | 100-6 | $Sb_{60}C_{30}S_{10}$ | ○ | ○ | ○ | ○ | ○ | ○ | ○ | ○ | ⊚ |
| Comparative examples | 1-1 | $Sb_{60}Ge_{30}Mg_{10}$ | ○ | Δ | Δ | X | ○ | ○ | X | X | X |
|  | 1-2 | $Sb_{60}Ge_{30}Al_{10}$ | ○ | Δ | Δ | X | ○ | ○ | X | X | X |
|  | 1-3 | $Ge_{45}Bi_4Te_{51}$ | ○ | Δ | ○ | X | ○ | Δ | ○ | X | X |
|  | 1-4 | $Ge_{35}Bi_{12}Te_{53}$ | X | Δ | ○ | ○ | X | X | Failed to be measured. |  | X |
|  | 1-5 | $Sb_{60}C_{30}Ti_{10}$ | ○ | Δ | ○ | Δ | ○ | ○ | Δ | X | X |
|  | 1-6 | $Sb_{60}C_{30}Cu_{10}$ | ○ | Δ | ○ | Δ | ○ | ○ | Δ | X | X |

As shown in Table 1, the media 100-1 to 100-6 of the present example were evaluated as ○ or Δ for all the items, so they can be used at a speed from 2× speed to 4× speed. Particularly, the media 100-1, 100-2, 100-4, 100-5, and 100-6 were evaluated as ○ for all the items. On all of the media 100-1 to 100-6, the Pw was 7 mW or less and the Pe was 4 mW or less at 2× speed, and the Pw was 9 mW or less and the Pe was 5 mW or less at 4× speed. Use of the recording layer 115 of the present invention made it possible to obtain both of the archival characteristics at a low speed and the archival overwrite characteristics at a high speed. This is because the recording layer of the present invention has all of the high speed crystallization ability applicable at 4× speed, the crystallization temperature as high as 200° C. or more, and the large optical variation.

In contrast, in the Comparative Examples, the media 1-1 and 1-2 were evaluated as x for the erasure rate at 4× speed and the erasure rate variations at both speeds due to their insufficient crystallization rates. The insufficient erasure rate causes accumulation of signals left unerased during the 11 times repetitive recording. Thereby, the media 1-1 and 1-2 were evaluated as Δ for the CNR at 4× speed. The medium 1-3 also was evaluated as x for the erasure rate at 4× speed and the erasure rate variation at 4× speed due to its insufficient crystallization rate. The media 1-4 was evaluated as x for the CNR at 2× speed and the CNR variations at both speeds due to its small optical variation and lowered crystallization temperature. The media 1-4 failed to be measured for erasure rate variation due to their large CNR variation. The media 1-5 and 1-6 were evaluated as Δ for the erasure rate variation at 2× speed, but they were usable. However, the media 1-5 and 1-6 were evaluated as Δ for both the CNR at 4× speed and the erasure rate at 4× speed due to their insufficient crystallization rates, evaluated as x for the erasure rate variation at 4× speed, and evaluated as x for the comprehensive evaluation. As has been described, the Comparative Examples failed to obtain both of the archival characteristics at a low speed and the archival overwrite characteristics at a high speed at the same time.

Example 2

In Example 2, the information recording media 100 of FIG. 1 were produced, and the relationships between the composition ratio of the recording layer 115 and the recording/reproducing properties and between the composition ratio of the recording layer 115 and the reliability were evaluated. $Sb_{100-x-y}C_xAl_y$ was used for the recording layer 115. Six of the information recording media 100, each including the recording layer 115 with a different composition ratio, were produced and numbered from 100-11 to 100-16. x+y was equal to 50 in the media 100-11 to 100-15. x+y was equal to 52 in the medium 100-16.

The production method and the sputtering conditions for the information recording media 100 were the same as in the Example 1, except for those for the recording layers 115. The method for producing the recording layers 115 of the present example will be described. Each of the recording layers 115 was formed by sputtering an Sb—C—Al sputtering target in an Ar gas atmosphere at an output of 100 W. The sputtering targets used had a different composition ratio from each other. For the medium 100-11, the recording layer with a composition ratio of $Sb_{50}C_{45}Al_5$ was formed by sputtering an $Sb_{45}C_{50}Al_5$ sputtering target. For the medium 100-12, the recording layer with a composition ratio of $Sb_{50}C_{40}Al_{10}$ was formed by sputtering an $Sb_{46}C_{44}Al_{10}$ sputtering target. For the medium 100-13, the recording layer with a composition ratio of $Sb_{50}C_{30}Al_{20}$ was formed by sputtering an $Sb_{47}C_{33}Al_{20}$ sputtering target. For the medium 100-14, the recording layer with a composition ratio of $Sb_{50}C_{25}Al_{25}$ was formed by sputtering an $Sb_{47}C_{28}Al_{25}$ sputtering target. For the medium 100-15, the recording layer with a composition ratio of $Sb_{50}C_{20}Al_{30}$ was formed by sputtering an $Sb_{48}C_{22}Al_{30}$ sputtering target. For the medium 100-16, the recording layer with a composition ratio of $Sb_{48}C_{26}Al_{26}$ was formed by sputtering an $Sb_{45}C_{29}Al_{26}$ sputtering target.

The recording/reproducing properties and the reliability were evaluated according to the method for evaluating the recording/reproducing properties and the method for evaluating the reliability used in the Example 1, respectively. In the present example, the media were measured for 2T CNR, 2T erasure rate, CNR variation, and erasure rate variation at 4× speed (19.68 m/second, 144 Mbps). Table 2 shows the results thereof. The judgments as ◯, Δ, and x in Table 2 were made in the same manner as in the Example 1. The judgments as ⊚, ◯, Δ, and x in the comprehensive evaluation also were made in the same manner as in the Example 1.

TABLE 2

| Medium number | Material of recording layer 115 (subscripts denote atomic percentages) | CNR | Erasure rate | CNR variation | Erasure rate variation | Comprehensive evaluation |
|---|---|---|---|---|---|---|
| 100-11 | $Sb_{50}C_{45}Al_5$ | ◯ | ◯ | ◯ | ◯ | ⊚ |
| 100-12 | $Sb_{50}C_{40}Al_{10}$ | ◯ | ◯ | ◯ | ◯ | ⊚ |
| 100-13 | $Sb_{50}C_{30}Al_{20}$ | ◯ | ◯ | ◯ | ◯ | ⊚ |
| 100-14 | $Sb_{50}C_{25}Al_{25}$ | ◯ | ◯ | ◯ | ◯ | ⊚ |
| 100-15 | $Sb_{50}C_{20}Al_{30}$ | ◯ | ◯ | ◯ | Δ | ◯ |
| 100-16 | $Sb_{48}C_{26}Al_{26}$ | ◯ | Δ | ◯ | Δ | Δ |

As shown in Table 2, the media 100-11 to 100-16 were evaluated as ◯ or Δ for all the items, so they can be used at 4× speed. Particularly, the media 100-11 to 100-14, in which $x \leqq y$, were evaluated as ◯ for all the items. The medium 100-15, in which $y > x$, was evaluated as Δ for the erasure rate variation. The medium 100-16, in which $x+y > 50$, was evaluated as Δ for two items, that is, the erasure rate slightly was lowered and the erasure rate variation also was reduced. Thus, in order to achieve both of the recording/reproducing properties and the reliability, $x+y \leqq 50$ preferably is satisfied, and more preferably $x \geqq y$ also is satisfied.

Example 3

In Example 3, the information recording media 200 of FIG. 2 were produced, and the relationship between the composition ratio of the recording layer 225 and the recording/reproducing properties was evaluated. $Sb_{100-x-y}C_xAl_y$ was used for the recording layer 225. Five of the information recording media 200, each including the recording layer 225 with a different composition ratio, were produced and numbered from 200-1 to 200-5. x+y was equal to 40 in the media 200-1 to 200-5.

Hereinafter, the present example will be described in detail. First, the method for producing the information recording medium 200 will be described. The sputtering (film forming) apparatus shown in FIG. 9 was used for the production. In the Examples 200-1 to 200-5, the same material, thickness, and sputtering conditions were used for the same layers, except for the recording layers 225.

The material and the thickness of each of the layers will be described. As the substrate 201, the same substrate as the substrate 101 of the Example 1 was prepared and set in the sputtering apparatus. 100 nm-thick Ag—Cu alloy to serve as the reflective layer 212, 10 nm-thick $CeO_2$ to serve as the dielectric layer 213, 3 nm-thick $(ZrO_2)_{25}(SiO_2)_{25}(Cr_2O_3)_{50}$ to serve as the interface layer 214, 10 nm-thick $Sb_{50}C_{30}Al_{20}$ to serve as the recording layer 215, 5 nm-thick $(ZrO_2)_{25}(SiO_2)_{25}(Cr_2O_3)_{50}$ to serve as the interface layer 216, and 45 nm-thick $(ZnS)_{80}(SiO_2)_{20}$ to serve as the dielectric layer 217 were stacked sequentially on the surface of the substrate 201 on which the guide grooves had been formed. Thus, the first information layer 210 was formed.

Next, the interlayer 203 with the guide grooves was formed with a thickness of 25 μm on the surface of the dielectric layer 217. 18 nm-thick $TiO_2$ to serve as the dielectric layer 221, a 13 nm-thick Ag—Cu alloy to serve as the reflective layer 222, 12 nm-thick $(ZrO_2)_{25}(SiO_2)_{25}(Cr_2O_3)_{50}$ to serve as the dielectric layer 223, the recording layer 225 with a thickness of 6 nm, 5 nm-thick $(ZrO_2)_{25}(SiO_2)_{25}(Cr_2O_3)_{50}$ to serve as the interface layer 226, and 35 nm-thick $(ZnS)_{80}(SiO_2)_{20}$ to serve as the dielectric layer 227 were stacked sequentially on the surface of the interlayer 203 on which the guide grooves had been formed. The interface layer 224 was not included therein. Thus, the second information layer 220 was formed.

The sputtering conditions for each of the layers will be described. All of the sputtering targets used had a round shape and were 100 mm in diameter and 6 mm in thickness. The layers from the reflective layer 212 to the interface layer 214 were formed under the same conditions as those used for forming the layers from the reflective layer 112 to the interface layer 114 of the Example 1. As the recording layer 215, the recording layer with a composition ratio of $Sb_{50}C_{30}Al_{20}$ was formed by sputtering an $Sb_{47}C_{33}Al_{20}$ sputtering target in an Ar gas atmosphere at a pressure of 0.13 Pa and at an output of 100 W. The interface layer 216 and the dielectric layer 217 were formed under the same conditions as those used for forming the interface layer 116 and the dielectric layer 117 of the Example 1.

The substrate 201 on which the first information layer 210 had been formed as described above was taken out from the sputtering apparatus. Next, the interlayer 203 was formed by the following procedure. First, the ultraviolet curable resin was applied to the surface of the dielectric layer 217 by the spin coat method. Next, the polycarbonate substrate was prepared, on a surface of which projections and depressions (with a depth of 20 nm and a groove-groove distance of 0.32 μm) in a shape complementary to that of the guide grooves to be formed on the interlayer were formed, and the surface of the polycarbonate substrate was placed on the ultraviolet curable resin. It was irradiated with an ultraviolet ray in this state to cure the resin, and then the polycarbonate substrate with the projections and depressions was separated therefrom. Thereby, the guide grooves with the same shape as that of the guide grooves on the substrate 201 were formed on the surface of the interlayer 203.

The substrate 201 on which the layers up to the interlayer 203 had been formed was set in the sputtering apparatus again, and the second information layer 220 was formed on the surface of the interlayer 203. First, the dielectric layer 221 was formed on the interlayer 203. The dielectric layer 221 was formed by sputtering a $TiO_2$ sputtering target in a mixed gas atmosphere in which Ar gas and $O_2$ gas were mixed at a volume ratio of 97:3 at a pressure of 0.13 Pa and at an output of 200 W by using the pulse-generating-type direct current power supply. Subsequently, the reflective layer 222 was formed by sputtering an Ag—Cu alloy sputtering target in an Ar gas atmosphere at a pressure of 0.4 Pa and at an output of 100 W by using the direct current power supply. The dielectric layer 223 was formed by sputtering a $(ZrO_2)_{25}(SiO_2)_{25}(Cr_2O_3)_{50}$ sputtering target in an Ar gas atmosphere at a pressure of 0.13 Pa and at an output of 200 W by using the high frequency power supply.

The recording layer 225 was formed by sputtering an Sb—C—Al sputtering target in an Ar gas atmosphere at a pressure of 0.13 Pa and at an output of 50 W by using the direct current power supply. With this method, for the medium 200-1, the recording layer with a composition ratio of $Sb_{60}C_{36}Al_4$ was formed by sputtering an $Sb_{56}C_{40}Al_4$ sputtering target. For the medium 200-2, the recording layer with a composition ratio of $Sb_{60}C_{32}Al_8$ was formed by sputtering an $Sb_{57}C_{35}Al_8$ sputtering target. For the medium 200-3, the recording layer with a composition ratio of $Sb_{60}C_{24}Al_{16}$ was formed by sputtering an $Sb_{58}C_{26}Al_{16}$ sputtering target. For the medium 200-4, the recording layer with a composition ratio of $Sb_{60}C_{20}Al_{20}$ was formed by sputtering an $Sb_{58}C_{22}Al_{20}$ sputtering target. For the medium 200-5, the recording layer with a composition ratio of $Sb_{60}C_{16}Al_{24}$ was formed by sputtering an $Sb_{58}C_{18}Al_{24}$ sputtering target. The interface layer 226 and the dielectric layer 227 were formed under the same conditions as those used for forming the interface layer 116 and the dielectric layer 117 of the Example 1.

The substrate 201, with the second information layer 220 formed on the interlayer 203 as described above, was taken out from the sputtering apparatus. Then, the ultraviolet curable resin was applied with a thickness of 75 μm to the surface of the dielectric layer 227 by the spin coat method, and the resin was irradiated with an ultraviolet ray to be cured. Thus, the transparent layer 202 was formed.

After the completion of the step of forming the transparent layer, the initialization step was performed. In the initialization step, the recording layer 215 was initialized first, then the recording layer 225 was initialized by using the 810 nm-wavelength semiconductor laser. Both of them were crystallized almost all over an annular region extending from a radial position of 22 mm to 60 mm. Thereby, the initialization step was completed, and the productions of the information recording media 200 numbered 200-1 to 200-5 were completed.

In the media 200-1 to 200-5 thus formed, the first information layer 210 and the second information layer 220 both had Rc of approximately 5% and Ra of approximately 1% as the effective reflectance of their mirror surface areas. The laser beam 10 that passed through the second information layer 220 was used to measure the reflectance of the first information layer 210. The second information layer 220 had Tc of approximately 55% and Ta of approximately 50% as the optical transmittance. The transmittance was measured using a medium with a configuration in which the second information layer 220 and the transparent layer 202 had been formed on the substrate 201, with half of its surface being initialized, by using a spectrophotometer.

Next, a description will be made with respect to the method for evaluating the recording/reproducing properties, focusing on the differences from the methods of the Examples 1 and 2. 4× speed recording was performed on each of the first information layer 210 and the second information layer 220. The reproduction of the recorded signals was evaluated at 1× speed under irradiation with a 0.70 mW laser beam. The reproduction may be evaluated at a linear velocity higher than 1× speed and with a reproducing power higher than 0.70 mW. The method for evaluating the reliability is the same as in the Example 1. Table 3 shows the results of the evaluations at 4× speed on the media 200-1 to 200-5 for (1) 2T CNR, (2) 2T erasure rate, (3) CNR variation, and (4) erasure rate variation. In Table 3: (1) with respect to the 2T CNR, ○ denotes at least 42 dB, Δ denotes at least 37 dB but less than 42 dB, and x denotes less than 37 dB; (2) with respect to the 2T erasure rate, ○ denotes at least 27 dB, Δ denotes at least 22 dB but less than 27 dB, and x denotes less than 22 dB; (3) with respect to the CNR variation, ○ denotes less than 1 dB, Δ denotes at least 1 dB but less than 3 dB, and x denotes at least 3 dB; and (4) with respect to the erasure rate variation, ○ denotes less than 3 dB, Δ denotes at least 3 dB but less than 5 dB, and x denotes at least 5 dB (different judgment criteria were used in the present example because the information layer located closer to the laser beam incident side is allowed to have a larger allowance for warpage of the medium and thereby the desired values of the signal quality can be set less stringently for the second information layer 220 than for the first information layer 210.) x means that it is difficult to use the medium at the indicated linear velocity, and ○ and Δ mean that the medium is usable. ○ is more preferable than Δ. The judgments as ◉, ○, Δ, and x in the comprehensive evaluation were made in the same manner as in the Example 1.

TABLE 3

| Medium number | Material of recording layer 225 (subscripts denote atomic percentages) | CNR | Erasure rate | CNR variation | Erasure rate variation | Comprehensive evaluation |
|---|---|---|---|---|---|---|
| 200-1 | $Sb_{60}C_{36}Al_4$ | ○ | ○ | ○ | ○ | ◉ |
| 200-2 | $Sb_{60}C_{32}Al_8$ | ○ | ○ | ○ | ○ | ◉ |
| 200-3 | $Sb_{60}C_{24}Al_{16}$ | ○ | ○ | ○ | ○ | ◉ |
| 200-4 | $Sb_{60}C_{20}Al_{20}$ | ○ | ○ | ○ | ○ | ◉ |
| 200-5 | $Sb_{60}C_{16}Al_{24}$ | ○ | ○ | ○ | Δ | ○ |

As shown in Table 3, the media 200-1 to 200-5 were evaluated as ○ or Δ for all the items, so they can be used at 4× speed. Particularly, media 200-1 to 200-4, in which x≧y, were evaluated as ○ for all the items. The fact that both of the recording/reproducing properties and the reliability were attained reveals that it is more preferable when x≧y is satisfied. On all of the media 200-1 to 200-5, the Pw was 16 mW or less and the Pe was 10 mW or less. Since the recording layer 225 of the present example had a thickness as small as 6 nm, which was smaller than that of the recording layers 115 of the Examples 1 and 2, the recording layer 225 contained 60 atom % of Sb and had a higher crystallization rate so as to allow the media of the present example to show satisfactory results.

Example 4

In Example 4, the information recording media 300 of FIG. 3 were produced, and the relationships between the composition ratio of the recording layer 335 and the recording/reproducing properties and between the composition ratio of the recording layer 335 and the reliability were evaluated. $Sb_{100-x-y}C_xMg_y$ was used for the recording layer 335. Five of the information recording media 300 including the recording layer 335 with a different composition ratio were produced and numbered from 300-1 to 300-5. x+y was equal to 30 in the media 300-1 to 300-5.

Hereinafter, the present example will be described in detail. First, the method for producing the information recording medium 300 will be described. The sputtering (film forming) apparatus shown in FIG. 9 was used for the production. In the Examples 300-1 to 300-5, the same material, thickness, and sputtering conditions were used for the same layers, except for the recording layers 335.

The material and the thickness of each of the layers will be described. The same substrate as the substrate 101 of the Example 1 was prepared as the substrate 301 and set in the sputtering apparatus. 100 nm-thick Ag—Cu alloy to serve as the reflective layer 312, 10 nm-thick $CeO_2$ to serve as the dielectric layer 313, 3 nm-thick $(ZrO_2)_{25}(SiO_2)_{25}(Cr_2O_3)_{50}$ to serve as the interface layer 314, 10 nm-thick $Sb_{50}C_{30}Al_{20}$ to serve as the recording layer 315, 5 nm-thick $(ZrO_2)_{25}(SiO_2)_{25}(Cr_2O_3)_{50}$ to serve as the interface layer 316, and 45 nm-thick $(ZnS)_{80}(SiO_2)_{20}$ to serve as the dielectric layer 317 were stacked sequentially on the surface of the substrate 301 on which the guide grooves had been formed. Thus, the first information layer 310 was formed.

Next, the interlayer 303 having the guide grooves was formed with a thickness of 23 μm on the surface of the dielectric layer 317. 12 nm-thick $Nb_2O_5$ to serve as the dielectric layer 321, a 10 nm-thick Ag—Cu alloy to serve as the reflective layer 322, 10 nm-thick $(ZrO_2)_{25}(SiO_2)_{25}(Cr_2O_3)_{50}$ to serve as the dielectric layer 323, 5.5 nm-thick $Sb_{60}C_{24}Al_{16}$ to serve as the recording layer 325, 5 nm-thick $(ZrO_2)_{25}(SiO_2)_{25}(Cr_2O_3)_{50}$ to serve as the interface layer 326, and 44 nm-thick $(ZnS)_{80}(SiO_2)_{20}$ to serve as the dielectric layer 327 were stacked sequentially on the surface of the interlayer 303 on which the guide grooves had been formed. The interface layer 324 was not included therein. Thus, the second information layer 320 was formed.

Next, the interlayer 304 having the guide grooves was formed with a thickness of 14 μm on the surface of the dielectric layer 327. 19 nm-thick $TiO_2$ to serve as the dielectric layer 331, a 10 nm-thick Ag—Cu alloy to serve as the reflective layer 332, 11 nm-thick $(ZrO_2)_{25}(SiO_2)_{25}(Cr_2O_3)_{50}$ to serve as the dielectric layer 333, the recording layer 335 with a thickness of 4.5 nm, 5 nm-thick $(ZrO_2)_{25}(SiO_2)_{25}(Cr_2O_3)_{50}$ to serve as the interface layer 336, and 32 nm-thick $(ZnS)_{80}(SiO_2)_{20}$ to serve as the dielectric layer 337 were stacked sequentially on the surface of the interlayer 304 on which the guide grooves had been formed. The interface layer 334 was not included therein. Thus, the third information layer 330 was formed.

The sputtering conditions for each of the layers will be described. All of the sputtering targets used had a round shape and were 100 mm in diameter and 6 mm in thickness. The layers from the reflective layer 312 to the interface layer 314 were formed under the same conditions as those used for forming the layers from the reflective layer 112 to the interface layer 114 of the Example 1. The recording layer 315 was formed under the same conditions as those used for forming the recording layer 215 of the Example 3. The interface layer 316 and the dielectric layer 317 were formed under the same conditions as those used for forming the interface layer 116 and the dielectric layer 117 of the Example 1, respectively. The substrate 301 on which the first information layer 310 had been formed as described above was taken out from the sputtering apparatus. Next, the interlayer 303 was formed under the same conditions as those used for forming the interlayer 203 of the Example 3.

The substrate 301 on which the layers up to the interlayer 303 had been formed was set in the sputtering apparatus again, and the second information layer 320 was formed on the surface of the interlayer 303. The dielectric layer 321 was formed on the interlayer 303 by sputtering an $Nb_2O_5$ sputtering target in a mixed gas atmosphere in which Ar gas and $O_2$ gas were mixed at a volume ratio of 97:3 at a pressure of 0.13 Pa and at an output of 200 W by using the high frequency power supply. Subsequently, the reflective layer 322 was formed under the same conditions as those used for forming the reflective layer 222 of the Example 3. The dielectric layer 323 was formed under the same conditions as those used for forming the dielectric layer 223 of the Example 3. As the recording layer 325, the recording layer with a composition ratio of $Sb_{60}C_{24}Al_{16}$ was formed by sputtering an $Sb_{58}C_{26}Al_{16}$ sputtering target in an Ar gas atmosphere at a pressure of 0.13 Pa by using the direct current power supply. The interface layer 326 and the dielectric layer 327 were formed under the same conditions as those used for forming the interface layer 116 and the dielectric layer 117 of the Example 1, respectively. The substrate 301 on which the information layers up to the second information layer 320 had been formed as described above was taken out from the sputtering apparatus. Next, the interlayer 304 was formed under the same conditions as those used for forming the interlayer 203 of the Example 3.

The substrate 301 on which the layers up to the interlayer 304 had been formed was set in the sputtering apparatus again, and the third information layer 330 was formed on the surface of the interlayer 304. First, the dielectric layer 331 was formed on the interlayer 304 under the same conditions as those used for forming the dielectric layer 221 of the Example 3. The reflective layer 332 and the dielectric layer 333 were formed under the same conditions as those used for forming the reflective layer 222 and the dielectric layer 223 of the Example 3, respectively.

The recording layer 335 was formed by sputtering an Sb—C—Mg sputtering target in an Ar gas atmosphere at a pressure of 0.13 Pa and at an output of 50 W by using the direct current power supply. With this method, for the medium 300-1, the recording layer with a composition ratio of $Sb_{70}C_{27}Mg_3$ was formed by sputtering an $Sb_{67}C_{30}Mg_3$ sputtering target. For the medium 300-2, the recording layer with a composition ratio of $Sb_{70}C_{24}Mg_6$ was formed by sputtering an $Sb_{69}C_{26}Mg_5$ sputtering target. For the medium 300-3, the recording layer with a composition ratio of $Sb_{70}C_{18}Mg_{12}$ was formed by sputtering an $Sb_{69}C_{20}Mg_{11}$ sputtering target. For the medium 300-4, the recording layer with a composition ratio of $Sb_{70}C_{15}Mg_{15}$ was formed by sputtering an $Sb_{69}C_{17}Mg_{14}$ sputtering target. For the medium 300-5, the recording layer with a composition ratio of $Sb_{70}C_{12}Mg_{18}$ was formed by sputtering an $Sb_{71}C_{13}Mg_{16}$ sputtering target. The interface layer 336 and the dielectric layer 337 were formed under the same conditions as those used for forming the interface layer 116 and the dielectric layer 117 of the Example 1, respectively.

The substrate 301, with the third information layer 330 formed on the interlayer 304 as described above, was taken out from the sputtering apparatus. Then, the ultraviolet curable resin was applied with a thickness of 63 µm to the surface of the dielectric layer 337 by the spin coat method, and the resin was irradiated with an ultraviolet ray to be cured. Thus, the transparent layer 302 was formed.

After the completion of the step of forming the transparent layer, the initialization step was performed. In the initialization step, the recording layer 315 was initialized first, then the recording layer 325 was initialized, and finally the recording layer 335 was initialized, by using the 810 nm-wavelength semiconductor laser. All of them were crystallized almost all over an annular region extending from a radial position of 22 mm to 60 mm. Thereby, the initialization step was completed, and the productions of the information recording media 300 numbered 300-1 to 300-5 were completed.

In the media 300-1 to 300-5 thus formed, the first information layer 310, the second information layer 320, and the third information layer 330 all had Rc of approximately 2.5% and Ra of approximately 0.5% as the effective reflectance of their mirror surface areas. The laser beam 10 that passed through the second information layer 320 and the third information layer 330 was used to measure the reflectance of the first information layer 310. Likewise, the laser beam 10 that passed through the third information layer 330 was used to measure the reflectance of the second information layer 320. The second information layer 320 had Tc of approximately 58% and Ta of approximately 54% as the optical transmittance. The third information layer 330 had Tc of approximately 67% and Ta of approximately 63% as the optical transmittance. The transmittances were measured in the same manner as in the Example 3.

Next, a description will be made with respect to the method for evaluating the recording/reproducing properties, focusing on the differences from the methods of the Examples 1 to 3. 4× speed recording was performed on each of the first information layer 310, the second information layer 320, and the third information layer 330. The reproduction of the recorded signals was evaluated at 1× speed under irradiation with a 1.00 mW laser beam. The reproduction may be evaluated at a linear velocity higher than 1× speed and with a reproducing power higher than 1.00 mW. The method for evaluating the reliability was the same as in the Example 1. Table 4 shows the results of the evaluations at 4× speed on the media 300-1 to 300-5 for (1) 2T CNR, (2) 2T erasure rate, (3) CNR variation, and (4) erasure rate variation. In Table 4: (1) with respect to the 2T CNR, ○ denotes at least 40 dB, Δ denotes at least 35 dB but less than 40 dB, and x denotes less than 35 dB; (2) with respect to the 2T erasure rate, ○ denotes at least 25 dB, Δ denotes at least 20 dB but less than 25 dB, and x denotes less than 20 dB; (3) with respect to the CNR variation, ○ denotes less than 1 dB, Δ denotes at least 1 dB but less than 3 dB, and x denotes at least 3 dB; and (4) with respect to the erasure rate variation, ○ denotes less than 3 dB, Δ denotes at least 3 dB but less than 5 dB, and x denotes at least 5 dB (different judgments criteria were used in the present example because the desired values of the signal quality can be set less stringently for the third information layer 330 than for the second information layer 320). The judgments as ◎, ○, Δ, and x in the comprehensive evaluation were made in the same manner as in the Example 1.

TABLE 4

| Medium number | Material of recording layer 335 (subscripts denote atomic percentages) | CNR | Erasure rate | CNR variation | Erasure rate variation | Comprehensive evaluation |
|---|---|---|---|---|---|---|
| 300-1 | $Sb_{70}C_{27}Mg_{3}$ | ○ | ○ | ○ | ○ | ◎ |
| 300-2 | $Sb_{70}C_{24}Mg_{6}$ | ○ | ○ | ○ | ○ | ◎ |
| 300-3 | $Sb_{70}C_{18}Mg_{12}$ | ○ | ○ | ○ | ○ | ◎ |
| 300-4 | $Sb_{70}C_{15}Mg_{15}$ | ○ | ○ | ○ | ○ | ◎ |
| 300-5 | $Sb_{70}C_{12}Mg_{18}$ | ○ | ○ | ○ | Δ | ○ |

As shown in Table 4, the media 300-1 to 300-5 were evaluated as ○ or Δ for all the items, so they can be used at 4× speed. Particularly, media 300-1 to 300-4, in which x≧y, were evaluated as ○ for all the items. The fact that both of the recording/reproducing properties and the reliability were attained reveals that it is more preferable when x≧y is satisfied. On all of the media 300-1 to 300-5, the Pw was 18 mW or less and the Pe was 11 mW or less. Since the recording layer 335 of the present example had a thickness as small as 4.5 nm, which was smaller than that of the recording layer 225 of the Example 3, the recording layer 335 contained 70 atom % of Sb and had a higher crystallization rate so as to allow the media of the present example to show satisfactory results.

Example 5

In Example 5, the information recording media 400 of FIG. 4 were produced, and the relationships between the composition ratio of the recording layer 445 and the recording/reproducing properties and between the composition ratio of the recording layer 445 and the reliability were evaluated. $Sb_{100-x-y}C_{x}B_{y}$ was used for the recording layer 445. Five of the information recording media 400 including the recording layer 445 with a different composition ratio were produced and numbered from 400-1 to 400-5. x+y was equal to 20 in the media 400-1 to 400-5.

Hereinafter, the present example will be described in detail. First, the method for producing the information recording medium 400 will be described. The sputtering (film forming) apparatus shown in FIG. 9 was used for the production. In the Examples 400-1 to 400-5, the same material, thickness, and sputtering conditions were used for the same layers, except for the recording layers 445.

The material and the thickness of each of the layers will be described. The same substrate as the substrate 101 of the Example 1 was prepared as the substrate 401 and set in the sputtering apparatus. 100 nm-thick Ag—Cu alloy to serve as the reflective layer 412, 10 nm-thick $CeO_2$ to serve as the dielectric layer 413, 3 nm-thick $(ZrO_2)_{25}(SiO_2)_{25}(Cr_2O_3)_{50}$ to serve as the interface layer 414, 10 nm-thick $Sb_{50}C_{30}Al_{20}$ to serve as the recording layer 415, 5 nm-thick $(ZrO_2)_{25}(SiO_2)_{25}(Cr_2O_3)_{50}$ to serve as the interface layer 416, and 48 nm-thick $(ZnS)_{80}(SiO_2)_{20}$ to serve as the dielectric layer 417 were stacked sequentially on the surface of the substrate 401 on which the guide grooves had been formed. Thus, the first information layer 410 was formed.

Next, the interlayer 403 having the guide grooves was formed with a thickness of 18 μm on the surface of the dielectric layer 417. 12 nm-thick $Nb_2O_5$ as the dielectric layer 421, a 10 nm-thick Ag—Cu alloy to serve as the reflective layer 422, 10 nm-thick $(ZrO_2)_{25}(SiO_2)_{25}(Cr_2O_3)_{50}$ to serve as the dielectric layer 423, 5.5 nm-thick $Sb_{60}C_{24}Al_{16}$ to serve as the recording layer 425, 5 nm-thick $(ZrO_2)_{25}(SiO_2)_{25}(Cr_2O_3)_{50}$ to serve as the interface layer 426, and 44 nm-thick $(ZnS)_{80}(SiO_2)_{20}$ to serve as the dielectric layer 427 were stacked sequentially on the surface of the interlayer 403 on which the guide grooves had been formed. The interface layer 424 was not included therein. Thus, the second information layer 420 was formed.

Next, the interlayer 404 having the guide grooves was formed with a thickness of 25 μm on the surface of the dielectric layer 427. 21 nm-thick $Nb_2O_5$ to serve as the dielectric layer 431, a 10 nm-thick Ag—Cu alloy to serve as the reflective layer 432, 10 nm-thick $(ZrO_2)_{25}(SiO_2)_{25}(Cr_2O_3)_{50}$ to serve as the dielectric layer 433, 4.5 nm-thick $Sb_{70}C_{18}Mg_{12}$ to serve as the recording layer 435, 5 nm-thick $(ZrO_2)_{25}(SiO_2)_{25}(Cr_2O_3)_{50}$ to serve as the interface layer 436, and 35 nm-thick $(ZnS)_{80}(SiO_2)_{20}$ to serve as the dielectric layer 437 were stacked sequentially on the surface of the interlayer 404 on which the guide grooves had been formed. The interface layer 434 was not included therein. Thus, the third information layer 430 was formed.

Next, the interlayer 405 having the guide grooves was formed with a thickness of 14 μm on the surface of the dielectric layer 437. 14 nm-thick $TiO_2$ to serve as the dielectric layer 441, a 10 nm-thick Ag—Cu alloy to serve as the reflective layer 442, 5 nm-thick $(ZrO_2)_{25}(SiO_2)_{25}(Cr_2O_3)_{50}$ to serve as the dielectric layer 443, the recording layer 445 with a thickness of 4 nm, 5 nm-thick $(ZrO_2)_{25}(SiO_2)_{25}(Cr_2O_3)_{50}$ to serve as the interface layer 446, and 33 nm-thick $(ZnS)_{80}(SiO_2)_{20}$ to serve as the dielectric layer 447 were stacked sequentially on the surface of the interlayer 405 on which the guide grooves had been formed. The interface layer 444 was not included therein. Thus, the forth information layer 440 was formed.

The sputtering conditions for each of the layers will be described. All of the sputtering targets used had a round shape and were 100 mm in diameter and 6 mm in thickness. The layers from the reflective layer 412 to the interface layer 414 were formed under the same conditions as those used for forming the layers from the reflective layer 112 to the interface layer 114 of the Example 1. The recording layer 415 was formed under the same conditions as those used for forming the recording layer 215 of the Example 3. The interface layer 416 and the dielectric layer 417 were formed under the same conditions as those used for forming the interface layer 116 and the dielectric layer 117 of the Example 1, respectively. The substrate 401 on which the first information layer 410 had been formed as described above was taken out from the sputtering apparatus. Next, the interlayer 403 was formed under the same conditions as those used for forming the interlayer 203 of the Example 3.

The substrate 401 on which the layers up to the interlayer 403 had been formed was set in the sputtering apparatus again, and the second information layer 420 was formed on the surface of the interlayer 403. First, the dielectric layer 421 was formed on the interlayer 403 under the same conditions as those used for forming the dielectric layer 321 of the Example 4. Subsequently, the reflective layer 422 and the dielectric layer 423 were formed under the same conditions as those used for forming the reflective layer 222 and the dielectric layer 223 of the Example 3, respectively. The recording layer 425 was formed under the same conditions as those used for forming the recording layer 325 of the Example 4. The interface layer 426 and the dielectric layer 427 were formed under the same conditions as those used for forming the interface layer 116 and the dielectric layer 117 of the Example 1, respectively. The substrate 401 on which the information layers up to the second information layer 420 had been formed as described above was taken out from the sputtering apparatus. Next, the interlayer 404 was formed under the same conditions as those used for forming the interlayer 203 of the Example 3.

The substrate 401 on which the layers up to the interlayer 404 had been formed was set in the sputtering apparatus again, and the third information layer 430 was formed on the surface of the interlayer 404. First, the dielectric layer 431 was formed on the interlayer 404 under the same conditions as those used for forming the dielectric layer 321 of the Example 4. Next, the reflective layer 432 and the dielectric layer 433 were formed under the same conditions as those used for forming the reflective layer 222 and the dielectric layer 223 of the Example 3, respectively. As the recording layer 435, the recording layer having a composition ratio of $Sb_{70}C_{18}Mg_{12}$ was formed by sputtering an $Sb_{69}C_{20}Mg_{11}$ sputtering target in an Ar gas atmosphere at a pressure of 0.13 Pa and at an output of 50 W by using the direct current power supply. The interface layer 436 and the dielectric layer 437 were formed under the same conditions as those used for forming the interface layer 116 and the dielectric layer 117 of the Example 1, respectively. The substrate 401 on which the information layers up to the third information layer 430 had been formed as described above was taken out from the sputtering apparatus. Next, the interlayer 405 was formed under the same conditions as those used for forming the interlayer 203 of the Example 3.

The substrate 401 on which the layers up to the interlayer 405 had been formed was set in the sputtering apparatus again, and the fourth information layer 440 was formed on the surface of the interlayer 405. First, the dielectric layer 441 was formed on the interlayer 405 under the same conditions as those used for forming the dielectric layer 221 of the Example 3. Next, the reflective layer 442 and the dielectric layer 443 were formed under the same conditions as those used for forming the reflective layer 222 and the dielectric layer 223 of the Example 3, respectively.

The recording layer 445 was formed by sputtering an Sb—C—B sputtering target in an Ar gas atmosphere at a pressure of 0.13 Pa and at an output of 50 W by using the direct current power supply. With this method, for the medium 400-1, the recording layer with a composition ratio of $Sb_{80}C_{18}B_2$ was formed by sputtering an $Sb_{78}C_{20}B_2$ sputtering target. For the medium 400-2, the recording layer with a composition ratio of $Sb_{80}C_{16}B_4$ was formed by sputtering an $Sb_{77}C_{18}B_5$ sputtering target. For the medium 400-3, the recording layer with a composition ratio of $Sb_{80}C_{12}B_8$ was formed by sputtering an $Sb_{77}C_{13}B_{10}$ sputtering target. For the medium 400-4, the recording layer with a composition ratio of $Sb_{80}C_{10}B_{10}$ was formed by sputtering an $Sb_{77}C_{11}B_{12}$ sputtering target. For the medium 400-5, the recording layer with a composition ratio of $Sb_{80}C_8B_{12}$ was formed by sputtering an $Sb_{77}C_9B_{14}$ sputtering target. The interface layer 446 and the dielectric layer 447 were formed under the same conditions as those used for forming the interface layer 116 and the dielectric layer 117 of the Example 1, respectively. The substrate 401, with the fourth information layer 440 formed on the interlayer 405 as described above, was taken out from the sputtering apparatus. Then, the ultraviolet curable resin was applied with a thickness of 43 μm to the surface of the dielectric layer 447 by the spin coat method, and the resin was irradiated with an ultraviolet ray to be cured. Thus, the transparent layer 402 was formed.

After the completion of the step of forming the transparent layer, the initialization step was performed. In the initialization step, the recording layer 415 was initialized first, then the recording layer 425 was initialized, subsequently the recording layer 435 was initialized, and finally the recording layer 445 was initialized, by using the 810 nm-wavelength semiconductor laser. All of them were crystallized almost all over an annular region extending from a radial position of 22 mm to 60 mm. Thereby, the initialization step was completed, and the productions of the information recording media 400 numbered 400-1 to 400-5 were completed.

In the media 400-1 to 400-5 thus formed, the first information layer 410, the second information layer 420, the third information layer 430, and the fourth information layer 440 all had Rc of approximately 1.3% and Ra of approximately 0.3% as the effective reflectance of their mirror surface areas. The laser beam 10 that passed through the second information layer 420, the third information layer 430, and the fourth information layer 440 was used to measure the reflectance of the first information layer 410. Likewise, the laser beam 10 that passed through the third information layer 430 and the fourth information layer 440 was used to measure the reflectance of the second information layer 420. The second information layer 420 had Tc of approximately 57% and Ta of approximately 53% as the optical transmittance. The third information layer 430 had Tc of approximately 67% and Ta of approximately 63% as the optical transmittance. The fourth information layer 440 had Tc of approximately 71% and Ta of approximately 66% as the optical transmittance. The transmittances were measured in the same manner as in the Example 3.

Next, a description will be made with respect to the method for evaluating the recording/reproducing properties, focusing on the differences from the methods of the Examples 1 to 4. 4× speed recording was performed on each of the first information layer 410, the second information layer 420, the third information layer 430, and the fourth information layer 440. The reproduction of the recorded signals was evaluated at 1× speed under irradiation with a 1.40 mW laser beam. The reproduction may be evaluated at a linear velocity higher than 1× speed and with a reproducing power higher than 1.40 mW. The method for evaluating the reliability is the same as in the Example 1. Table 5 shows the results of the evaluations at 4× speed on the media 400-1 to 400-5 for (1) 2T CNR, (2) 2T erasure rate, (3) CNR variation, and (4) erasure rate variation. In Table 5: (1) with respect to the 2T CNR, ○ denotes at least 38 dB, Δ denotes at least 33 dB but less than 38 dB, and x denotes less than 33 dB; (2) with respect to the 2T erasure rate, ○ denotes at least 23 dB, Δ denotes at least 18 dB but less than 23 dB, and x denotes less than 18 dB; (3) with respect to the CNR variation, ○ denotes less than 1 dB, Δ denotes at least 1 dB but less than 3 dB, and x denotes at least 3 dB; and (4) with respect to the erasure rate variation, ○ denotes less than 3 dB, Δ denotes at least 3 dB but less than 5 dB, and x denotes at least 5 dB. Different judgment criteria were used in the present example because the desired values of the signal quality can be set less stringently for the fourth information layer 440 than for the third information layer 430. The judgments as ⊚, ○, Δ, and x in the comprehensive evaluation were made in the same manner as in the Example 1.

TABLE 5

| Medium number | Material of recording layer 445 (subscripts denote atomic percentages) | CNR | Erasure rate | CNR variation | Erasure rate variation | Comprehensive evaluation |
|---|---|---|---|---|---|---|
| 400-1 | $Sb_{80}C_{18}B_2$ | ○ | ○ | ○ | ○ | ⊚ |
| 400-2 | $Sb_{80}C_{16}B_4$ | ○ | ○ | ○ | ○ | ⊚ |
| 400-3 | $Sb_{80}C_{12}B_8$ | ○ | ○ | ○ | ○ | ⊚ |
| 400-4 | $Sb_{80}C_{10}B_{10}$ | ○ | ○ | ○ | ○ | ⊚ |
| 400-5 | $Sb_{80}C_8B_{12}$ | ○ | ○ | ○ | Δ | ○ |

As shown in Table 5, the media 400-1 to 400-5 were evaluated as ○ or Δ for all the items, so they can be used at 4× speed. Particularly, media 400-1 to 400-4, in which x≧y, were evaluated as ○ for all the items. The fact that both of the recording/reproducing properties and the reliability were attained reveals that it is more preferable when x≧y is satisfied. On all of the media 400-1 to 400-5, the Pw was 20 mW or less and the Pe was 12 mW or less. Since the recording layer 445 of the present example had a thickness as small as 4 nm, which was smaller than that of the recording layer 335 of the Example 4, the recording layer 445 contained 80 atom % of Sb and had a higher crystallization rate so as to allow the media of the present example to show satisfactory results.

Example 6

In Example 6, the information recording medium 100 of FIG. 1 was produced, and the relationships between the thickness of the recording layer 115 and the recording/reproducing properties and between the thickness of the recording layer 115 and the reliability were evaluated. $Sb_{50}C_{30}Al_{20}$ was used for the recording layer 115. Five of the information recording media 100 including the recording layer 115 with a different thickness were produced and numbered from 100-21 to 100-25.

Since the content of the present example is almost the same as that of the Example 1, the differences from the Example 1 will be described in detail. Since the thickness of the recording layer 115 included in the information layer 110 varied among the media 100-21 to 100-25, the thickness of the dielectric layer 117 was determined for each of the media so that Rc of approximately 21% and Ra of approximately 4% were obtained. In the medium 100-21, the recording layer 115 was 7 nm thick and the dielectric layer 117 was 77 nm thick. In the medium 100-22, the recording layer 115 was 9 nm thick and the dielectric layer 117 was 74 nm thick. In the medium 100-23, the recording layer 115 was 11 nm thick and the dielectric layer 117 was 49 nm thick. In the medium 100-24, the recording layer 115 was 13 nm thick and the dielectric layer 117 was 51 nm thick. In the medium 100-25, the recording layer 115 was 15 nm thick and the dielectric layer 117 was 52 nm thick.

The recording/reproducing properties and the reliability were evaluated according to the method for evaluating the recording/reproducing properties and the method for evaluating the reliability used in the Example 1, respectively. In the present example, the media were measured for 2T CNR, 2T erasure rate, CNR variation, and erasure rate variation at 4× speed (19.68 m/second, 144 Mbps). Table 6 shows the results thereof. The judgments as ○, Δ, and × in Table 6 were made in the same manner as in the Example 1. The judgments as ⊚, ○, Δ, and × in the comprehensive evaluation were made in the same manner as in the Example 1.

TABLE 6

| Medium number | Thickness of recording layer 115 (nm) | CNR | Erasure rate | CNR variation | Erasure rate variation | Comprehensive evaluation |
|---|---|---|---|---|---|---|
| 100-21 | 7 | ○ | ○ | ○ | ○ | ⊚ |
| 100-22 | 9 | ○ | ○ | ○ | ○ | ⊚ |
| 100-23 | 11 | ○ | ○ | ○ | ○ | ⊚ |
| 100-24 | 13 | ○ | ○ | ○ | ○ | ⊚ |
| 100-25 | 15 | ○ | ○ | Δ | ○ | ○ |

As shown in Table 6, the media 100-21 to 100-25 were evaluated as ○ or Δ for all the items, so they can be used at 4× speed. Particularly, a thickness in the range of 7 nm to 13 nm was preferable for the recording layer 115 because it allowed the media to be evaluated as ○ for all the items. When the recording layer had a larger thickness, it was difficult to diffuse the heat generated in the recording layer 115 toward the reflective layer 112, and made it difficult to form small recording marks. Thus, the thickness of the recording layer preferably is 15 nm or less.

Example 7

In Example 7, the information recording media 400 of FIG. 4 were produced. The composition ratio and the thickness of the recording layer 445 varied, and the relationship between these and the recording/reproducing properties was evaluated. $Sb_{100-x-y}C_xB_y$ was used for the recording layer 445. Five of the information recording media 400 including the recording layer 445 having a different composition ratio and a different thickness from each other were produced and numbered from 400-11 to 400-15.

Since the content of the present example is almost the same as that of the Example 5, the differences from the Example 5 will be described in detail. The information layers from the first information layer 410 to the third information layer 430 were prepared in the same manner as in the Example 5. Since the composition ratio and the thickness of the recording layer 445 included in the forth information layer 440 varied among the media 400-11 to 400-15, the thicknesses of the dielectric layer 441, the reflective layer 442, and the dielectric layer 447 were determined for each of the media so that Rc of approximately 1.3% and Ra of approximately 0.3% were obtained. In the medium 400-11, the dielectric layer 441 was 14 nm thick, the reflective layer 442 was 10 nm thick, the recording layer 445 with a composition of $Sb_{84}C_{9.6}B_{6.4}$ was 3.5 nm thick, and the dielectric layer 447 was 34 nm thick. In the medium 400-12, the dielectric layer 441 was 14 nm thick, the reflective layer 442 was 12 nm thick, the recording layer 445 with a composition of $Sb_{88}C_{7.2}B_{4.8}$ was 3 nm thick, and the dielectric layer 447 was 30 nm thick. In the medium 400-13, the dielectric layer 441 was 13 nm thick, the reflective layer 442 was 14 nm thick, the recording layer 445 with a composition of $Sb_{92}C_{4.8}B_{3.2}$ was 2.5 nm thick, and the dielectric layer 447 was 24 nm thick. In the medium 400-14, the dielectric layer 441 was 14 nm thick, the reflective layer 442 was 15 nm thick, the recording layer 445 with a composition of $Sb_{96}C_{2.4}B_{1.6}$ was 2 nm thick, and the dielectric layer 447 was 19 nm thick. In the medium 400-15, the dielectric layer 441 was 14 nm thick, the reflective layer 442 was 15 nm thick, the recording layer 445 with a composition of $Sb_{98}C_{1.2}B_{0.8}$ was 1.5 nm thick, and the dielectric layer 447 was 18 nm thick. To prevent the crystallization rate from being lowered, a composition ratio with a higher crystallization rate was used for the recording layer 445 when it has a small thickness.

The recording/reproducing properties were evaluated according to the method for evaluating the recording/reproducing properties used in the Example 1. In the present example, the media were measured for 2T CNR and 2T erasure rate at 4× speed (19.68 m/second, 144 Mbps). Table 7 shows the results thereof. Table 7 also shows the results of the medium 400-3 used in the Example 5. The judgments as ○, Δ, and × in Table 7 were made in the same manner as in the Example 5. The judgments as ⊚, ○, Δ, and × in the comprehensive evaluation were made in the same manner as in the Example 1.

TABLE 7

| Medium number | Material of recording layer 445 (subscripts denote atomic percentages) | Thickness of recording layer 445 (nm) | CNR | Erasure rate | Comprehensive evaluation |
|---|---|---|---|---|---|
| 400-3 | $Sb_{80}C_{12}B_8$ | 4 | ○ | ○ | ⊚ |
| 400-11 | $Sb_{84}C_{9.6}B_{6.4}$ | 3.5 | ○ | ○ | ⊚ |
| 400-12 | $Sb_{88}C_{7.2}B_{4.8}$ | 3 | ○ | ○ | ⊚ |
| 400-13 | $Sb_{92}C_{4.8}B_{3.2}$ | 2.5 | ○ | Δ | ○ |
| 400-14 | $Sb_{96}C_{2.4}B_{1.6}$ | 2 | Δ | Δ | Δ |
| 400-15 | $Sb_{98}C_{1.2}B_{0.8}$ | 1.5 | Δ | Δ | Δ |

As shown in Table 7, the media 400-11 to 400-15 were evaluated as ○ or Δ for all the items, so they can be used at 4× speed even when the thickness of the recording layer 445 is only 1.5 nm. Particularly, the media were evaluated as ○ for all the items when the recording layer 445 had a thickness of at least 3 nm. When the thickness of the recording layer was reduced, the optical absorptances Ac and Aa of the recording layer were lowered. Accordingly, the media 400-14 and 400-15 were evaluated as Δ because the CNR was insufficient at the 20 mW laser power. It is expected that irradiation with a higher laser power can increase the CNR.

Example 8

In Example 8, an experiment of forming the recording layer containing antimony (Sb), carbon (C), and the light element (L) having an atomic weight of less than 33 was conducted by using a plurality of sputtering targets. As a sample 800-1, the recording layer desired to have a composition ratio of $Sb_{60}C_{30}N_{10}$ was formed by sputtering reactively, in nitrogen, an Sb sputtering target and a C sputtering target at the same time on an Si substrate. As a sample 800-2, the recording layer desired to have a composition ratio of $Sb_{60}C_{30}Al_{10}$ was formed by sputtering an Sb sputtering target, a C sputtering target, and an Al sputtering target at the same time on an Si substrate. The recording layers thus formed were analyzed for composition ratio with the X-ray microanalyser to see if they had the desired composition ratios.

Hereinafter, the present example will be described in detail. All of the sputtering targets used had a round shape and were 100 mm in diameter and 6 mm in thickness. In order to form the recording layer having a desired composition ratio and a desired thickness by sputtering a plurality of sputtering targets at the same time, the sputtering output was determined so that the ratio of the deposition rates was equal to the composition ratio, and the thickness was controlled by the sputtering time. The procedure thereof will be described. First, each of the sputtering targets was sputtered independently at a predetermined sputtering output p1 for a given period of time so as to measure a deposition rate r1 (unit was nm/minute) in advance, respectively. Next, an output p2 was determined for each of the sputtering targets based on the deposition rate r1 so that the ratio of the deposition rates is equal to the composition ratio. Then, a deposition rate r2 of each of the sputtering targets was measured at the output p2, and the output p2 was determined once again to be more accurate, if needed. Subsequently, the sputtering targets were sputtered at the same time at the respective output p2, and a deposition rate r3 was measured. Finally, a sputtering time t1 (unit was minute) was calculated from the r3 so as to obtain the desired thickness.

The sputtering (film forming) apparatus shown in FIG. 9 was used for forming the layers. The sputtering chamber 21 was provided with one substrate holder 26, a plurality of the target electrodes 28, and a plurality of the power supply 29. First, a 12 mm×18 mm, 1 mm-thick Si substrate was fixes to the polycarbonate substrate, and then set in the sputtering apparatus. To obtain the sample 800-1, the Sb sputtering target was set to the DC power supply and sputtered reactively at p2=100 W, and the C sputtering target was set to the RF power supply and sputtered reactively at p2=500 W, at the same time in a mixed gas atmosphere in which Ar gas and $N_2$ gas were mixed at a volume ratio of 90:10. The p2 was set to 500 W for the C sputtering target because the r2 of the C sputtering target was only about 1/10 of that of the Sb sputtering target. The targets were sputtered for t1=20 minutes to form the 1 μm-thick Sb—C—N recording layer on the Si substrate. To obtain the sample 800-2, the Sb sputtering target was set to the DC power supply and sputtered at p2=100 W, the C sputtering target was set to the RF power supply and sputtered at p2=500 W, and the Al sputtering target was set to the DC power supply and sputtered at p2=25 W, at the same time in an Ar gas atmosphere. The p2 was set to 25 W for the Al sputtering target because the r2 of the Al sputtering target was approximately 70% of that of the Sb sputtering target. The targets were sputtered for t1=20 minutes to form the 1 μm-thick Sb—C—Al recording layer on the Si substrate. Table 8 shows the composition ratios of the Sb—C—N recording layer and the Sb—C—Al recording layer formed on the Si substrates as the results of the analysis using the X-ray microanalyser.

TABLE 8

| Sample number | Desired composition ratio of recording layer (subscripts denote atomic percentages) | Analytical composition ratio of recording layer (subscripts denote atomic percentages) |
| --- | --- | --- |
| 800-1 | $Sb_{60.0}C_{30.0}N_{10.0}$ | $Sb_{60.1}C_{29.6}N_{10.3}$ |
| 800-2 | $Sb_{60.0}C_{30.0}Al_{10.0}$ | $Sb_{60.5}C_{29.7}Al_{9.8}$ |

As shown in Table 8, each of the analytical composition ratios of the samples 800-1 and 800-2 was remarkably close to the desired composition ratio, with the difference therebetween being±0.5 atom % or less. This result reveals that the recording layer containing Sb, C, and the L could be formed even when a plurality of sputtering targets were used.

As an additional experiment, media 100-2-2 and 100-5-2 were produced and evaluated for the recording/reproducing properties and the reliability as in the Example 1. The media 100-2-2 and 100-5-2 had the same configurations as those of the media 100-2 and 100-5 of the Example 1, respectively, and the recording layers 115 included in the media 100-2-2 and 100-5-2 were produced by the method of the present example. As a result, the media 100-2-2 and 100-5-2 satisfactorily were evaluated as ○ for all the items as in the Example 1.

Example 9

In Example 9, an experiment was made on a memory for applying the electrical energy. FIG. 6 shows the information recording medium that allows information to be recorded thereon by an electrical means, and the system for recording the information on the medium. In the present example, the recording layer of the present invention was used as the recording layer 603 of the information recording medium 600 shown in FIG. 6.

The information recording medium 600 of the present example was produced as follows. First, the Si substrate 601 to a surface of which a nitriding treatment had been applied was prepared. The lower electrode 602 composed of Au was formed with a thickness of 100 nm in an area of 6 μm×6 μm on the substrate 601. The recording layer 603 with a composition ratio of $Sb_{60}C_{24}S_{16}$ was formed with a thickness of 50 nm in an area of 5 μm×5 μm on the lower electrode 602. Then, the upper electrode 604 composed of Au was formed thereon with a thickness of 100 nm in an area of 5 μm×5 μm.

All of the lower electrode 602, the recording layer 603, and the upper electrode 604 were formed by sputtering the sputtering target having a diameter of 100 mm and a thickness of 6 mm in an Ar gas atmosphere at a pressure of 0.13 Pa by using the direct current power supply. The substrate 601 was set in the film forming apparatus, and the lower electrode 602 was formed on the substrate 601 by sputtering an Au sputtering target at a power of 200 W. Then, the recording layer 603 was formed on the lower electrode 602 by sputtering an $Sb_{59}C_{26}S_{15}$ sputtering target at a power of 100 W. Subsequently, the upper electrode 604 was formed on the recording layer 603 by sputtering the Au sputtering target at a power of 200 W.

Next, an Au lead wire was bonded to each of the lower electrode 602 and the upper electrode 604, and the electrical information recording/reproducing apparatus 610 was connected to the information recording medium 600 via the application unit 609. The electrical information recording/reproducing apparatus 610 allowed the pulse power supply 605 to be connected to the lower electrode 602 and the upper electrodes 604 via the switch 608. Furthermore, the resistance variation caused by the phase change of the recording layer 603 was detected by the resistance measuring device 606 connected between the lower electrode 602 and the upper electrode 604 via the switch 607.

When a 5 mA, 50 ns electric current pulse was applied between the lower electrode 602 and the upper electrode 604 when the recording layer 603 was in an amorphous phase, the recording layer 603 was transferred from the amorphous phase to a crystalline phase. When a 10 mA, 10 ns electric current pulse was applied between the lower electrode 602 and the upper electrode 604 when the recording layer 603 was in a crystalline phase, the recording layer 603 was transferred from the crystalline phase to an amorphous phase. Thus, an occurrence of reversible phase change was proved.

under irradiation with the laser beam 10 at 1.40 mW. The method for evaluating the reliability was the same as in the Example 1.

Table 9 shows the results of the evaluations on (1) 2T CNR, (2) 2T erasure rate, (3) CNR variation, and (4) erasure rate variation. With the ○, Δ, and x, the first information layer 410 was evaluated in the same manner as in the Example 1, the second information layer 420 was evaluated in the same manner as in the Example 3, the third information layer 430 was evaluated in the same manner as in the Example 4, and the forth information layer 440 was evaluated in the same manner as in the Example 5. The judgments as ⊚, ○, Δ, and X in the comprehensive evaluation were made in the same manner as in the Example 1.

TABLE 9

| Medium number | Information layer number | Recording layer thickness (nm) and recording layer composition (atom %) | 2T CNR | | 2T erasure rate | | CNR variation | | Erasure rate variation | | Comprehensive evaluation |
|---|---|---|---|---|---|---|---|---|---|---|---|
| | | | 2x | 4x | 2x | 4x | 2x | 4x | 2x | 4x | |
| 400-3 | 410 | 10Sb$_{50}$C$_{30}$Al$_{20}$ | ○ | ○ | ○ | ○ | ○ | ○ | ○ | ○ | ⊚ |
| | 420 | 5.5Sb$_{60}$C$_{24}$Al$_{16}$ | ○ | ○ | ○ | ○ | ○ | ○ | ○ | ○ | ⊚ |
| | 430 | 4.5Sb$_{70}$C$_{18}$Mg$_{12}$ | ○ | ○ | ○ | ○ | ○ | ○ | ○ | ○ | ⊚ |
| | 440 | 4Sb$_{80}$C$_{12}$B$_{8}$ | ○ | ○ | ○ | ○ | ○ | ○ | ○ | ○ | ⊚ |

The results mentioned above reveal that it was possible to cause the phase change by using the Sb$_{60}$C$_{24}$S$_{16}$ material for the recording layer 603 and applying the electrical energy. Also, when Sb$_{60}$C$_{24}$B$_{16}$, Sb$_{60}$C$_{24}$N$_{16}$, Sb$_{60}$C$_{24}$O$_{16}$, Sb$_{60}$C$_{24}$Mg$_{16}$, or Sb$_{60}$C$_{24}$Al$_{16}$ was used for the recording layer 603, the recording layer 603 was transferred from an amorphous phase to an crystalline phase and from a crystalline phase to an amorphous phase at high speed by being applied with the electric current pulse. Thus, it was proved that the information recording medium 600 had a function of allowing information to be recorded thereon and erased therefrom at high speed. It also was proved, by using the system shown in FIG. 6, that when the electrical energy was applied to the information recording medium 600 produced as described above, a reversible phase change occurred on the recording layer 603. Utilizing this fact, it is possible to increase the memory capacity by connecting a plurality of the information recording media 600 and to enhance an accessing function and a switching function of the system.

Example 10

In Example 10, 2× speed and 4× speed recordings were performed on the medium 400-3 produced in the Example 5 to see if the medium was usable at a linear velocity of 2× speed to 4× speed. In the present example, the recording/reproducing apparatus used was one in which the upper limit for the laser power of the laser beam 10 was 40 mW on the surface of the medium. Thereby, a sufficient amount of the laser beam 10 was incident on each of the first information layer 410, the second information layer 420, the third information layer 430, and the forth information layer 440 even in the recording at 4× speed The method for evaluating the recording/reproducing properties will be described briefly. The recording was performed at a radial position of 50 mm on the medium at 2× speed (9.84 m/second, 72 Mbps) and 4× speed (19.68 m/second, 144 Mbps) as in the Example 1. The reproduction of the recorded signals was evaluated at a linear velocity of 1× speed under irradiation with the laser beam 10 at 1.40 mW. The method for evaluating the reliability was the same as in the Example 1.

As shown in Table 9, the information layers from the first information layer 410 to the forth information layer 440 of the medium 400-3 were evaluated as ○ for all the items, so it can be used at a speed of 2× speed to 4× speed. The Pw and Pe set at 2× speed and 4× speed were as follows.

In the first information layer 410, the Pw was 26 mW and the Pe was 11 mW at 2× speed, and the Pw was 33 mW and the Pe was 15 mW at 4× speed. In the second information layer 420, the Pw was 25 mW and the Pe was 11 mW at 2× speed, and the Pw was 32 mW and the Pe was 14 mW at 4× speed. In the third information layer 430, the Pw was 20 mW and the Pe was 8 mW at 2× speed, and the Pw was 25 mW and the Pe was 11 mW at 4× speed. In the forth information layer 440, the Pw was 16 mW and the Pe was 7 mW at 2× speed, and the Pw was 20 mW and the Pe was 9 mW at 4× speed.

As shown for the information recording medium of the present invention by referring to the various Examples, the recording layer of the present invention can be used for both of the information recording media recordable by the optical means and the information recording media recordable by the electrical means. Although the Blu-ray Disc was described as the information recording medium in the Examples, the present invention can be applied also to HD DVD. According to the information recording medium of the present invention including the recording layer, it is possible to obtain an information recording medium that has not been realized so far, that is, the information recording medium that satisfies the recording properties, the erasing properties, and the recording mark storage stability at the same time even under the recording conditions of a data transfer rate as high as 4× speed or more and a capacity as high as 100 GB. Moreover, with respect to the information recording medium of the present invention including the recording layer, the recording and reproducing may be performed by utilizing a near field light or an optical system in which the numerical aperture >1. Thereby, it is possible to obtain the information recording medium that satisfies the recording properties, the erasing properties, and the recording mark storage stability at the same time even in higher capacity recording than that with the Blu-ray Disc.

INDUSTRIAL APPLICABILITY

The information recording medium of the present invention is a high-capacity optical information recording medium including an excellent recording layer, and is useful for media such as rewritable Blu-ray Disc, rewritable multilayer Blu-ray Disc, rewritable HD DVD, rewritable multilayer HD DVD, DVD-RAM, DVD-RW, and DVD+RW. Furthermore, when used as an electrical information recording medium, the information recording medium of the present invention is useful also as an electrical, high speed switching element.

The invention claimed is:

1. An information recording medium that allows information to be recorded thereon by being irradiated with an optical beam or by being applied with electrical energy, the information recording medium comprising at least a recording layer whose phase can change, wherein the recording layer consists of antimony (Sb), carbon (C), and a light element (L) having an atomic weight of less than 33.

2. The information recording medium according to claim 1, wherein the L is at least one element selected from B, N, O, Mg, Al, and S.

3. The information recording medium according to claim 1, wherein the recording layer is composed of a material represented by formula (1):

$$Sb_{100-x-y}C_xL_y \qquad (1),$$

where the subscripts 100-x-y, x, and y denote composition ratios of Sb, C, and the L in atomic percentage, respectively, and x and y satisfy $x+y \leqq 50$.

4. The information recording medium according to claim 3, wherein the x and the y satisfy $y \leqq x$.

5. The information recording medium according to claim 1, wherein the recording layer has a thickness of 15 nm or less.

6. The information recording medium according to claim 5, wherein the recording layer has a thickness of 7 nm or less.

7. The information recording medium according to claim 1, comprising N information layers, wherein the N is an integer of 2 or more, and at least one of the N information layers includes the recording layer.

8. The information recording medium according to claim 7, wherein the N is 3 or 4.

9. A method for producing an information recording medium, comprising at least the step of forming a recording layer consisting of antimony (Sb), carbon (C), and a light element (L) having an atomic weight of less than 33,
wherein the step of forming the recording layer includes using at least a sputtering target containing Sb and sputtering the sputtering target containing Sb.

10. The method for producing the information recording medium according to claim 9, wherein the L is at least one element selected from B, N, O, Mg, Al, and S.

11. The method for producing the information recording medium according to claim 9, wherein the step of forming the recording layer further includes using an additional sputtering target containing C and sputtering the sputtering target containing C.

12. The method for producing the information recording medium according to claim 9, wherein the step of forming the recording layer further includes using an additional sputtering target containing the L and sputtering the sputtering target containing the L.

13. The method for producing the information recording medium according to claim 9, wherein in the step of forming the recording layer, a rare gas, or a mixed gas of a rare gas and at least one selected from nitrogen gas and oxygen gas is used for the sputtering.

14. The method for producing the information recording medium according to claim 9, wherein the recording layer formed in the step of forming the recording layer is composed of a material represented by formula (1):

$$Sb_{100-x-y}C_xL_y \qquad (1),$$

where the subscripts 100-x-y, x, and y denote composition ratios of Sb, C, and the L in atomic percentage, respectively, and x and y satisfy $x+y \leqq 50$.

15. A sputtering target for forming a recording layer consisting of antimony (Sb), carbon (C), and a light element (L) having an atomic weight of less than 33,
the sputtering target consisting of antimony (Sb) and carbon (C).

16. A sputtering target for forming a recording layer consisting of a material that consists of antimony (Sb), carbon (C), and a light element (L) having an atomic weight of less than 33 and is represented by formula (1):

$$Sb_{100-x-y}C_xL_y \qquad (1),$$

where the subscripts 100-x-y, x, and y denote composition ratios of Sb, C, and L in atomic percentage, respectively, and x and y satisfy $x+y \leqq 50$,
the sputtering target consisting of antimony (Sb) and carbon (C).

17. The sputtering target according to claim 16, wherein the L is at least one element selected from B, N, O, Mg, Al, and S.

18. The sputtering target according to claim 17, wherein the L is at least one element selected from B, Mg, Al, and S.

19. The sputtering target according to claim 15, wherein the recording layer is composed of a material represented by formula (1):

$$Sb_{100-x-y}C_xL_y \qquad (1),$$

where the subscripts 100-x-y, x, and y denote composition ratios of Sb, C, and the L in atomic percentage, respectively, and x and y satisfy $x+y \leqq 50$.

* * * * *

UNITED STATES PATENT AND TRADEMARK OFFICE
CERTIFICATE OF CORRECTION

| | |
|---|---|
| PATENT NO. | : 8,173,239 B2 |
| APPLICATION NO. | : 12/663931 |
| DATED | : May 8, 2012 |
| INVENTOR(S) | : Kojima et al. |

It is certified that error appears in the above-identified patent and that said Letters Patent is hereby corrected as shown below:

Front page, (56) References Cited, under "Foreign Patent Documents", WO 2006/011285: delete "A" and insert --A1--.

Signed and Sealed this
Eighth Day of January, 2013

David J. Kappos
*Director of the United States Patent and Trademark Office*